(12) United States Patent
Tarasov

(10) Patent No.: US 11,531,003 B2
(45) Date of Patent: Dec. 20, 2022

(54) ANALYTE DETECTOR FOR DETECTING AT LEAST ONE ANALYTE IN AT LEAST ONE FLUID SAMPLE

(71) Applicant: Roche Diagnostics Operations, Inc., Indianapolis, IN (US)

(72) Inventor: Alexey Tarasov, Neckargemuend (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 393 days.

(21) Appl. No.: 16/546,536

(22) Filed: Aug. 21, 2019

(65) Prior Publication Data

US 2019/0376926 A1 Dec. 12, 2019

Related U.S. Application Data

(63) Continuation of application No. PCT/EP2018/054282, filed on Feb. 21, 2018.

(30) Foreign Application Priority Data

Feb. 22, 2017 (EP) .................................... 17157374

(51) Int. Cl.
*G01N 27/414* (2006.01)
(52) U.S. Cl.
CPC ..... *G01N 27/4145* (2013.01); *G01N 27/4146* (2013.01)
(58) Field of Classification Search
None
See application file for complete search history.

(56) References Cited

U.S. PATENT DOCUMENTS

| 7,491,496 | B2 | 2/2009 | Takiguchi et al. |
| 2007/0000778 | A1 | 1/2007 | Hsiung et al. |
| 2008/0264790 | A1 | 10/2008 | Kamahori et al. |
| 2009/0166221 | A1 | 7/2009 | Ishige et al. |
| 2010/0053624 | A1 | 3/2010 | Yoo et al. |

(Continued)

FOREIGN PATENT DOCUMENTS

| JP | 2006023112 A | 1/2006 |
| TW | 200712484 A | 4/2007 |

(Continued)

OTHER PUBLICATIONS

Keithley 4200-SCS Semiconductor Characterization System QuickStart Manual, 82 pages, obtained on Sep. 29, 2021 from https://www.imperial.ac.uk/media/imperial-college/research-centres-and-groups/centre-for-bio-inspired-technology/7290999.PDF, Nov. 2003.*

(Continued)

*Primary Examiner* — J. Christopher Ball
(74) *Attorney, Agent, or Firm* — Roche Diagnostics Operations, Inc.

(57) ABSTRACT

An analyte detector for detecting at least one analyte in at least one fluid sample is proposed. The analyte detector comprises at least one multipurpose electrode exposable to the fluid sample. The analyte detector further comprises at least one field-effect transistor in electrical contact with the at least one multipurpose electrode. The analyte detector further comprises at least one electrochemical measurement device configured for performing at least one electrochemical measurement using the multipurpose electrode.

18 Claims, 26 Drawing Sheets

(56) References Cited

U.S. PATENT DOCUMENTS

| | | |
|---|---|---|
| 2012/0019315 A1 | 1/2012 | Lee et al. |
| 2012/0091512 A1 | 4/2012 | Huang et al. |
| 2013/0057251 A1 | 3/2013 | Ahn et al. |
| 2014/0106338 A1 | 4/2014 | Fischer |
| 2016/0131613 A1 | 5/2016 | Jayant et al. |
| 2016/0282302 A1 | 9/2016 | Raguse et al. |

FOREIGN PATENT DOCUMENTS

| | | | |
|---|---|---|---|
| WO | WO 1999030144 A1 * | 6/1999 | |
| WO | 2013/078424 A2 | 5/2013 | |
| WO | 2016/173542 A1 | 11/2016 | |
| WO | WO-2016173542 A1 * | 11/2016 | ........ B01L 3/502753 |

OTHER PUBLICATIONS

Arquint, Ph. et al., Integrated blood-gas sensor for pO2, pCO2 and pH, Sensors and Actuators B, 1993, pp. 340-344, vol. 13, No. 1-3.

Daniels, Jonathan S. and Pourmand, Nader, Label-Free Impedance Biosensors: Opportunities and Challenges, Electroanalysis, 2007, pp. 1239-1257, vol. 19, No. 12.

Elnathan, Roey et al., Biorecognition Layer Engineering: Overcoming Screening Limitations of Nanowire-Based FET Devices, Nano Letters, 2012, pp. 5245-5254, vol. 12.

Filipiak, Marcin S. et al., Highly sensitive, selective and label-free protein detection in physiological solutions using carbon nanotube transistors with nanobody receptors, Sensors and Actuators B Chemical, 2018, pp. 1507-1516, vol. 255, Part 2.

Formisano, Nello et al., Inexpensive and fast pathogenic bacteria screening using field-effect transistors, Biosensors and Bioelectronics, 2016, pp. 103-109, vol. 85.

Gao, Ning et al., General Strategy for Biodetection in High Iconic Strength Solutions Using Transistor-Based Nanoelectronic Sensors, Nano Letters, 2015, pp. 2143-2148, vol. 15.

Gutiérrez-Sanz, Óscar et al., Direct, Label-Free, and Rapid Transistor-Based Immunodetection in Whole Serum, ACS Sensors, 2017, pp. 1278-1286, vol. 2, No. 9.

Hönes, Joachim et al., The Technology Behind Glucose Meters: Test Strips, Diabetes Technology & Therapeutics, 2008, pp. S-10-S-26, vol. 10, Supplement 1.

International Search Report issued Apr. 12, 2018, in Application No. PCT/EP2018/054282, 3 pps.

Kim, Jun Pyo et al., Enhancement of sensitivity and specificity by surface modification of carbon nanotubes in diagnosis of prostate cancer based on carbon nanotube field effect transistors, Biosensors and Bioelectronics, 2009, pp. 3372-3378, vol. 24, No. 11.

Lin, Shu-Ping et al., Non-Faradaic Electrical Impedimetric Investigation of the Interfacial Effects of Neuronal Cell Growth and Differentiation on Silicon Nanowire Transistors, ACS Applied Materials and Interfaces, 2015, pp. 9866-9878, vol. 7, No. 18.

Nellore, Abhinav et al., Human splicing diversity and the extent of unannotated splice junctions across human RNA-seq samples on the Sequence Read Archive, Genome Biology, 2016, 14 pp., vol. 17, No. 266.

Severinghaus, John W. and Bradley, Freeman, Electrodes for Blood pO2 and pCO2 Determination, Journal of Applied Physiology, 1958, pp. 515-520, vol. 13, No. 3.

Shim, Moonsub et al., Functionalization of Carbon Nanotubes for Biocompatibility and Biomolecular Recognition, Nano Letters, 2002, pp. 285-288, vol. 2, No. 4.

Tarasov, Alexey et al., A potentiometric biosensor for rapid on-site disease diagnostics, Biosensors and Bioelectronics, 2016, pp. 669-678, vol. 79.

Tarasov, Alexey et al., Gold-coated graphene field-effect transistors for quantitative analysis of protein-antibody interactions, 2D Materials, 2015, 8 pp., vol. 2, Article 044008.

Tarasov, Alexey et al., Understanding the Electrolyte Background for Biochemical Sensing with Ion-Sensitive Field-Effect Transistors, ACS Nano, 2012, pp. 9291-9298, vol. 6, No. 10.

Meira, Nirton C.S. et al., Label-free electrical recognition of a dengue virus protein using the SEGFET simplified measurement system, Analytical Methods, 2014, pp. 8882-8885, vol. 6, No. 22.

WIPF, Mathias et al., Selective Sodium Sensing with Gold-Coated Silicon Nanowire Field-Effect Transistors in a Differential Setup, ACS Nano, 2013, pp. 5978-5983, vol. 7, No. 7.

Wu, Ching-Chou et al., Fabrication of miniature Clark oxygen sensor integrated with microstructure, Sensors and Actuators B Chemical, 2005, pp. 342-349, vol. 110.

Yoshimoto, Keitaro et al., Direct Observation of Adsorption-Induced Inactivation of Antibody Fragments Surrounded by Mixed-PEG Layer on a Gold Surface, Journal of the American Chemical Society, 2009, pp. 7982-7989, vol. 132.

Zayats, Maya et al., Label-Free and Reagentless Aptamer-Based Sensors for Small Molecules, Journal of the American Chemical Society, 2006, pp. 13666-13667, vol. 128, No. 42.

Zhan, Beibei et al., Graphene Field-Effect Transistor and Its Application for Electronic Sensing, Small, 2014, 25 pp.

Zhu, Alexander Y. et al., Optoelectromechanical Multimodal Biosensor with Graphene Active Region, Nano Letters, 2014, pp. 5641-5649, vol. 14, No. 10.

* cited by examiner

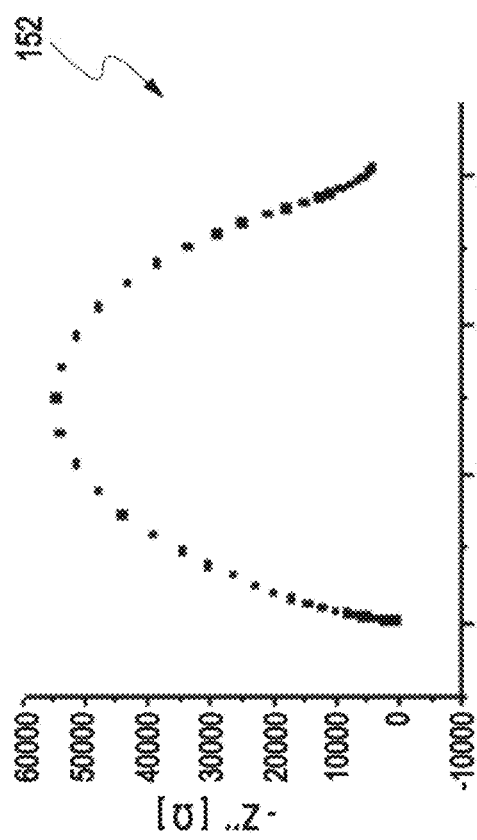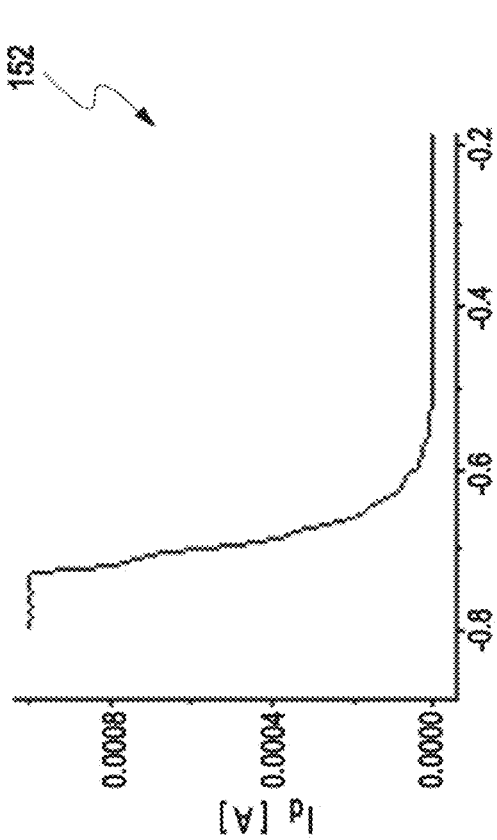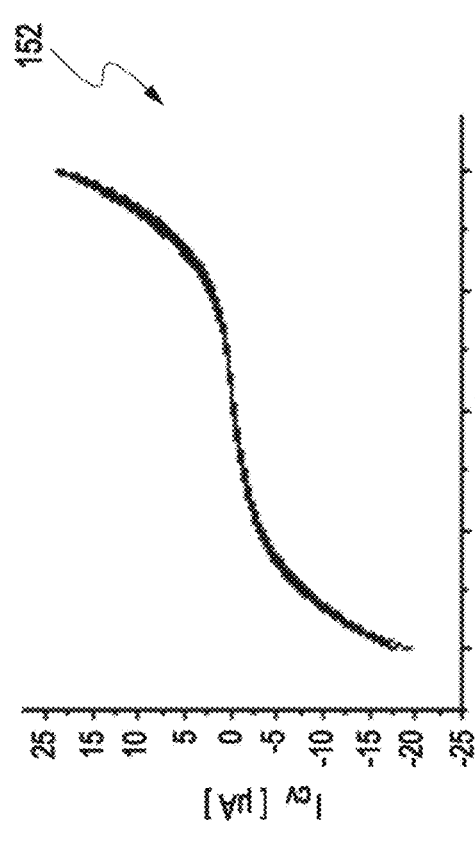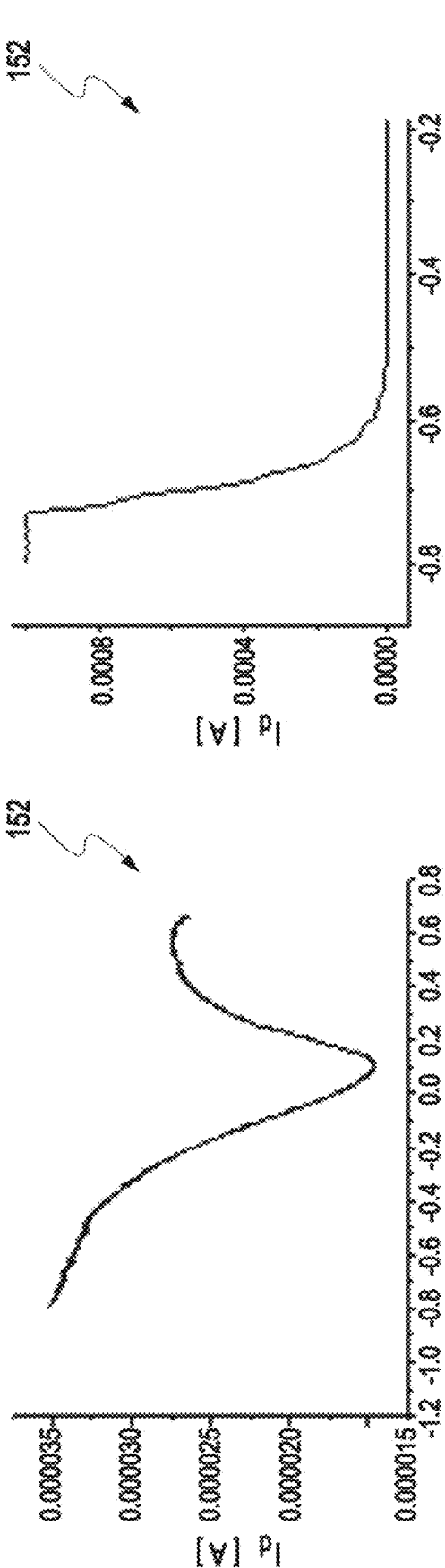
Fig. 13 A  Fig. 13 B  Fig. 13 C  Fig. 13 D

ANALYTE DETECTOR FOR DETECTING AT LEAST ONE ANALYTE IN AT LEAST ONE FLUID SAMPLE

CROSS-REFERENCE TO RELATED APPLICATIONS

This application is a continuation of International Patent Application No. PCT/EP2018/054282, filed 21 Feb. 2018, which claims the benefit of European Patent Application No. 17157374.4, filed 22 Feb. 2017, the disclosures of which are hereby incorporated herein by reference in their entirety.

TECHNICAL FIELD

The present disclosure relates to an analyte detector and a method for detecting at least one analyte in at least one fluid sample. The disclosure further relates to the use of the analyte detector for the qualitative and/or quantitative determination of the at least one analyte in a fluid. The devices and methods of the present disclosure, as an example, may be used for diagnostic purposes, e.g., in clinical or laboratory analytics or for home monitoring purposes. The devices and methods of the present disclosure specifically may be used for detecting one or more analytes in body fluids or other liquids. As an example, DNA detection may be named. Other applications and uses, however, are feasible.

BACKGROUND

A wide variety of analyte detectors for detecting at least one analyte in at least one fluid sample have been described. Analyte detectors configured for reliably detecting chemical and/or biological species in a qualitative and/or quantitative manner can be used for various purposes such as, but not limited to, diagnostic purposes, monitoring of environmental contamination, food safety evaluation, quality control or manufacturing processes. Such analyte detectors may for instance rely on transistor-based measurements for identifying the at least one analyte. Transistor-based analyte detectors have been adapted to allow the detection of a wide range of analytes including biomolecules such as proteins, antibodies, antigens, DNA, and chemical species such as ionic species and electrolytes.

A number of studies describe the use of transistor-based analyte detectors in the identification of antigens, antibodies or other proteins: Elnathan et al. (Elnathan et al., Nano Lett. 2012, 12, 5245-5254) describe the detection of proteins in untreated serum and blood samples in the sub-pM concentration range using a nanowire-based field-effect transistor (FET) device combined with size-reduced antibody fragments. The use of size-reduced antibody fragments permits the biorecognition event to occur in closer proximity to the nanowire surface, falling within the charge-sensitive Debye screening length. In a study published by Gao et al. (Gao et al., Nano Lett. 2015, 15, 2143-2148) incorporation of a porous and biomolecule permeable layer on a FET-based nanoelectric sensor is described. The polymer layer increases the effective screening length in the region immediately adjacent to the FET-based sensor surface and thereby enables the detection of biomolecules in high ionic strength solutions in real-time. The same study also reports that silicon nanowire field-effect transistors with additional polyethylene glycol (PEG) modification can readily detect prostate specific antigen (PSA) in solutions with phosphate buffer concentrations as high as 150 mM. Kim et al. (Kim et al., Biosens Bioelectron. 2009 Jul15; 24(11):3372-8) present a simple and sensitive method for real-time detection of a prostate cancer marker (PSA-ACT complex) through label-free protein biosensors based on a carbon nanotube field-effect transistor (CNT-FET). Tarasov et al. (Tarasov et al., 2D Mater. 2 (2015) 044008) use gold-coated graphene FETs to measure the binding affinity of a specific protein-antibody interaction. In a different study, Tarasov et al. (Tarasov et al., Biosens Bioelectron. 2016 May 15; 79:669-78) employ an extended-gate field-effect transistor for direct potentiometric serological diagnosis using the model pathogen Bovine Herpes Virus-1 (BHV-1). To demonstrate the sensor capabilities as a diagnostic tool, BHV-1 viral protein gE is expressed and immobilized on the sensor surface to serve as a capture antigen for BHV-1-specific antibody (ant-gE). The gE-coated immunosensor was shown to be highly sensitive and selective to anti-gE and significantly faster than Enzyme-Linked ImmunoSorbent Assay (ELISA) that is typically performed by centralized laboratories.

Other studies explore the potential of transistor-based analyte detectors for the identification of nucleic acids, such as DNA or RNA, or possible components thereof, such as adenosinmono-phosphate (AMP). In U.S. Patent Application Publication No. 2010/0053624 A1 a biosensor is disclosed that can convert biological interactions into electrical and optical signals to sense a material to be analyzed. The biosensor includes a substrate, a source electrode and a drain electrode formed on one surface of the substrate, a carbon nanotube connecting the source and the drain electrodes, a metal gate covering the carbon nanotube, a recognition component immobilized on the metal gate, and a passivation layer covering the source and drain electrodes. In one embodiment, the recognition component may be a single-stranded oligonucleotide such as DNA or RNA. In the case of DNA, the biosensor has a recognition DNA immobilized on the surface of the metal gate. Electrical and/or optical signals are generated as a result of hybridization between the recognition DNA and a target DNA. Zayats et al. (Zayats et al., J Am Chem Soc. 2006 Oct. 25; 128(42):13666-7) present research applying aptamers for the label-free reagent-less analysis of small molecules. They demonstrate that the small substrate-induced separation of a duplex nucleic acid that includes the aptamer strand, on an ion-sensitive field-effect transistor (ISFET) or on an electrode, forms a substrate-aptamer complex that can be electrically characterized. In particular, an amine-functionalized nucleic acid that acts as aptamer was immobilized on the gate surface and further hybridized with a short nucleic acid. The addition of adenosine displaces the short nucleic acid and assembles the aptamer into the hairpin configuration that binds adenosine mono-phosphate (AMP).

Understanding and controlling the behavior of the analyte detector is crucial for its targeted use. Transistor-based analyte detectors can also respond to chemicals species such as ionic species and electrolytes. Tarasov et al. (Tarasov et al. ACS Nano. 2012 Oct. 23;6(10):9291-8) use silicon nanowires coated with highly pH-sensitive hafnium oxide (HfO2) and aluminum oxide ($Al_2O_3$) in silicon nanowire field-effect transistor to determine their response to changes in the supporting electrolyte concentration. Wipf et al. (Wipf et al., ACS Nano 2013 Jul. 23;7(7):5978-83) modify individual nanowires with thin gold films as a novel approach to surface functionalization for the specific detection of electrolyte ions by ion-sensitive field-effect transistors in a differential setup. They find that a functional self-assembled monolayer does not affect the unspecific response of gold to pH and background ionic species, which represents a clear advantage of gold compared to oxide surfaces.

Thus, transistor-based analyte detectors have been adapted in numerous ways to detect a multitude of analytes. The advances established in the field of transistor-based analyte detectors are in part due to advances in surface functionalization techniques, in particular those applicable to nano-devices. Shim et al. (Shim et al., Nano Letters 2002 Vol. 2, No. 4, 285-8) study the adsorption behavior of proteins on the side of single-walled carbon nanotubes. They report that the functionalization of single-walled carbon nanotubes by co-adsorption of a surfactant and polyethylene glycol is found to be effective in resisting non-specific adsorption of streptavidin. In U.S. Pat. No. 7,491,496 B2 a method is disclosed for immobilizing nucleic acid and a method for manufacturing a biosensor using the same method. The method provided enables high-density absorption when immobilizing nucleic acid probes onto a solid support by suppressing electrostatic repulsion among the nucleic acids. A nucleic acid immobilization method to immobilize a nucleic acid onto a solid support, includes: preparing a solution containing a probe molecule which includes a nucleic acid, a spacer molecule, and at least one kind of a divalent cation; and contacting the solution with the solid support for incubation. Yoshimoto et al. (Yoshimoto et al., J Am Chem Soc. 2010 Jun. 16; 132(23): 7982-9) examine the adsorption behavior of antibody fragments directly immobilized on a gold surface through S-Au linkage. They report that the conformational and/or orientation change of antibody fragments was suppressed by a coimmobilized mixed polyethylene glycol layer. Yoshimoto et al. expect their findings to be useful for the improvement of the antibody fragment method and, thus, for the construction of high-performance immunosensor surfaces.

However, analyte detectors able to detect at least one analyte in at least one fluid sample may also be based on electrochemical measurements. For details of electrochemical test elements and potential test chemicals useful in such test elements, which may also be used within the present disclosure, reference may be made to J. Hoenes et al.: The Technology Behind Glucose Meters: Test Strips, Diabetes Technology & Therapeutics, Vol. 10, Supplement 1, 2008, S-10 to S-26. Further, impedance biosensors are a class of electrical biosensors able to detect unlabeled DNA and protein targets by monitoring changes in surface impedance when a target molecule binds to an immobilized probe. The challenges caused by the affinity capture step and other challenges unique to impedance readout are discussed in Daniels and Pourmand, Electroanalysis, 2007 May 16, 19(12): 1239-1257. Furthermore, in their fundamental study from 1958, Severinghaus and Bradley (Severinghaus and Bradley, J Appl Physiol. 1958 November:13(3):515-20) describe an apparatus to permit rapid and accurate analysis of oxygen and carbon dioxide tensions in gas, blood or any liquid mixture using an oxygen electrode and a carbon dioxide electrode. Wu et al. (Wu et al., Sensors and Actuators B 110 (2005) 342-9) report on a miniature Clark-type oxygen sensor that has been integrated with a microstructure using a novel fabrication technique. Moreover, analyte detectors may also combine functional elements as reported by Zhu et al. (Zhu et al., Nano Lett. 2014 Oct. 8; 14(10): 5641-9), who present a graphene enabled, integrated opto-electro-mechanical device and demonstrate its utility for biomolecular sensing. They demonstrate a novel nanoscale sensing device with optical, electronic and mechanical functional elements integrated on the same chip. By having each element target a different concentration regime, the sensitivity-dynamic range trade-off of traditional single-mode sensors can be significantly mitigated.

International Patent Application Publication No. WO 2016/173542 A1 discloses a system for detecting a target and a method for detecting a target. The system includes a field effect transistor, having a gate, a source, and a drain; a potentiostat, having a working electrode, a counter electrode, and a reference electrode; wherein the working electrode is coupled with a detection region, and the counter electrode is coupled with the gate; wherein the detection region, the gate, and the reference electrode are arranged in an ion fluid; wherein the potentiostat is configured to generate redox in the ion fluid by an electrochemical method to detect the target.

Formisano et al.: "Inexpensive and fast pathogenic bacteria screening using field-effect transistors". BIOSENSORS AND BIOELECTRONICS, ELSEVIER BV, NL, vol. 85, 21 April 2016 (2016-04-21), pages 103-109, XP029680551, ISSN: 0956-5663, DOI: 10.1016/J.BIOS.2016.04.063, describes a label-free sensor for fast bacterial detection based on metal-oxide-semiconductor field-effect transistors (MOSFETs). The electrical charge of bacteria binding to the glycosylated gates of a MOSFET enables quantification in a straightforward manner and at a higher sensitivity than is achieved with electrochemical impedance spectroscopy (EIS) and matrix-assisted laser desorption ionization time-of-flight mass spectroscopy (MALDI-ToF) on the same modified surfaces.

Vieira et al.: "Label-free electrical recognition of a dengue virus protein using the SEGFET simplified measurement system". Analytical Methods, vol 6, no.22, 8 September 2014 (2014-09-08), pages 8882-8885, XP055360591, GBR ISSN: 1759-9660, DOI: 10:1039/C4AY01803F, describes the use of a separative extended gate field-effect transistor (SEGFET) as an immunosensor for the label-free recognition of dengue virus nonstructural protein 1 (NS1). NS1 is detected in a concentration range of 0.25 to 5.0 µg mL-1, indicating that the system is promising for the early and simple diagnosis of dengue.

U.S. Patent Application Publication No. 2016/0131613 A1 discloses a floating gate based sensor apparatus including at least two separate electrical bias components with respect to a floating gate based sensor surface within the floating gate based sensor apparatus. By including the at least two electrical bias components, the floating gate based sensor apparatus provides enhanced capabilities for biomaterial and non-biomaterial detection and manipulation while using the floating gate based sensor apparatus.

Lin et al.: "Non-Faradaic electrical impedimetric investigation of the interfacial effects of neuronal cell growth and differentiation on silicon nanowire transistors". ACS APPLIED MATERIALS AND INTERFACES, vol. 7, no.18, 13 May 2015 (2015-05-13), pages 9866-9878, XP055360704, US ISSN: 1944-8244, DOI: 10.1021/acsami.5b01878, describes the application of silicon nanowire field-effect transistors (SiNWFET) devices for noninvasive, real-time monitoring of interfacial effects during cell growth and differentiation using cultured rat adrenal pheochromocytoma (PC12) cells. Monitoring of cell adhesion during growth and morphological changes during neuronal differentiation was performed by measuring the non-Faradaic electrical impedance of the cell-SiNW FET system using a precision LCR meter. Zhan et al.: "Graphene field-effect transistor and its application for electric sensing". SMALL, 7 July 2014 (2014-07-07), XP055200050, ISSN: 1613-6810, DOI: 10.1002/smll.201400463, describes the fabrication and characterization of graphene based field-effect transistors (GFETs) and introduces the new developments in physical, chemical, and biological electronic detection using GFETs. Further, several perspectives and current challenges of GFETs development are presented, and some proposals are suggested for further development and exploration.

U.S. Patent Application Publication No. 2012/0019315 A1 discloses a bio material receiving device including a thin film transistor (TFT) including a drain electrode, and a nano well accommodating a bio material. The drain electrode includes the nano well. The TFT may be a bottom gate TFT or a top gate TFT. A nano well array may include a plurality of bio material receiving devices. In a method of operating the bio material receiving device, each of the bio material receiving devices may be individually selected in the nano well array. When the bio material is accommodated in the selected bio material receiving device, a voltage is applied so that another bio material is not accommodated.

Arquint et al.: "Integrated blood-gas sensor for pO2, pCO2 and pH" SENSORS AND ACTUATORS B: CHEMICAL: INTERNATIONAL JOURNAL DEVOTED TO RESEARCH AND DEVELOPMENT OF PHYSICAL AND CHEMICAL TRANSDUCERS, ELSEVIER BV, NL, vol. 13, no. 1-3, 1 May 1993 (1993-05-01), pages 340-344, XP026588341, ISSN: 0925-4005, DOI: 10.1016/0925-4005 (93)85396-R [retrieved on 1993-05-01], describes the fabrication and characterization of a combined $pO_2$, $pCO_2$ and pH chemical sensor, designed for blood gas monitoring. Classical electrochemical principles are used in a miniaturized planar-type structure. Both amperometric ($pO_2$) and potentiometric devices ($pCO_2$, pH) are integrated on a 10 mm×10 mm chip. The transducer part of the chip is realized using standard silicon technology. Poly-acrylamide and polysiloxane layers, which are used as hydrogel and gas-permeable membrane, respectively, are deposited and patterned by photopolymerization. Thus, the whole sensor is fabricated on wafer level using IC-compatible processes. The characterization has been performed in aqueous solutions and in blood used for transfusion. For this purpose, the chip is mounted into a flow-through cell.

Gutiérrez-Sanz et al.: "Direct, label-free, and rapid transistor-based immunodetection in whole serum" ACS SENSORS 2017 Sep. 22; 2(9), pages 1278-1286, DOI: 10.1021/acssensors.7b00187, Epub 2017 Aug. 30, describes how tailoring the sensing surface of a transistor-based biosensor with short specific biological receptors and a polymer polyethylene glycol (PEG) can strongly enhance the sensor response. In addition, the sensor performance can be dramatically improved if the measurements are performed at elevated temperatures (37° C. instead of 21° C.). With this novel approach, highly sensitive and selective detection of a representative immunosensing parameter-human thyroid-stimulating hormone-is shown over a wide measuring range with subpicomolar detection limits in whole serum. This allows direct immunodetection in whole serum using transistor-based biosensors, without the need for sample pre-treatment, labeling, or washing steps. The presented sensor is low-cost, can be easily integrated into portable diagnostics devices, and offers a competitive performance compared to state-of-the-art central laboratory analyzers.

Filipiak et al.: "Highly sensitive, selective and label-free protein detection in physiological solutions using carbon nanotube transistors with nanobody receptors" Sensors and Actuators B: Chemical, Volume 255, Part 2, February 2018, pages 1507-1516, DOI: 10.1016/j.snb.2017.08.164, describes combining highly stable FETs based on single-walled semiconducting carbon nanotube (SWCNTs) networks with a novel surface functionalization comprising: 1) short nanobody (VHH) receptors, and 2) a polyethylene glycol (PEG) layer. These measures overcome the two major challenges that have limited the use of nanomaterial-based field-effect transistors (FETs) in physiological samples: screening of the analyte charge by electrolyte ions (Debye screening) and non-specific adsorption. Nanobodies are stable, easy-to-produce biological receptors that are very small (~2-4 nm), thus enabling analyte binding closer to the sensor surface. Despite their unique properties, nanobodies have not been used yet as receptors in FET based biosensors. The addition of PEG strongly enhances the signal in high ionic strength environment. Using green fluorescent protein (GFP) as a model antigen, high selectivity and sub-picomolar detection limit with a dynamic range exceeding 5 orders of magnitude is demonstrated in physiological solutions. In addition, long-term stability measurements reveal a low drift of SWCNTs of 0.05 mV/h. The presented immunoassay is fast, label-free, and does not require any sample pretreatment or washing steps.

In the field of analytics, generally, one major technical challenge typically resides in the selection of appropriate methods and devices for the specific analyte to be detected. Even more, in some cases, several types of analytes in one and the same sample may have to be detected. As discussed above, a wide variety of detectors having differing sensitivities and measurement principles is available. Transistor-based detectors, as an example, are highly sensitive to the analyte charge. Analyte detectors based on electrochemical measurements are usually sensitive to the current, impedance or potential changes resulting from electrochemical reactions involving the analyte. Thus, typically, for each analyte to be detected, a specific detector has to be selected, having properties suited for the analyte. The measurement setup, consequently, typically is highly specific for the analyte to be tested for, and the setup, in total, typically lacks versatility. Further, each measurement principle typically has its own drawbacks, technical limitations and inaccuracies. Consequently, the choice of a measurement principle also implies the choice of the technical drawbacks involved with this measurement principle. A combination of measurement principles, however, typically leads to a complex setup and evaluation. There is, consequently, a general need for electronic sensors in physiological liquids which generally provide a high versatility and selectivity and which provide a more universal sensor layout as compared to the methods, measurement principles and devices known in the art.

BRIEF SUMMARY

It is against the above background that the embodiments of the present disclosure provide certain unobvious advantages and advancements over the prior art. In particular, the inventors have recognized a need for improvements in an analyte detector for detecting at least one analyte in at least one fluid sample.

Although the embodiments of the present disclosure are not limited to specific advantages or functionality, it is noted that the present disclosure provides an analyte detector and a method for detecting at least one analyte in at least one fluid sample which allow for a high versatility, selectivity and sensitivity and, still, which provide a more universal sensor layout as compared to known means and methods.

In accordance with one embodiment of the present disclosure, an analyte detector for detecting at least one analyte in at least one fluid sample is provided, the analyte detector comprising at least one multipurpose electrode exposable to the fluid sample, the analyte detector further comprising at least one field-effect transistor in electrical contact with the at least one multipurpose electrode, the analyte detector further comprising at least one electrochemical measurement device configured for performing at least one electrochemical measurement using the multipurpose electrode, wherein the analyte detector further comprises at least one controller, wherein the controller is connected to the field-effect transistor and to the electrochemical measurement device and wherein the controller is configured for controlling at least one transistor measurement by using the field-effect transistor and wherein the controller additionally is configured for controlling the at least one electrochemical measurement by using the electrochemical measurement device.

In accordance with another embodiment of the present disclosure, a method for detecting at least one analyte in at least one fluid sample is provided, the method using the analyte detector according to an embodiment of the present disclosure, the method comprising the following steps: a) providing at least one multipurpose electrode; b) providing the at least one fluid sample in contact with the multipurpose electrode; c) performing at least one transistor measurement by using at least one field-effect transistor in electrical contact with the at least one multipurpose electrode; and d) performing at least one electrochemical measurement by using the multipurpose electrode.

These and other features and advantages of the embodiments of the present disclosure will be more fully understood from the following description in combination with the drawings and the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIGS. 13A-13D show four diagrams of measurements plotting a current ICV as a function of a potential V applied (FIG. 13A), plotting the negative imaginary part of the impedance Z'' versus the real part of the impedance Z' (FIG. 13B), plotting the drain current Id versus a potential Vg (FIGS. 13C and 13D);

Figure 1:
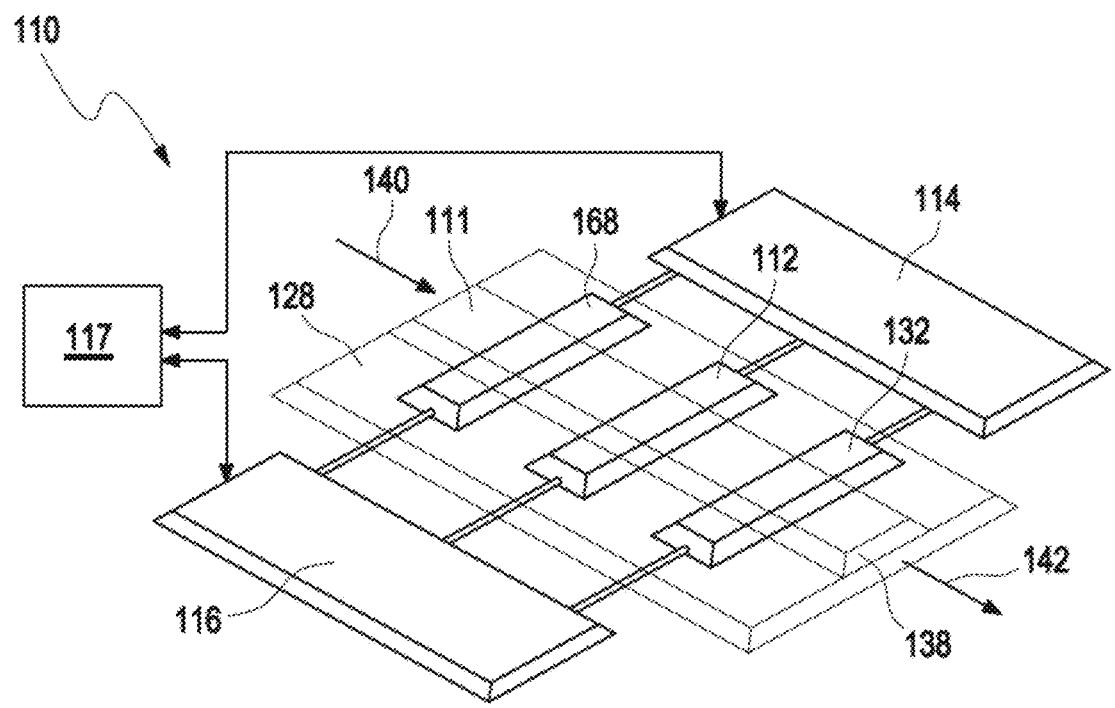
FIG. 1 shows an exemplary schematic layout of an analyte detector in accordance with an embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, notwithstanding the fact that the respective feature or element may be present once or more than once.

Further, as used in the following, the terms "preferably", "more preferably", "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. Embodiments of the disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

In accordance with a first embodiment of the present disclosure, an analyte detector for detecting at least one analyte in at least one fluid sample is described. The analyte detector comprises at least one multipurpose electrode exposable to the fluid sample, at least one field-effect transistor in electrical contact with the at least one multipurpose electrode, and at least one electrochemical measurement device configured for performing at least one electrochemical measurement using the multipurpose electrode.

As used herein, the term "analyte detector" may generally refer to an arbitrary device configured for an analytical examination of the sample. The analyte detector may be configured for conducting at least one analysis, such as a medical analysis, of the sample. As generally used within the present disclosure, the terms "analysis", "analytical examination" and "determination of one or more analytes" are used synonymously and are understood to describe a qualitative and/or a quantitative detection of the at least one analyte. In particular, said terms may be understood as a determination of the concentration or amount of the respective analyte, where the sole determination of the absence or presence of the analyte may also be regarded as an analytical examination. Thus, specifically, the analyte detector may be configured for qualitatively and/or quantitatively detecting one or more analytes, specifically in one or more samples. The detection of the at least one analyte may take place at a high degree of sensitivity.

As further used herein, the term "analyte" generally may refer to an arbitrary chemical or biological substance or species, such as an ion, an atom, a molecule or a chemical compound. The analyte specifically may be an analyte which may be present in a bodily fluid or a body tissue. The term analyte specifically may encompass atoms, ions, molecules and macromolecules, in particular biological macromolecules such as nucleic acids, peptides and proteins, lipids, sugars, such as glucose, and metabolites. Further examples of potential analytes to be detected will be given in further detail below.

As used herein, the term "fluid sample" generally may refer to a liquid or gas. The fluid sample may have a defined or definable volume. Further, the fluid sample may be comprised in a defined or definable space or may also be present in an open space such as in an open surrounding. The fluid sample may be present in a static state or may flow continuously or discontinuously. The fluid sample may, as an example, be a pure liquid or a homogeneous or heterogeneous mixture, such as a dispersion, an emulsion or a suspension. Similarly, for gases, mixtures of gases or even mixtures of gases with liquids or solids may be used.

In particular, the fluid sample can contain atoms, ions, molecules and macromolecules, in particular biological macromolecules such as nucleic acids, peptides and proteins, lipids and metabolites, and also biological cells and cell fragments. Typical fluid samples to be examined are bodily fluids such as blood, plasma, serum, urine, cerebrospinal fluid, lachrymal fluid, cell suspensions, cell supernatants, cell extracts, tissue lysates or such likes. Fluid samples can, however, also be calibration solutions, reference solutions, reagent solutions or solutions containing standardized analyte concentrations, so-called standards.

As used herein, the term "electrode" may generally refer to a functional element configured to perform a current measurement and/or a voltage measurement and/or configured to apply a current and/or an electrical potential and/or a voltage to an element in electrical contact with the electrode. In particular, the electrode may comprise a conducting and/or a semiconducting material. As an example, the electrode may comprise at least one metallic material and/or at least one organic or inorganic semiconducting material, having at least one conducting or semiconducting surface. The surface itself may form the electrode or a part of the electrode. As an example, the electrode may comprise at least one material, specifically at least one surface material, having an electrical conductivity of at least 1,000 S/m, e.g., at least 1,000,000 S/m, either isotropically or anisotropically in at least one direction.

As used herein, the term "in electrical contact" may generally refer to the arrangement or configuration of at least two components, wherein at least one of the components is able to electrically influence the at least one other component and/or to at least partially control an electrical quality of the other component such as, but not limited to, its conductivity and electrical current flow, for instance via field effects. In particular, an electrode may be in electrical contact with an element without being in direct physical contact with said element. Thus, an electrode may control the electrical current flow within an element by application of a voltage despite being insulated from said element. Insulation may, for instance, be constituted by an oxide layer as is typically the case for a gate electrode of a metal oxide semiconductor field-effect transistor (MOSFET), a subgroup of insulated-gate field-effect transistors (IGFET), which is described in more detail below. Thus, generally, for being in electrical contact with each other, the at least two components may be located in close proximity, without being in direct physical contact with one another, such that, however, the components may influence one another electrically. Additionally, or alternatively, however, the at least two components may also be physically connected via at least one connecting element having at least semiconducting properties or electrically conductive properties, such as by at least one electrical conductor. Again, additionally or alternatively, the at least two components may be separate components or may fully or partially be integrated into one another. As an example, the at least one multipurpose electrode may either be connected to the field-effect transistor via at least one connecting element, such as via at least one electrically conductive lead, or may even fully or partially be integrated into the field-effect transistor. Various possibilities are given.

As used herein, the term "multipurpose electrode" may generally refer to an arbitrary electrode configured to be able to form part of at least two different measurement devices. Thus, the multipurpose electrode may take part in analytical examinations based on at least two different methods, wherein each of the methods requires the use of at least one measurement device. The multipurpose electrode may, for instance, be configured to form part of at least both the field-effect transistor and the electrochemical measurement device. Thus, the multipurpose electrode may take part in analytical examinations based on at least one of the methods comprising the use of the field-effect transistor and the at least one other method comprising the use of the electrochemical measurement device.

As further used herein, the term "exposable" generally refers to the property of an element of providing at least one surface which may be brought into contact with the at least one substance to which the element is to be exposed. Thus, as an example, the at least one multipurpose electrode may provide at least one electrode surface accessible to the fluid sample. Specifically, as will be explained by exemplary embodiments below, the analyte detector may comprise at least one fluid channel, such as a fluid channel having an inlet port and an outlet port, through which the fluid sample may flow, wherein the at least one multipurpose electrode comprises at least one electrode surface accessible from the fluid channel, such that liquid flowing through or present in the fluid channel contacts the at least one electrode surface. Other options, however, are feasible.

As further used herein, the term "field-effect transistor" may generally refer to a functional element comprising at least one source electrode, at least one drain electrode and at least one gate electrode. The field-effect transistor further comprises at least one channel. As used herein, the term "channel" of the field-effect transistor may generally refer to a component able to conduct a current between the source electrode and the drain electrode. The channel may have at least one semiconducting material and/or at least one doped semiconducting material. The semiconducting material may be or may comprise at least one of an inorganic semiconducting material and an organic semiconducting material. Typically, a semiconducting material exhibits an electrical conductivity $\sigma$ of $10^{-8}$ S/cm$<\sigma<10^4$ S/cm. In the field of organic semiconductors, however, due to the impact of the low charge carrier mobilities, due to the molecular orbitals and/or due to the low charge carrier densities, however, this description is often not fully applicable. Thus, organic conductive materials are often denoted as organic semiconductors, even though their conductivity may be higher than $10^4$ S/cm, such as graphene.

In particular, the semiconducting material may comprise one, two or more regions, typically two to ten regions, more typically three regions, wherein each region may be n-type doped or p-type doped. Specifically, the semiconducting material may comprise an inorganic and/or organic semiconducting material. The channel may be able to conduct a current between the source electrode and the drain electrode only under specific external conditions. The conditions may include a temperature of the channel and/or the voltage or electrical potential applied to the channel either directly or via the gate electrode or via an external electrode. In particular, the channel may be constituted by at least one semiconducting material, such as by at least one semiconducting layer. As an example, inorganic and/or organic semiconducting materials may be used. In the following, as a specific example, graphene is used as a semiconducting material, such as by using one or more graphene layers. The gate electrode may be in direct physical contact with the channel. In this configuration the field-effect transistor may generally be referred to as "non-insulated-gate field-effect transistor" (NIGFET). In particular, the gate electrode may be at least partially identical with the channel. Alternatively, the gate electrode may be in indirect physical contact with the channel, e.g., by using one or more electrically insulating materials interposed in between the gate electrode and the channel. In this configuration the transistor may generally be referred to as "insulated-gate field-effect transistor" (IGFET).

The insulated-gate field-effect transistor may be implemented as a "metal-insulator-semiconductor field-effect transistor" (MISFET). In this case, the gate electrode which may comprise at least one metal may be insulated from the channel which may comprise at least one semiconducting material. Specifically, the insulation of the gate electrode from the channel may be constituted by an oxide. In this configuration the field-effect transistor may generally be referred to as "metal-oxide-semiconductor field-effect transistor" (MOSFET). However, other materials for insulation of the gate electrode are feasible. The channel of the field-effect transistor may be in physical contact with an electrolyte solution, which may constitute or form part of the gate electrode. In this configuration an ionic double layer may form, that may serve as insulation of the gate electrode from the channel. In this configuration the field-effect transistor may be referred to as a "solution-gated or liquid-gated FET". The electrolyte solution may comprise substances that may influence the potential applied to the channel upon close proximity or adsorption to the channel and/or the insulation of the channel, thus allowing the detection of chemical species. In this configuration the field-effect transistor may be referred to as a "chemical field-effect transistor" or ChemFET. In particular, a ChemFET may be configured for the detection of ionic species forming an "ion-sensitive field-effect transistor" (ISFET) that may be sensitive to $H^+$ and/or other ionic species. A layer sensitive to ionic species, such as $Al_2O_3$, $Si_3N_4$ or $Ta_2O_5$, may be in contact with the channel or may form part of the gate electrode of the ISFET and/or may form part of the channel and the gate electrode. In another configuration, the ChemFET may comprise a layer of immobilized enzymes as part of the gate electrode and/or the channel of the field-effect transistor. In this configuration the field-effect transistor may be referred to as an "enzyme field-effect transistor" (ENFET). Binding of the enzyme to the analyte may affect the potential applied to the channel and allow detection of the analyte. Thus, the ENFET is an example of a field-effect transistor-based biosensor (BioFET). As a BioFET the field-effect transistor may comprise a layer of immobilized biomolecules as biorecognition elements able to bind one or more species of molecules, specifically biomolecules, where the binding reaction may either directly or indirectly affect the potential applied to the channel.

The field-effect transistor may further be implemented as an "extended-gate field-effect transistor". As used herein, the term "extended-gate field-effect transistor" may generally refer to a field-effect transistor comprising a gate electrode configured to allow a spatial separation of the channel of the field-effect transistor from a process or reaction that sets or affects the potential of the gate electrode. Such an electrode may generally be referred to as an "extended gate electrode". Thus, the extended gate electrode of an extended-gate field-effect transistor may allow to physically separate the process of applying a potential to the channel and the process of applying a potential to the gate electrode.

The at least one field-effect transistor may comprise at least one substrate. The substrate may have purely mechanical properties and function, such as for carrying the above-mentioned components of the field-effect transistor. Alternatively, however, the substrate may also be fully or partially identical with one or more of the above-mentioned components. Thus, as an example, the at least one channel may fully or partially be embodied within the substrate.

The at least one field-effect transistor may further have at least one sensing surface. The at least one sensing surface, as an example, may be a surface of the field-effect transistor which may be exposed to the fluid sample. The sensing surface, as an example, may be a surface of the multipurpose electrode, e.g., the above-mentioned electrode surface. The sensing surface, however, may also be or comprise another surface, such as a surface of the channel of the field-effect transistor. Various embodiments are feasible and will be described in an exemplary fashion in further detail below.

As used herein, the term "electrochemical measurement" may generally refer to the measurement of at least one measureable characteristic of a redox reaction. The electrochemical measurement and/or the measurable characteristic of the redox reaction, as an example, may imply an electrical current, a voltage, an electrical potential, a mass, for instance a mass deposited on an electrode, an impedance, particularly the real part and/or the imaginary part of the impedance, a capacitance, a resistance or a phase shift. Specifically, the electrochemical measurement may be performed in the presence of an electroactive species. As used herein, the term "electroactive species" may generally refer to a compound that facilitates or enhances or catalyzes the redox reaction, for instance by facilitating an electron transfer. The electroactive species may be dissolved in the fluid sample and/or may be immobilized on a surface of the analyte detector, wherein the surface may be exposable to the fluid sample. In particular, the surface may be the above-mentioned sensing surface and/or the above-mentioned surface of the multipurpose electrode. Typical examples of electroactive species are redox mediators, specifically redox couples, such as but not limited to: potassium ferricyanid/potassium ferrocyanide; hexaammineruthenium (II) chloride/hexaammineruthenium (III) chloride; ferrocene methanol. Further typical examples of electroactive species are reducing agents such as but not limited to ascorbic acid, glutathione, lipoic acid, uric acid, oxalic acid, tannins and phytic acid. The electroactive species may facilitate or enhance the measurement of the at least one measurable characteristic of the redox reaction. As used herein, the term electrochemical measurement device may generally refer to an arbitrary device configured to perform at least one electrochemical measurement.

The term "electrochemical measurement device" may generally refer to an arbitrary device configured for performing at least one electrochemical measurement. For this purpose, as will be outlined in further detail and in an exemplary fashion below, the at least one electrochemical measurement device may comprise one or more electrical devices configured for performing the at least one electrochemical measurement. As an example, the electrochemical measurement device may comprise at least one electrical source, such as at least one electrical source selected from the group consisting of: a constant voltage source, a variable voltage source, a constant electrical current source, a variable electrical current source, a frequency generator for generating periodic electrical signals. Further, the electrochemical measurement device may comprise at least one electrical measurement device configured for measuring at least one electrical signal or electrical measurement variable, such as at least one electrical measurement device selected from the group consisting of: a voltage measurement device, a current measurement device, a potentiostat. Other measurement devices are feasible. The field-effect transistor specifically may not be part of the electrochemical measurement device. Thus, in other words, the analyte detector may comprise the field-effect transistor and the electrochemical measurement device as separate devices, consisting of separate components, except for the multipurpose electrode, which may be part of both the field-effect transistor and of the electrochemical measurement device. Thus, generally, the field-effect transistor and the electrochemical measurement device may form separate components of the analyte detector, except for the multipurpose electrode, which may form part of both the field-effect transistor and the electrochemical measurement device. Specifically, the transistor measurement by using the field-effect transistor and the electrochemical measurement by using the electrochemical measurement device may be distinct and separate measurements. The electrochemical measurement may be made without making use of the field-effect transistor.

The electrochemical measurement and/or the field-effect transistor-based measurement may take place in the presence of at least two different species of biorecognition molecules, for instance at least two different species of receptor molecules, namely at least one first receptor molecule and at least one secondary receptor molecule. The first receptor molecule and the secondary receptor molecule may be able to bind the analyte directly or indirectly. The first receptor molecule and the secondary receptor molecule may bind the analyte simultaneously. The secondary receptor molecule may enhance the electrochemical measurement and/or the field-effect transistor-based measurement, for instance by enhancing a signal and/or a selectivity of the electrochemical measurement and/or of the field-effect transistor-based measurement. The secondary receptor may enhance the signal and/or the selectivity on its own. Additionally, or alternatively, the secondary receptor may be labelled with at least one additional molecule, such as but not limited to an enzyme. The secondary receptor may affect or enhance the detection of the analyte by the analyte detector through an interaction with the analyte, e.g., through binding the analyte. The direct or indirect interaction of the secondary receptor with the analyte may affect or enhance the electrochemical measurement and/or the field-effect transistor-based measurement for instance by affecting or enhancing or producing a change in a concentration of a chemical species, such as but not limited to protons and/or electrons. The change in a concentration of a chemical species may correspond to a concentration of the analyte in the fluid sample. Thus, the secondary receptor may contribute to a signal enhancement of the analyte detector.

As outlined above, the electrochemical measurement device is configured for performing the at least one electrochemical measurement by using the at least one multipurpose electrode. Thus, the multipurpose electrode takes part in the electrochemical measurement. As an example, the at least one multipurpose electrode may be in electrical contact with the electrochemical measurement device, such as with the at least one electrical source and/or the at least one electrical measurement device discussed above. The at least one multipurpose electrode may be part of the at least one electrochemical measurement device and/or may be connected to the electrochemical measurement device, such as via at least one electrical connecting element, e.g., via at least one lead.

The multipurpose electrode may be in electrical contact with a gate electrode of the field-effect transistor. In particular, the gate electrode may be in direct or indirect physical contact with at least one channel of the field-effect transistor, specifically with at least one semiconducting layer. There may, for example, be a dielectric layer between the gate electrode and the channel, for instance to avoid leak current. In the case of a liquid-gated field-effect transistor, an ionic double layer may constitute the dielectric layer. In the embodiments just described, the gate electrode is typically in indirect physical contact with the channel of the field-effect transistor, specifically with the at least one semiconducting layer.

The multipurpose electrode may be at least partially identical with at least one element selected from the group of the gate electrode of the field-effect transistor and the channel of the field-effect transistor. The field-effect transistor may comprise at least one channel. Specifically, the at least one channel may be fully or partially made of at least one semiconducting material. A complete field-effect transistor typically comprises a semiconducting channel, metal source, drain and gate electrodes. Specifically, the gate electrode may be replaced by a reference electrode in solution or by a pseudoreference electrode, such as a metal electrode in solution. The semiconducting layer may comprise at least one material selected from the group consisting of: inorganic elemental semiconductors, inorganic compound semiconductors, and organic semiconductors. Specifically, the semiconducting layer may comprise at least one material selected from the group consisting of: graphene, a layered semiconductor, carbon nanotubes, and semiconducting nanowires. Further, the semiconducting layer may comprise at least one surface accessible to the analyte. In particular, the at least one surface accessible to the analyte may be functionalized by metal particles, specifically be metal particles comprising one or more metals selected from the group consisting of: gold and platinum. However, the use of other metals or alloys is also feasible.

The analyte detector may comprise at least one graphene layer interconnecting at least two electrically conductive electrodes, wherein the graphene layer may be accessible to the analyte, wherein the multipurpose electrode may comprise at least one element of the group consisting of: at least one of the at least two electrically conductive electrodes, the graphene layer. As an example, the semiconducting layer comprising, for instance, graphene may be the multipurpose electrode or may be part of the multipurpose electrode. In particular, the graphene layer may be the multipurpose electrode or may be part of the multipurpose electrode. In such an embodiment at least one other electrode, specifically the source and/or the drain electrode, may serve to make contact to the semiconducting layer comprising, for instance to the graphene layer. The graphene layer may be at least partially covered by metal particles, specifically by gold particles.

The at least one multipurpose electrode may be in electrical contact with one or both of a source electrode or a drain electrode of the field-effect transistor. The multipurpose electrode may, for example, comprise the channel of the field-effect transistor. In this embodiment the source electrode and the drain electrode may serve to make contact to the multipurpose electrode. Alternatively, the multipurpose electrode may be fully of partially identical to one or more of: the source electrode; the drain electrode; the gate electrode.

The analyte detector may comprise at least one further electrode exposable to the fluid sample. The at least one further electrode may comprise at least one electrode selected from the group consisting of a counter electrode and a reference electrode, wherein the electrochemical measurement device is configured for performing the at least one electrochemical measurement using the multipurpose electrode and the further electrode. The analyte detector may comprise at least three electrodes exposable to the fluid sample, wherein at least one of the at least three electrodes may be the multipurpose electrode. The multipurpose electrode may comprise gold. In particular, the analyte detector may comprise at least three electrodes, wherein all three electrodes may be gold electrodes. The multipurpose electrode may comprise at least one functional component exposed to its surface, wherein the at least one functional component may be configured for directly or indirectly interacting with the analyte. Further, the functional component may comprise at least one receptor compound, the receptor compound being capable of binding the at least one analyte. Specifically, the receptor compound being capable of binding the at least one analyte may be selected from the group consisting of: antibodies and fragments thereof, aptamers, peptides, enzymes, nucleic acids, receptor proteins or binding domains thereof and hydrophilic polymers capable of mediating a salting-out effect.

In particular, the at least one electrochemical measurement may comprise at least one measurement selected from the group consisting of: a cyclic voltammetry measurement; an impedance measurement; a potentiostatic measurement;

an amperometric measurement; an electrochemical impedance spectroscopy; voltammetry; amperometry; potentiometry; coulometry. As used herein, the term "electrochemical impedance spectroscopy" may generally refer to the measurement of an impedance between the working electrode and the counter electrode as a function of a frequency of an electrical signal applied, such as a voltage and/or current. As further used herein, the term "voltammetry" may generally refer to the measurement of the current between the working electrode and the counter electrode as a function of the voltage applied. As used herein, the term "amperometry" may generally refer to the measurement of the current between working electrode and reference electrode, e.g., as a function of voltage. As used herein, the term "potentiometry" may generally refer to the measurement of the potential difference between the working electrode and the reference electrode. As used herein, the term "coulometry" may generally refer to the determination of the amount of charge produced or consumed during electrolysis. This may, for instance, be done by the measurement of a current between two electrodes, e.g., as a function of time.

Further, the at least one electrochemical measurement device may comprise at least one device selected from the group consisting of: a voltage source, a current source, a voltage meter, a current meter, an impedance meter, an impedance spectrometer, a frequency analyzer, a potentiostat, a frequency generator.

Furthermore, the electrochemical measurement device may be configured for measuring one or more of the following: an absolute value of an impedance between at least two electrodes of the analyte detector as a function of frequency and voltage applied, at least one of the electrodes being the multipurpose electrode; a real part of an impedance between at least two electrodes of the analyte detector as a function of frequency and voltage applied, at least one of the electrodes being the multipurpose electrode; an imaginary part of an impedance between at least two electrodes of the analyte detector as a function of frequency and voltage applied, at least one of the electrodes being the multipurpose electrode; a phase shift between a signal applied to at least one first electrode of the analyte detector and a signal response of at least one second electrode of the analyte detector, at least one of the first and second electrodes being the multipurpose electrode; an electrical current through the multipurpose electrode as a function of a periodic voltage applied to the multipurpose electrode; an electrostatic potential of the multipurpose electrode; an electrical current through the multipurpose electrode; and a voltage between the multipurpose electrode and at least one further electrode, specifically at least one counter electrode and/or at least one reference electrode.

The analyte detector may further comprise at least one controller, wherein the controller may be connected to the field-effect transistor and to the electrochemical measurement device and wherein the controller may be configured for controlling at least one transistor measurement by using the field-effect transistor and for controlling the at least one electrochemical measurement by using the electrochemical measurement device. In particular, the controller may be configured for controlling the at least one transistor measurement by measuring a drain current of the transistor. Furthermore, the controller may be configured for sequentially triggering at least one measurement using the field-effect transistor and the at least one electrochemical measurement. The controller may also be configured for repeatedly performing a sequence of the at least one measurement using the field-effect transistor and the at least one electrochemical measurement.

The analyte detector may further comprise at least one fluid channel, wherein the at least one multipurpose electrode may be disposed to be in contact with the fluid sample within the fluid channel. The fluid channel may comprise at least one fluid inlet for providing the at least one fluid sample to the fluid channel and at least one fluid outlet for disposal of the fluid sample from the fluid channel. In particular, the analyte detector further may comprise at least one external reference electrode being in fluid contact with the fluid channel, specifically at least one Ag/AgCl reference electrode.

The at least one multipurpose electrode may be at least partially covered by a membrane which may be permeable by the analyte. In particular, the membrane may be a polymer membrane. Further, a space in between the membrane and the at least one multipurpose electrode may be at least partially filled by an electrolyte, for example a hydrogel electrolyte.

The at least one transistor may be selected from the group consisting of: an ion-sensitive field-effect transistor (ISFET); a chemically sensitive field-effect transistor (ChemFET); a biological field-effect transistor (BioFET); an enzyme field-effect transistor (ENFET); an extended-gate field-effect transistor (EGFET); a solution-, electrolyte-, water-, or liquid-gated FET.

In accordance with another embodiment, a method for detecting at least one analyte in a fluid sample is disclosed. With respect to definitions and embodiments of the method, reference can be made to definitions and embodiments of the analyte detector described above. The method comprises the following steps:
 a) providing at least one multipurpose electrode;
 b) providing the at least one fluid sample in contact with the multipurpose electrode;
 c) performing at least one transistor measurement by using at least one field-effect transistor in electrical contact with the multipurpose electrode; and
 d) performing at least one electrochemical measurement by using the multipurpose electrode.

In particular, the method may comprise using an analyte detector as described above or as will be further described below. Thus, as outlined above, specifically, the transistor measurement and the electrochemical measurement may be distinct and separate measurements. Specifically, the electrochemical measurement may be made without making use of the field-effect transistor. Specifically, the transistor measurement using the field-effect transistor and the electrochemical measurement, e.g., using the electrochemical measurement device, may be triggered sequentially, e.g., by using the controller. A sequence of the at least one transistor measurement using the field-effect transistor and the at least one electrochemical measurement may be repeatedly performed, e.g., by the controller.

In method step c) at least one transistor measurement value may be generated. Further, in method step d) at least one electrochemical measurement value may be generated. Specifically, the transistor measurement value and electrochemical measurement value may be combined for one or both of quantitatively or qualitatively detecting the at least one analyte in the fluid sample. Furthermore, method step d) may comprise at least one measurement selected from the group consisting of: a voltammetry measurement; an impedance measurement; a potentiostatic measurement; an amperometric measurement; a coulometric measurement.

In accordance with yet another embodiment of the disclosure, a use of the analyte detector as described above or as will be further described below for the qualitative and/or quantitative determination of the at least one analyte in a fluid is disclosed. In particular, said fluid may be selected from the group of fluids consisting of: body fluids, liquid or dissolved environmental samples and solutions of mixtures of chemical compounds. Specifically, said qualitative and/or quantitative determination of the at least one analyte in a fluid may be involved in diagnostic purposes, environmental control, food safety, quality control or manufacturing processes.

The disclosure further provides and proposes a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of method steps c) and d) as indicated above may be performed and/or controlled and/or evaluated by using a computer or a computer network, typically by using a computer program.

The disclosure further provides and proposes a computer program product having program code means, in order to perform the method according to the present disclosure in one or more of the embodiments enclosed herein when the program is executed on a computer or computer network. Specifically, the program code means may be stored on a computer-readable data carrier.

Further, the disclosure provides and proposes a data carrier having a data structure stored thereon, which, after loading into a computer or computer network, such as into a working memory or main memory of the computer or computer network, may execute the method according to one or more of the embodiments disclosed herein.

The disclosure further provides and proposes a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, the disclosure provides and proposes a modulated data signal which contains instructions readable by a computer system or computer network, for performing the method according to one or more of the embodiments disclosed herein.

Typically, referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the present disclosure further provides:
A computer or computer network comprising at least one processor, wherein the processor is adapted to perform the method according to one of the embodiments described in this description;
a computer loadable data structure that is adapted to perform the method according to one of the embodiments described in this description while the data structure is being executed on a computer;
a computer program, wherein the computer program is adapted to perform the method according to one of the embodiments described in this description while the program is being executed on a computer;
a computer program comprising program means for performing the method according to one of the embodiments described in this description while the computer program is being executed on a computer or on a computer network;
a computer program comprising program means according to the preceding embodiment, wherein the program means are stored on a storage medium readable to a computer;
a storage medium, wherein a data structure is stored on the storage medium and wherein the data structure is adapted to perform the method according to one of the embodiments described in this description after having been loaded into a main and/or working storage of a computer or of a computer network; and
a computer program product having program code means, wherein the program code means can be stored or are stored on a storage medium, for performing the method according to one of the embodiments described in this description, if the program code means are executed on a computer or on a computer network.

The analyte detector, the use of the analyte detector and the method for detecting at least one analyte in at least one fluid sample according to the present disclosure presents a variety of advantages over prior art analyte detectors, their use and methods for detecting at least one analyte in at least one fluid sample. Thus, the analyte detector may employ the multipurpose electrode for detecting one and the same analyte via both the transistor-based measurement using the FET and the electrochemical measurement using the electrochemical measurement device. Herein, a measurement range and/or a range of detection may vary between the transistor-based measurement and the electrochemical measurement. Thus, the ability to detect the analyte via the multipurpose electrode with one transistor-based and one electrochemical method may enhance the measurement range of the analyte detector. Specifically, the measurement range of the analyte detector may thus be enhanced by one or even several orders of magnitude. Generally, the present disclosure thus may allow for providing a single device or analyte detector which combines at least two principles of measurement in one and the same device and which may have an extended measurement range over conventional devices providing only one of these principles of measurement.

Furthermore, the ability to detect the analyte via the multipurpose electrode with one transistor-based and one electrochemical method may increase a measurement accuracy of the analyte detector. Specifically, a measurement range and/or a range of detection of the transistor-based and the electrochemical method may at least partially overlap. Thus, an averaging of detection results of the analyte by the analyte detector in at least parts of the overlapping detection ranges may increase a measurement accuracy of the analyte detector. Further, the provision of at least two different measurement methods with at least partially overlapping measuring ranges in one and the same device, i.e., the analyte detector, may serve as a fail-safe and/or back-up mechanism and thus increase reliability of the analyte detector.

Summarizing the findings of the present disclosure, the following embodiments are typical:

Embodiment 1

An analyte detector for detecting at least one analyte in at least one fluid sample, the analyte detector comprising at least one multipurpose electrode exposable to the fluid sample, the analyte detector further comprising at least one field-effect transistor in electrical contact with the at least one multipurpose electrode, the analyte detector further comprising at least one electrochemical measurement device configured for performing at least one electrochemical measurement using the multipurpose electrode.

Embodiment 2

The analyte detector according to the preceding embodiment, wherein the multipurpose electrode is in electrical contact with a gate electrode of the field-effect transistor.

Embodiment 3

The analyte detector according to the preceding embodiment, wherein the gate electrode is in direct or indirect physical contact with at least one channel of the field-effect transistor, specifically with at least one semiconducting layer.

Embodiment 4

The analyte detector according to any one of the preceding embodiments, wherein the multipurpose electrode is at least partially identical with at least one element selected from the group consisting of the gate electrode of the field-effect transistor and a channel of the field-effect transistor.

Embodiment 5

The analyte detector according to any one of the preceding embodiments, wherein the field-effect transistor comprises at least one channel, specifically at least one channel fully or partially made of at least one semiconducting material.

Embodiment 6

The analyte detector according to the preceding embodiment, wherein the semiconducting material comprises at least one material selected from the group consisting of: inorganic elemental semiconductors, inorganic compound semiconductors and organic semiconductors, specifically at least one material selected from the group consisting of: graphene; a layered semiconductor; carbon nanotubes and semiconducting nanowires.

Embodiment 7

The analyte detector according to any one of the two preceding embodiments, wherein the semiconducting material comprises at least one surface accessible to the analyte, wherein the at least one surface is functionalized by metal particles, specifically by metal particles comprising one or more metals selected from the group consisting of: gold and platinum.

Embodiment 8

The analyte detector according to any one of the preceding embodiments, wherein the analyte detector comprises at least one graphene layer interconnecting at least two electrically conductive electrodes, wherein the graphene layer is accessible to the analyte, wherein the multipurpose electrode comprises at least one element of the group consisting of: at least one of the at least two electrically conductive electrodes, the graphene layer.

Embodiment 9

The analyte detector according to the preceding embodiment, wherein the graphene layer is partially covered by metal particles, specifically by metal nano particles, more specifically gold nano particles.

Embodiment 10

The analyte detector according to any one of the preceding embodiments, wherein the at least one multipurpose electrode is in electrical contact with one or both of a source electrode or a drain electrode of the field-effect transistor.

Embodiment 11

The analyte detector according to any one of the preceding embodiments, wherein the analyte detector comprises at least one further electrode exposable to the fluid sample, the at least one further electrode comprising at least one electrode selected from the group consisting of a counter electrode and a reference electrode, wherein the electrochemical measurement device is configured for performing the at least one electrochemical measurement using the multipurpose electrode and the further electrode.

Embodiment 12

The analyte detector according to any one of the preceding embodiments, wherein the analyte detector comprises at least three electrodes exposable to the fluid sample, wherein at least one of the at least three electrodes is the multipurpose electrode.

Embodiment 13

The analyte detector according to any one of the preceding embodiments, wherein the multipurpose electrode comprises gold.

Embodiment 14

The analyte detector according to the preceding embodiment, wherein all three electrodes are gold electrodes.

Embodiment 15

The analyte detector according to any one of the preceding embodiments, wherein the multipurpose electrode comprises at least one functional component exposed to its surface, wherein the at least one functional component is configured for interacting with the analyte.

Embodiment 16

The analyte detector according to the preceding embodiment, wherein the functional component comprises at least one receptor compound, the receptor compound being capable of binding the at least one analyte.

Embodiment 17

The analyte detector according to the preceding embodiment, wherein the receptor compound being capable of binding the at least one analyte is selected from the group consisting of: antibodies and fragments thereof, aptamers, peptides, enzymes, nucleic acids, receptor proteins or binding domains thereof and hydrophilic polymers capable of mediating a salting-out effect.

Embodiment 18

The analyte detector according to any one of the preceding embodiments, wherein the at least one electrochemical measurement comprises at least one measurement selected from the group consisting of: a cyclic voltammetry measurement; an impedance measurement; a potentiostatic measurement; an amperometric measurement; electrochemical impedance spectroscopy; voltammetry; amperometry; potentiometry; coulometry.

Embodiment 19

The analyte detector according to any one of the preceding embodiments, wherein the at least one electrochemical measurement device comprises at least one device selected from the group consisting of: a voltage source, a current source, a voltage meter, a current meter, an impedance meter, an impedance spectrometer, a frequency analyzer, a potentiostat, a frequency generator.

Embodiment 20

The analyte detector according to any one of the preceding embodiments, wherein the electrochemical measurement device is configured for measuring one or more of the following:
  an absolute value of an impedance between at least two electrodes of the analyte detector as a function of frequency and voltage applied, at least one of the electrodes being the multipurpose electrode;
  a real part of an impedance between at least two electrodes of the analyte detector as a function of frequency and voltage applied, at least one of the electrodes being the multipurpose electrode;
  an imaginary part of an impedance between at least two electrodes of the analyte detector as a function of frequency and voltage applied, at least one of the electrodes being the multipurpose electrode;
  a phase shift between a signal applied to at least one first electrode of the analyte detector and a signal response of at least one second electrode of the analyte detector, at least one of the first and second electrodes being the multipurpose electrode;
  an electrical current through the multipurpose electrode as a function of a periodic voltage applied to the multipurpose electrode;
  an electrostatic potential of the multipurpose electrode;
  an electrical current through the multipurpose electrode;
  a voltage between the multipurpose electrode and at least one further electrode, specifically at least one counter electrode and/or at least one reference electrode.

Embodiment 21

The analyte detector according to any one of the preceding embodiments, wherein the analyte detector further comprises at least one controller, wherein the controller is connected to the field-effect transistor and to the electrochemical measurement device and wherein the controller is configured for controlling at least one transistor measurement by using the field-effect transistor and for controlling the at least one electrochemical measurement by using the electrochemical measurement device.

Embodiment 22

The analyte detector according to the preceding embodiment, wherein the controller is configured for controlling the at least one transistor measurement by measuring a drain current of the transistor.

Embodiment 23

The analyte detector according to any one of the two preceding embodiments, wherein the controller is configured for sequentially triggering at least one measurement using the field-effect transistor and the at least one electrochemical measurement.

Embodiment 24

The analyte detector according to the preceding embodiment, wherein the controller is configured for repeatedly performing a sequence of the at least one measurement using the field-effect transistor and the at least one electrochemical measurement.

Embodiment 25

The analyte detector according to any one of the preceding embodiments, wherein the analyte detector further comprises at least one fluid channel, wherein the at least one multipurpose electrode is disposed to be in contact with the fluid sample within the fluid channel.

Embodiment 26

The analyte detector according to the preceding embodiment, wherein the fluid channel comprises at least one fluid inlet for providing the at least one fluid sample to the fluid channel and at least one fluid outlet for disposal of the fluid sample from the fluid channel.

Embodiment 27

The analyte detector according to any one of the two preceding embodiments, wherein the analyte detector further comprises at least one external reference electrode being in fluid contact with the fluid channel, specifically at least one Ag/AgCl reference electrode.

Embodiment 28

The analyte detector according to any one of the preceding embodiments, wherein the at least one multipurpose electrode is at least partially covered by a membrane which is permeable by the analyte.

Embodiment 29

The analyte detector according to the preceding embodiment, wherein the membrane is a polymer membrane.

Embodiment 30

The analyte detector according to any one of the two preceding embodiments, wherein a space in between the membrane and the at least one multipurpose electrode is at least partially filled by an electrolyte, for example a hydrogel electrolyte.

Embodiment 31

The analyte detector according to any one of the preceding embodiments, wherein the at least one field-effect transistor is selected from the group consisting of: an ion-sensitive field-effect transistor (ISFET); a chemically sensitive field-effect transistor (ChemFET); a biological field-effect transistor (BioFET), an enzyme field-effect transistor (EN-FET); an extended-gate field-effect transistor (EGFET); a solution-, electrolyte-, water- or liquid-gated FET.

Embodiment 32

A method for detecting at least one analyte in at least one fluid sample, the method comprising the following steps:
  a) providing at least one multipurpose electrode;
  b) providing the at least one fluid sample in contact with the multipurpose electrode;
  c) performing at least one transistor measurement by using at least one field-effect transistor in electrical contact with the multipurpose electrode; and
  d) performing at least one electrochemical measurement by using the multipurpose electrode.

Embodiment 33

The method according to the preceding embodiment, wherein the method comprises using an analyte detector according to any one of the preceding claims referring to an analyte detector.

Embodiment 34

The method according to any one of the preceding method embodiments, wherein in method step c) at least one transistor measurement value is generated, wherein in method step d) at least one electrochemical measurement value is generated, wherein the transistor measurement value and electrochemical measurement value are combined for one or both of quantitatively or qualitatively detecting the at least one analyte in the fluid sample.

Embodiment 35

The method according to any one of the preceding method embodiments, wherein step d) comprises at least one measurement selected from the group consisting of: a voltammetry measurement; an impedance measurement; a potentiostatic measurement; an amperometric measurement; a coulometric measurement.

Embodiment 36

Use of the analyte detector as defined in any one of the preceding embodiments for the qualitative and/or quantitative determination of the at least one analyte in a fluid.

Embodiment 37

The use of the preceding embodiment, wherein said fluid is selected from the group of fluids consisting of: body fluids, liquid or dissolved environmental samples and solutions of mixtures of chemical compounds.

Embodiment 38

The use of any one of the preceding embodiments of use, wherein said the qualitative and/or quantitative determination of the at least one analyte in a fluid is involved in diagnostic purposes, environmental control, food safety, quality control or manufacturing processes.

Further optional features and embodiments of the disclosure will be provided in more detail in the subsequent description of typical embodiments, typically in conjunction with the dependent claims. Therein, the respective optional features may be realized in an isolated fashion as well as in any arbitrary feasible combination, as the skilled person will realize. The scope of the disclosure is not restricted by the typical embodiments. The embodiments are schematically depicted in the Figures. Therein, identical reference numbers in these Figures refer to identical or functionally comparable elements.

FIGS. 1, 2, 3A and 12A each show an exemplary schematic layout of an analyte detector 110 for detecting at least one analyte in at least one fluid sample 111. The analyte detector 110 comprises at least one multipurpose electrode 112 exposable to the fluid sample 111, at least one field-effect transistor 114 in electrical contact with the at least one multipurpose electrode 112, and at least one electrochemical measurement device 116 configured for performing at least one electrochemical measurement using the multipurpose electrode 112.

The analyte detector 110 may further comprise at least one controller 117. The controller 117 may be connected to the field-effect transistor 114 and to the electrochemical measurement device 116 and may be configured for controlling at least one transistor measurement by using the field-effect transistor 114 and for controlling at least one electrochemical measurement by using the electrochemical measurement device 116. The controller 117, as an example, may be or may comprise at least one computer or processor, e.g., for timing and/or triggering the measurements and/or for reading out and/or evaluating measurement results. The controller may further comprise additional elements, such as one or more of a voltage source, a current source, a voltage measurement device, a current measurement device, a frequency generator or the like, as the skilled person will know when designing electrochemical measurements or transistor measurements.

Figure 2:
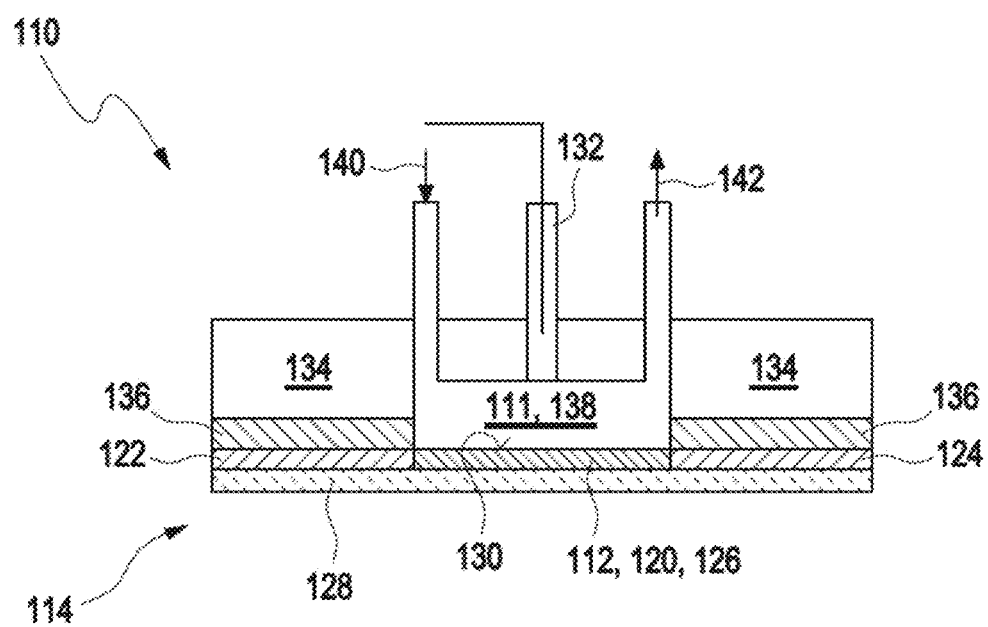
FIG. 2 shows an exemplary schematic layout of an analyte detector in accordance with an embodiment of the present disclosure.
Figure 3:
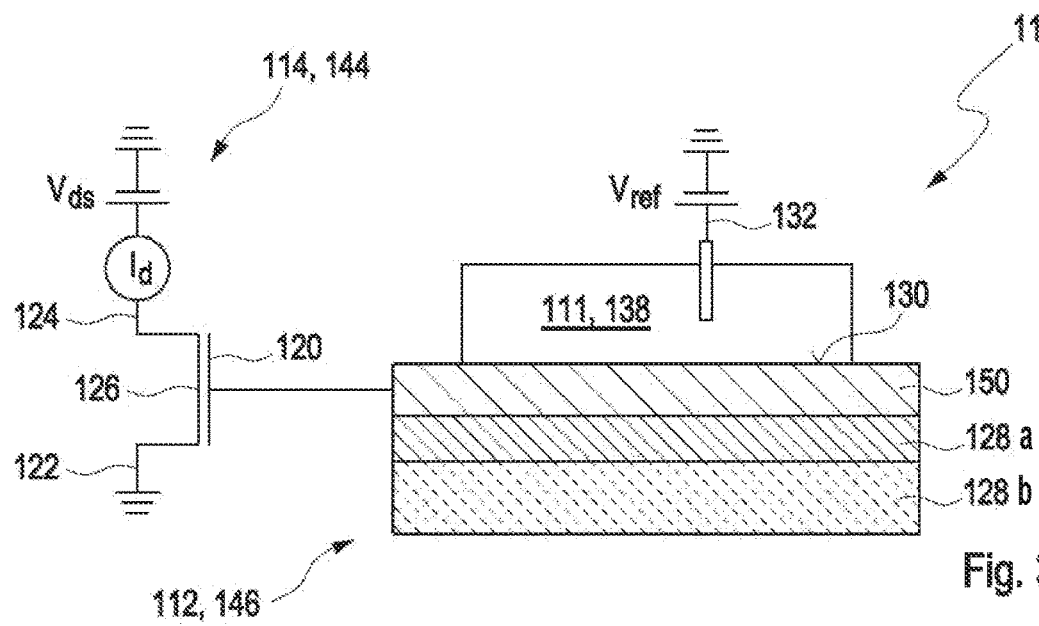
FIG. 3A shows an exemplary schematic layout of an analyte detector in accordance with an embodiment of the present disclosure.
FIGS. 3B and 3C show a measurement diagram (FIG. 3B) recorded with the analyte detector of the type schematically depicted in FIG. 3A plotting a current Id as a function of a voltage Vref and a partial view (FIG. 3C) of the analyte detector of the type schematically depicted in FIG. 3A.
Figure 3:
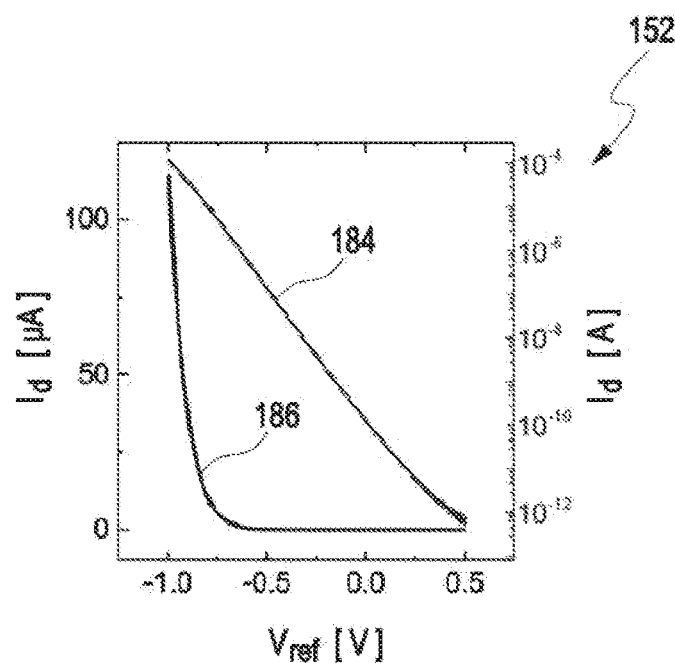
Figure 3:
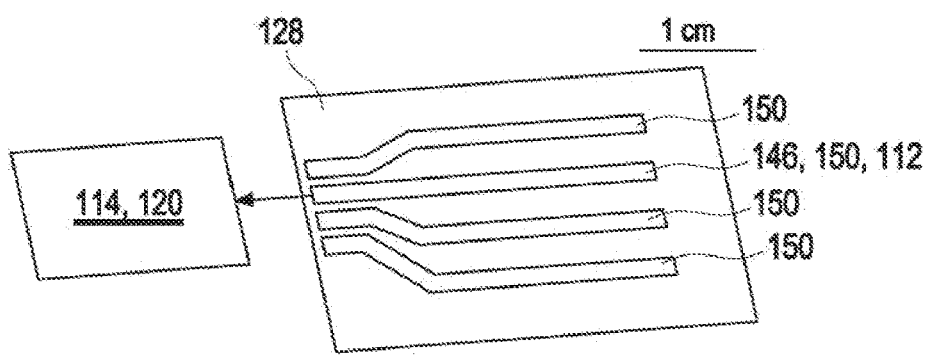
Figure 12:
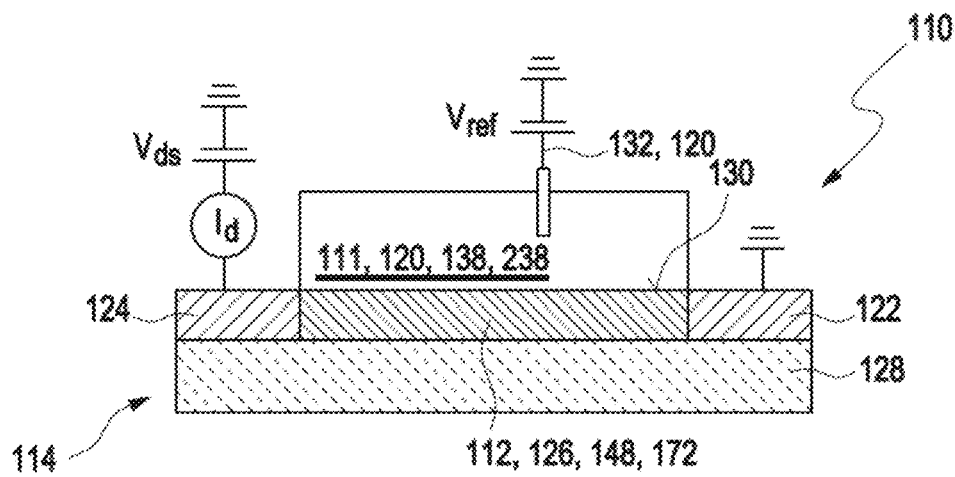
FIGS. 12A-12C show an exemplary schematic layout of an analyte detector (FIG. 12A), a partial view (FIG. 12B) of an analyte detector of the type schematically depicted in FIG. 12A and a diagram of a measurement recorded with the analyte detector of the type schematically depicted in FIG. 12A plotting the drain current Id as a function of the voltage Vref for different pH values (FIG. 12C)
Figure 12:
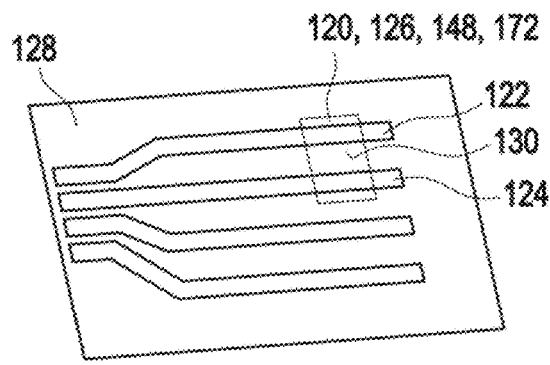
Figure 12:
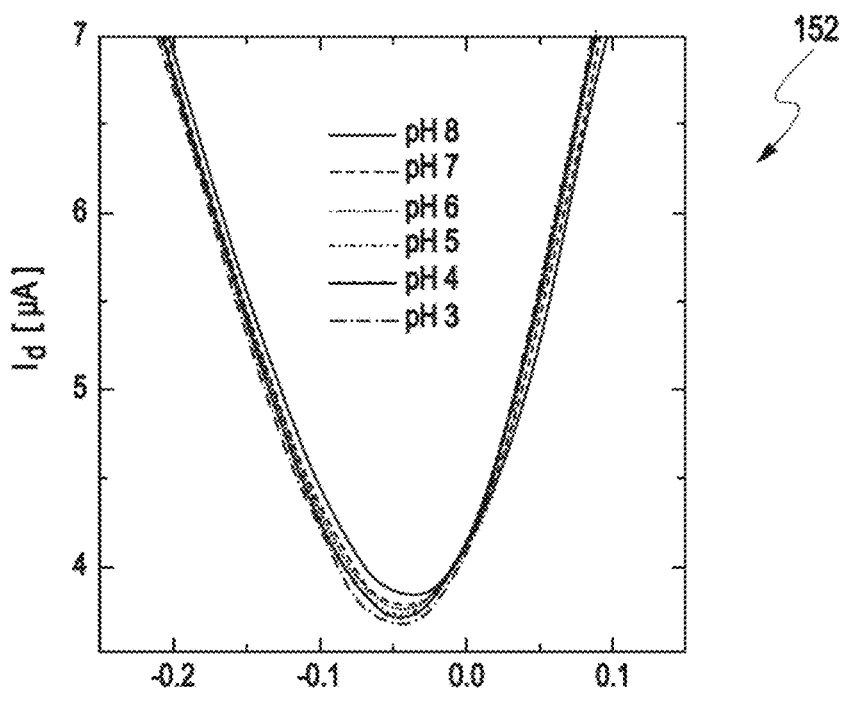
Figure 14:
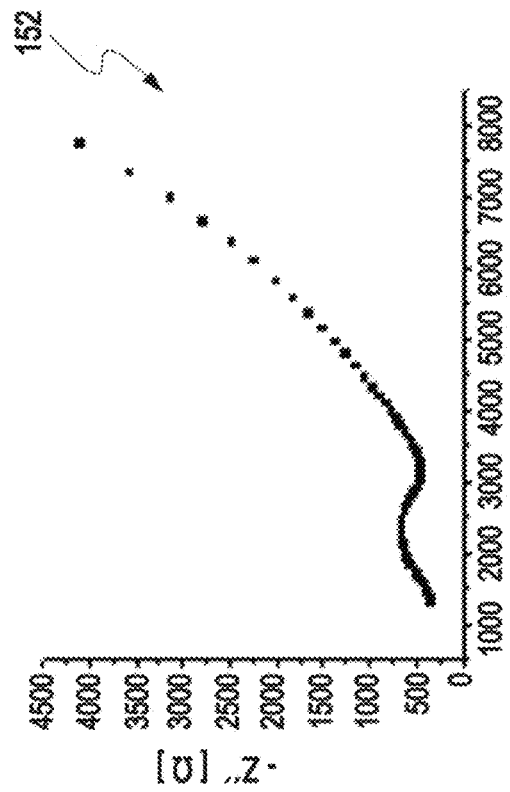
FIGS. 14A-14D show four diagrams of measurements plotting a current ICV as a function of a potential V applied (FIG. 14A), plotting the negative imaginary part of the impedance Z'' versus the real part of the impedance Z' (FIG. 14B), plotting a current Id versus a potential Vg (FIGS. 14C and 14D)

As shown in FIG. 1, the analyte detector 110 may be configured for performing at least one electrochemical measurement and/or at least one field-effect transistor-based measurement. The multipurpose electrode 112 may be in electrical contact with a gate electrode 120 of the field-effect transistor 114 as shown in FIG. 3A. As shown in FIGS. 2, 3A and 12A, the field-effect transistor 114 may further comprise at least one source electrode 122, at least one drain electrode 124 and at least one channel 126.

The field-effect transistor 114 may be selected from the group consisting of: an ion-sensitive field-effect transistor (ISFET); a chemically sensitive field-effect transistor (ChemFET); a biological field-effect transistor (BioFET); an enzyme field-effect transistor (EN-FET); an extended-gate field-effect transistor (EGFET) 144 as shown in FIG. 3A; and a solution-, electrolyte-, water- or liquid-gated FET as shown in FIGS. 2 and 12A. The gate electrode 120 and the drain electrode 124 may comprise gold. The analyte detector 110 may further comprise a substrate 128 as shown in FIGS. 1, 2, 3A, 3C, 12A and 12B. The substrate 128 may comprise at least one element of the group consisting of glass, plastic, paper and silicon. The substrate 128 may comprise at least two layers (128a, 128b) as shown in FIG. 3A.

Figure 15:
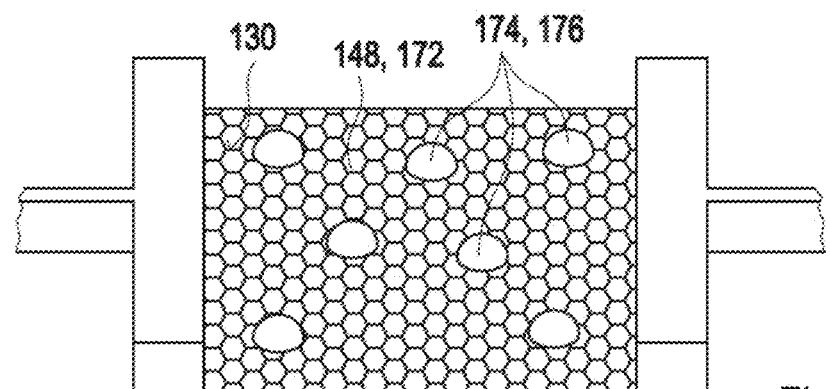
FIGS. 15A-15C show a schematic view of a graphene surface functionalized with metal particles (FIG. 15A), a scanning electron microscopy (SEM) image of a graphene surface functionalized with metal particles by physical adsorption over night (FIG. 15B) and functionalized with metal particles by electrodeposition for five minutes.
Figure 15:
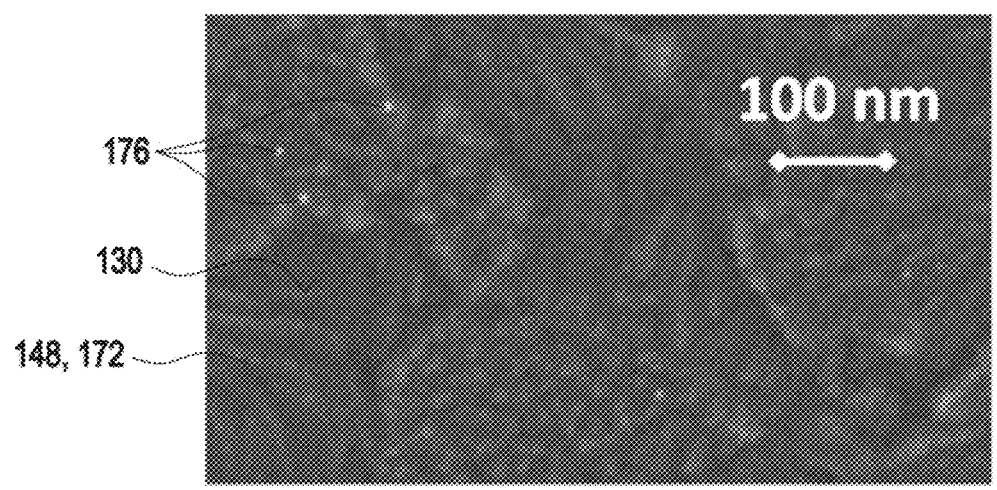
Figure 15:
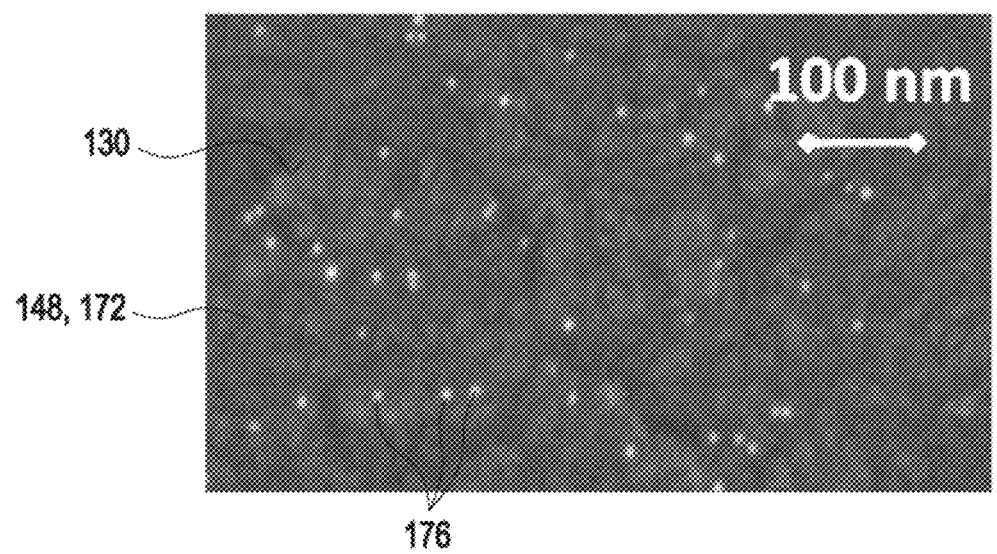

The channel 126 may be fully or partially made of at least one semiconducting material. Specifically, the channel 126 may comprise at least one semiconducting layer 148, as shown in the liquid-gated FET depicted in FIG. 12A. The semiconducting material, specifically the semiconducting layer 148, may comprise at least one material selected from the group consisting of: inorganic elemental semiconductors, inorganic compound semiconductors and organic semiconductors, specifically at least one material selected from the group consisting of graphene, a layered semiconductor, carbon nanotubes and semiconducting nanowires. The semiconducting layer 148 may comprise at least one surface 130 accessible to the analyte. The at least one surface 130 may be functionalized by metal particles, specifically by metal particles comprising one or more metals selected from the group consisting of gold and platinum, as shown in FIGS. 15A, 15B and 15C. Other metals or alloys are possible.

The gate electrode 120 may be in direct or indirect physical contact with the at least one channel 126 of the field-effect transistor 114, as shown in FIG. 3A. The multipurpose electrode 112 may be at least partially identical with the extended gate electrode 146 of the field-effect transistor 114, as depicted in FIG. 3A. Additionally or alternatively, the multipurpose electrode 112 may be at least partially identical with the channel 126 and/or the gate electrode 120 of the field-effect transistor 114 as, e.g., shown in FIGS. 2 and 12A.

In FIG. 2, an exemplary embodiment of the analyte detector 110 is shown in a partial view. The electrochemical measurement device 116 and the optional controller 117 are not shown in this Figure. As shown in FIG. 2, the analyte detector 110 may further comprise a chamber 134. The chamber 134 may comprise or consist of polydimethylsiloxane (PDMS). Other materials, specifically other plastic materials, are feasible. As also shown in FIG. 2, the analyte detector 110 may further comprise a passivation layer 136. The passivation layer 136 may comprise SU-8. SU-8 is a negative, epoxy-type, near-UV photoresist based on EPON SU-8 epoxy resin (from Shell Chemical) that has been originally developed, and patented (U.S. Pat. No. 4,882,245) by IBM. Other materials, specifically other photoresists, are feasible. As depicted in FIGS. 1, 2, 3A and 12A, the analyte detector 110 may comprise at least one fluid channel 138. The multipurpose electrode 112 may be disposed to be in contact with the fluid sample 111 within the fluid channel 138. The fluid channel 138 may further comprise at least one fluid inlet 140 for providing the at least one fluid sample 111 to the fluid channel 138 and at least one fluid outlet 142 for disposal of fluid sample 111 as shown in FIGS. 1 and 2. The analyte detector 110 may further comprise at least one external reference electrode 132, specifically at least one Ag/AgCl reference electrode, which may be in fluid contact with the fluid channel 138 as depicted in FIGS. 2 and 12A. The fluid channel 138 and/or the fluid inlet 140 and/or the fluid outlet 142 may be at least partially confined by a plastic material, specifically polytetrafluorethylene (PTFE). Other materials are feasible, specifically other plastic materials.

FIG. 3A shows an analyte detector 110 with the field-effect transistor 114 implemented as an extended-gate field-effect transistor 144. Again, the electrochemical measurement device 116 and the optional controller 117 are not shown in this Figure. The extended-gate field-effect transistor 144 may comprise an extended gate electrode 146. The extended gate electrode 146 may comprise a substrate 128. The substrate 128 may comprise at least one material selected from the group consisting of glass, plastic, paper and silicon. The extended-gate field-effect transistor 144 may be integrated together with the extended gate electrode 146 on the same substrate 128. As depicted in FIG. 3A, the extended gate electrode 146 may comprise gold, in particular a gold layer 150. The gold layer 150 may be exposable to the fluid sample 111. Additionally, or alternatively, the extended gate electrode may also comprise other metals and/or semiconducting materials including graphene, which may have a surface 130 exposable to the fluid sample 111.

The multipurpose electrode 112 may comprise gold, as shown in FIG. 3A. The analyte detector 110 may comprise at least one further electrode comprising at least one electrode selected from the group consisting of a counter electrode 168 and a reference electrode 132, wherein the electrochemical measurement device 116 may be configured for performing the at least one electrochemical measurement using the multipurpose electrode 112 and the further electrode. The analyte detector 110 may comprise at least three electrodes exposable to the fluid sample 111, wherein at least one of the at least three electrodes is the multipurpose electrode 112. All three electrodes may be gold electrodes.

The analyte detector 110 may further comprise a reference electrode 132, in particular an Ag/AgCl electrode. Other combinations are feasible.

FIG. 3B shows a measurement diagram 152 recorded with the analyte detector 110 of the type schematically depicted in FIG. 3A plotting a current $I_d$ as a function of a voltage $V_{ref}$. The voltage $V_{ref}$ may also be denoted by $V_g$. Thus, $V_{ref}$ and $V_g$ are used synonymously throughout the Figures and the description of the embodiments. The current $I_d$ is plotted once using a y-axis with a linear scale (y-axis on the left-hand side of diagram 152 in FIG. 3B) and once using a y-axis with a logarithmic scale (y-axis on the right-hand side). The graph relating to the y-axis on the left-hand side is denoted by 186. The graph relating to the y-axis on the right-hand side is denoted by 184. As can be seen from FIG. 3B, the drain current $I_d$ varies as a function of the potential $V_{ref}$ of the reference electrode 132 in a non-linear fashion. FIG. 3C shows a partial view of the analyte detector 110 of the type schematically depicted in FIG. 3A comprising an extended gate electrode 146 as part of an extended-gate field-effect transistor 144. The extended gate electrode 146 shown in FIG. 3C comprises gold, in particular a gold layer 150. The gold layer 150 is exposable to the fluid sample 111. The extended gate electrode 146 as shown in FIG. 3C further comprises a substrate 128 carrying the gold layer 150. The substrate 128 has three further gold layers 150 that may serve as further electrodes. The further electrodes may serve as control electrodes. The further electrodes may be used as additional multipurpose electrodes 112. The multipurpose electrodes 112 and the at least one additional multipurpose electrode 112 may all be functionalized in the same way. The at least two multipurpose electrodes 112 functionalized in the same way may be used to enhance a precision of the field-effect transistor-based measurement. Alternatively, the at least two multipurpose electrodes 112 may be functionalized in the different ways, for example to allow a reference measurement. The extended gate electrode 146 shown in FIG. 3C is in electrical contact with the channel 126 of the field-effect transistor 114. The extended-gate electrode FET 144 partially shown in FIG. 3C further comprises a source electrode 122 (not shown) and a drain electrode 124 (not shown).

Figure 4:
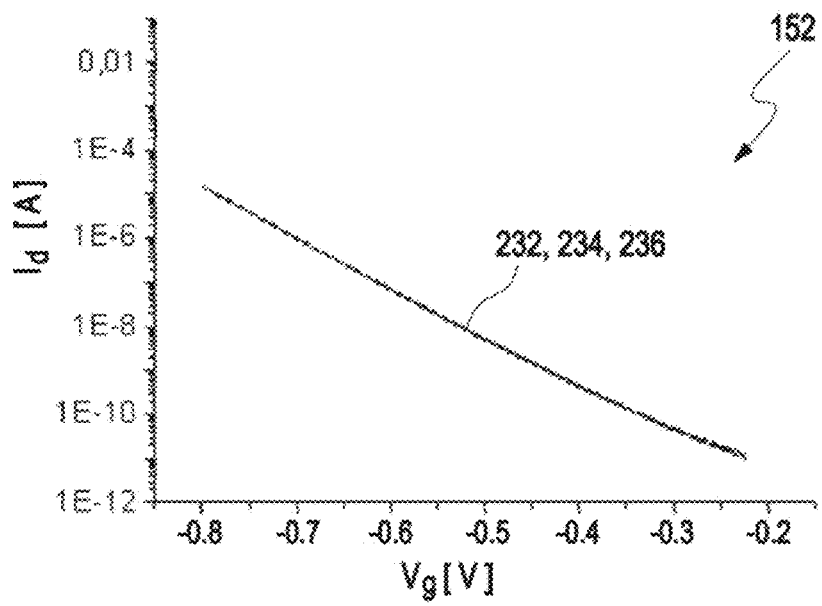
FIGS. 4A-4C show measurement diagrams plotting the current Id as a function a voltage Vg (FIGS. 4A and B) and plotting a magnitude of an impedance Z on a logarithmic scale and a phase shift angle θ as a function of a frequency of an alternating voltage (FIG. 4C)
Figure 4:
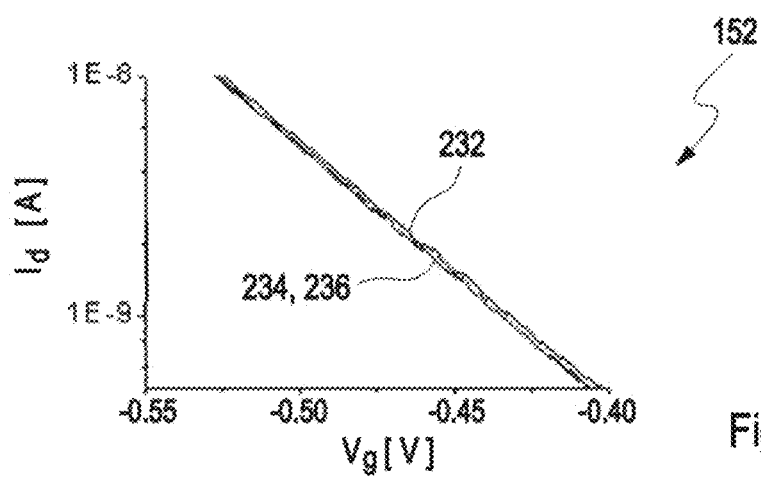
Figure 4:
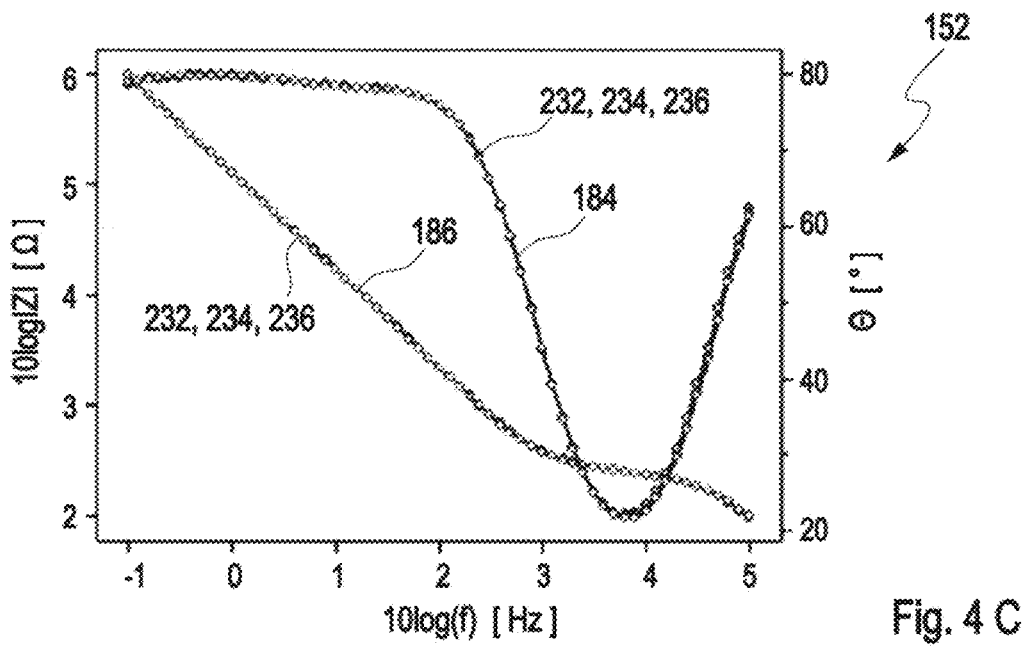

FIGS. 4A, 4B and 4C show measurement diagrams 152 recorded with the analyte detector 110 of the type depicted in FIGS. 3A and 3C. FIGS. 4A and 4B show measurement diagrams 152 recorded in a field-effect transistor-based measurement plotting the drain current $I_d$ as a function of the gate voltage $V_g$ for three different measurements corresponding to 0 minutes (232), 5 minutes (234) and 10 minutes (236) of incubation in MES (2-(N-morpholino)ethanesulfonic acid) buffer. In FIGS. 4A and 4B, for the most part the three graphs of the three different measurements overlap, being indistinguishable or hardly distinguishable from one another. FIGS. 4A and 4B each show a stable and reproducible baseline in buffer for the field-effect transistor-based measurement. FIG. 4C is a measurement diagram 152 of an electrochemical measurement plotting a magnitude of an impedance Z (y-axis on the left-hand side 186) and a phase shift angle θ (y-axis on the right-hand side 184) as a function of frequency f of an alternating voltage for three different measurements corresponding to 0 minutes (232), 5 minutes (234) and 10 minutes (236) of incubation in buffer. The measurement diagram 152 shows three impedance measurements and three phase shift angle θ measurements. Again, both for the impedance and for the phase shift measurement, for the most part the three graphs of the three different measurements overlap, being indistinguishable or hardly distinguishable from one another.

Figure 5:
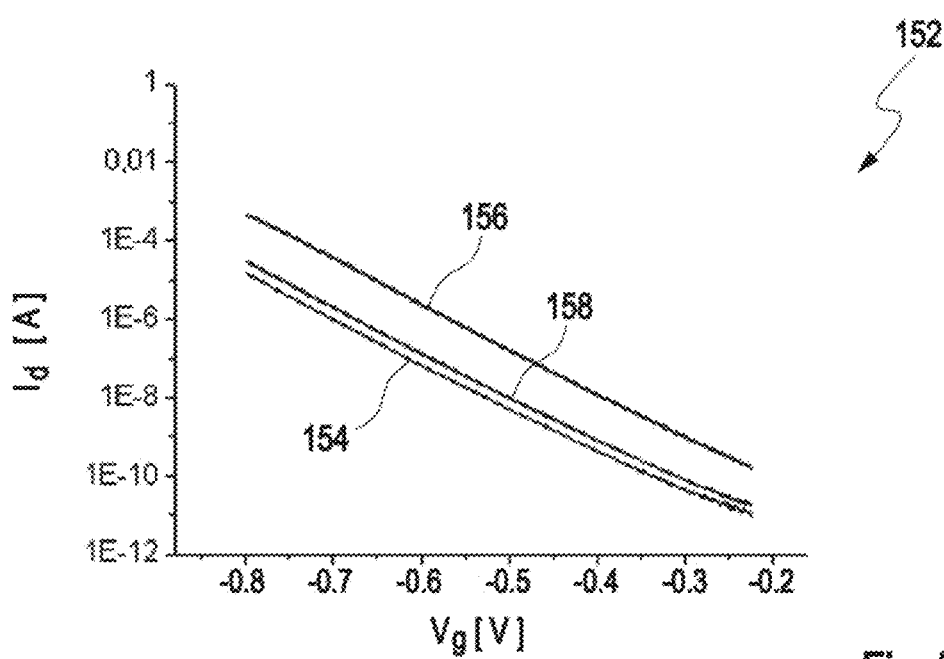
FIG. 5 shows a measurement diagram plotting the current Id as a function of the voltage Vg for three different measuring situations.
Figure 7:
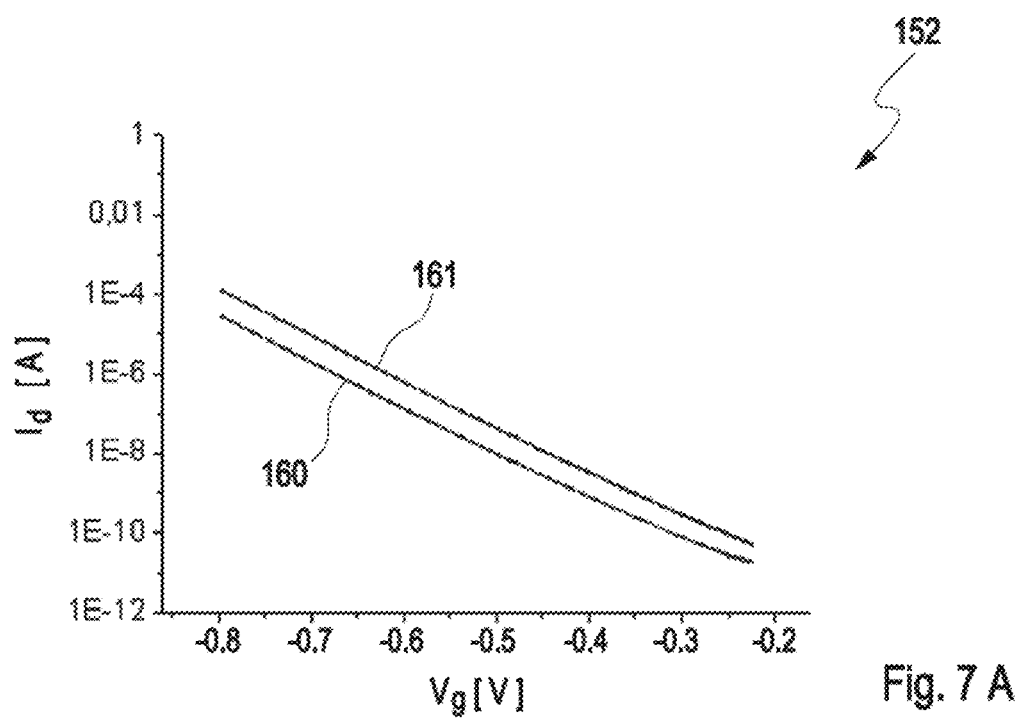
FIGS. 7A and 7B show measurement diagrams plotting the current Id as a function of the voltage Vg (FIG. 7A) and plotting the magnitude of the impedance Z and the phase shift angle as a function of the frequency of the alternating current (FIG. 7B) for two different measuring situations each.
Figure 7:
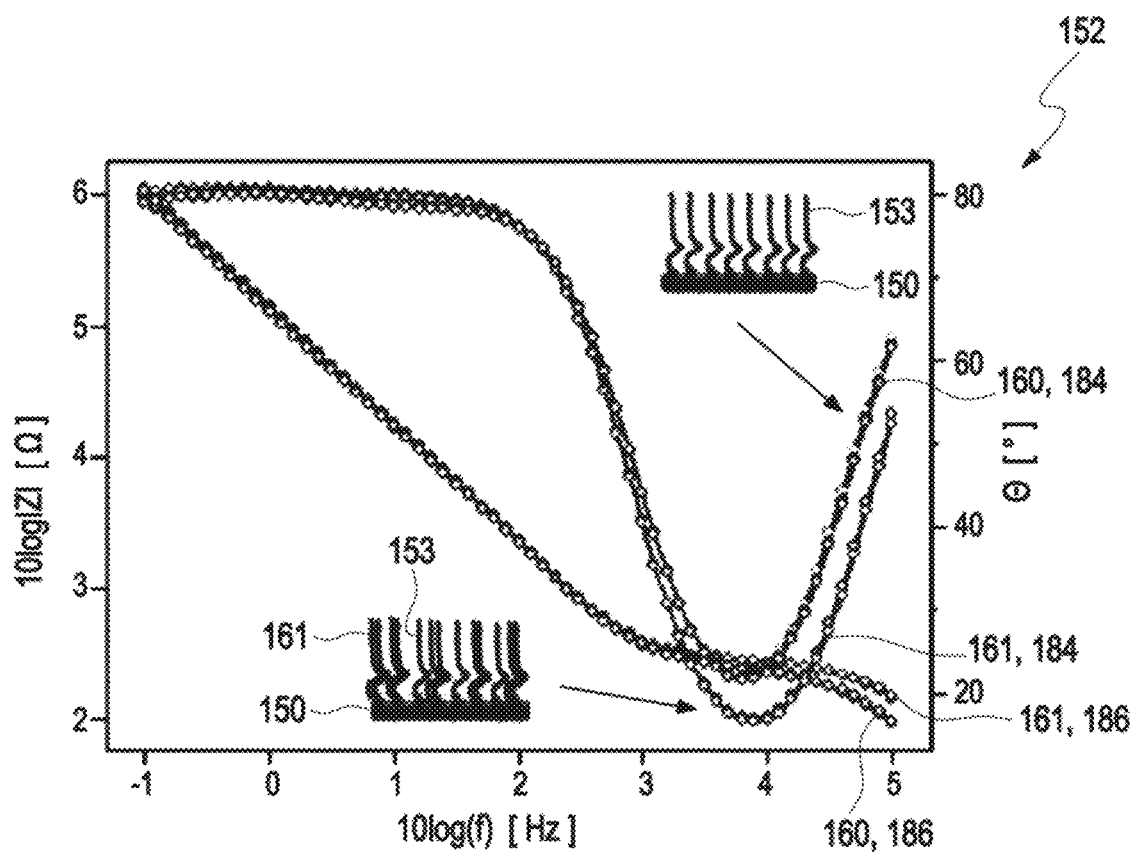
Figure 9:
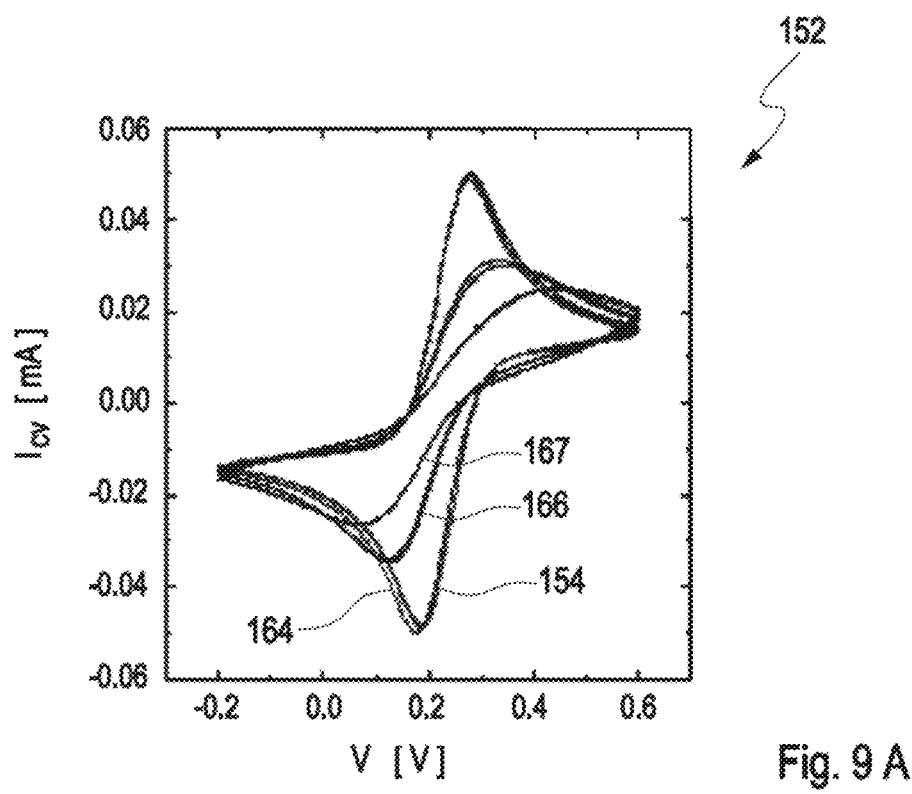
FIGS. 9A-9C show measurement diagrams plotting a current as a function of a potential (FIG. 9A) and a reactance versus a resistance (FIG. 9B) for four different measuring situations including the presence of TSH-specific antibodies and a schematic view of a surface modified with TSH-specific antibody binding TSH (FIG. 9C)
Figure 9:
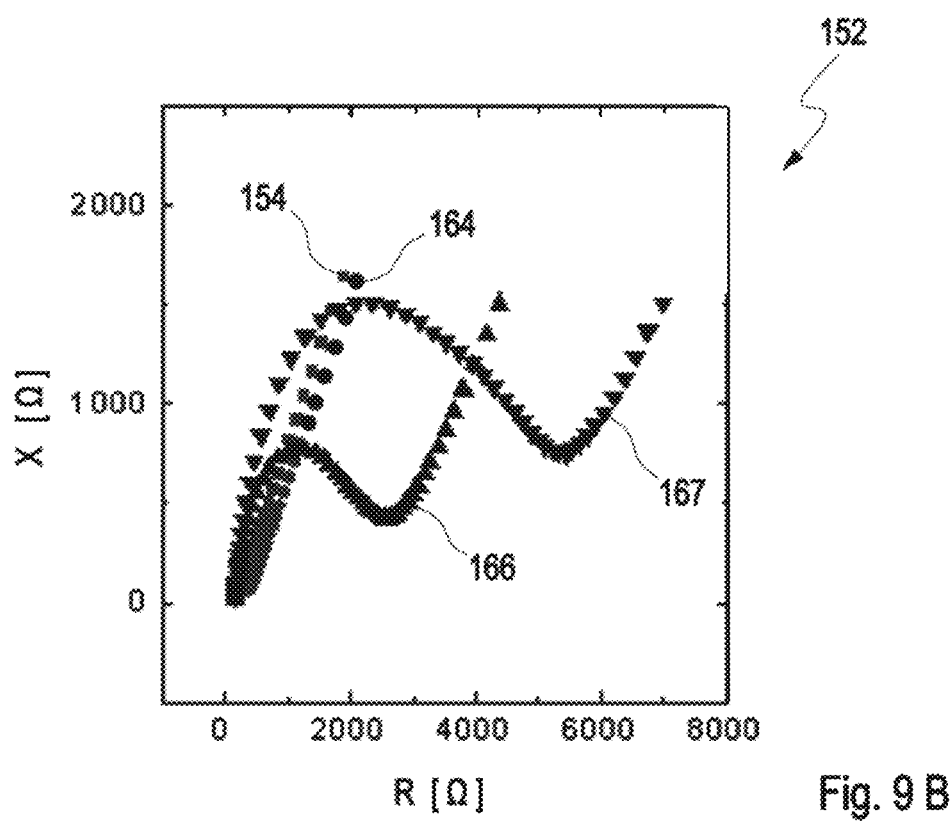
Figure 9:
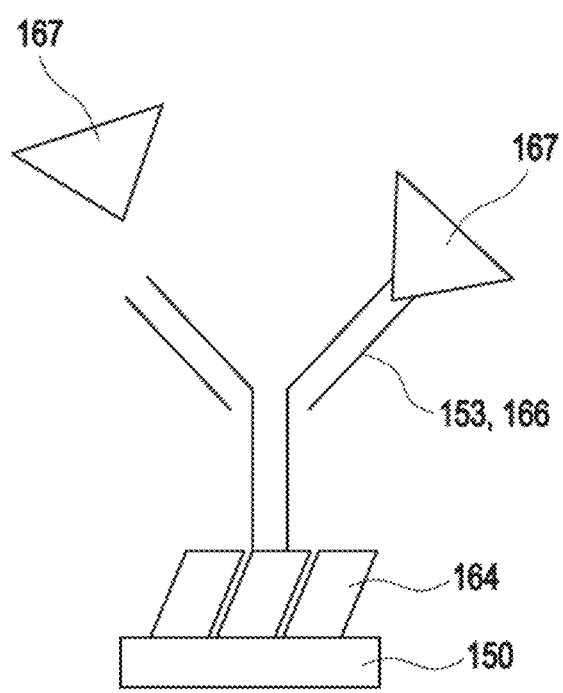

The multipurpose electrode 112 may comprise at least one functional component 153 exposed to its surface 155, as shown in FIGS. 7B and 9C, wherein the at least one functional component 153 may be configured for interacting with the analyte. The functional component 153 may comprise at least one receptor compound being capable of binding the at least one analyte. The receptor compound being able of detecting the at least one analyte may be selected from the group consisting of: antibodies and fragments thereof, aptamers, peptides, enzymes, nucleic acids, receptor proteins or binding domains thereof and hydrophilic polymers capable of mediating a salting out effect. FIG. 5 shows a measurement diagram 152 displaying data recorded with an analyte detector 110 comprising an extended-gate field-effect transistor 144 comprising an extended gate electrode 146 that has a gold layer 150 exposable to the fluid sample 111. In this case the multipurpose electrode 112 may comprise the extended gate electrode 146 comprising the gold layer 150. FIG. 5 shows a field-effect transistor-based measurement plotting the drain current $I_d$ versus the gate voltage $V_g$ for three different measurement situations, namely using an extended gate electrode 146 with gold layer 150 of bare gold 154, using an extended gate electrode 146 with a gold layer 150 after immobilization of double stranded DNA 156 on the gold layer 150 and using an extended gate electrode 146 with a gold layer 150 after dehybridization of the double stranded DNA 158 on the gold layer 150. As can be seen in FIG. 5, the field-effect transistor-based measurement can clearly distinguish between the presence of double stranded DNA molecules on the extended gate electrode 146 (graph 156) and single stranded DNA molecules on the extended gate electrode 146 after dehybridization (graph 158).

Figure 6:
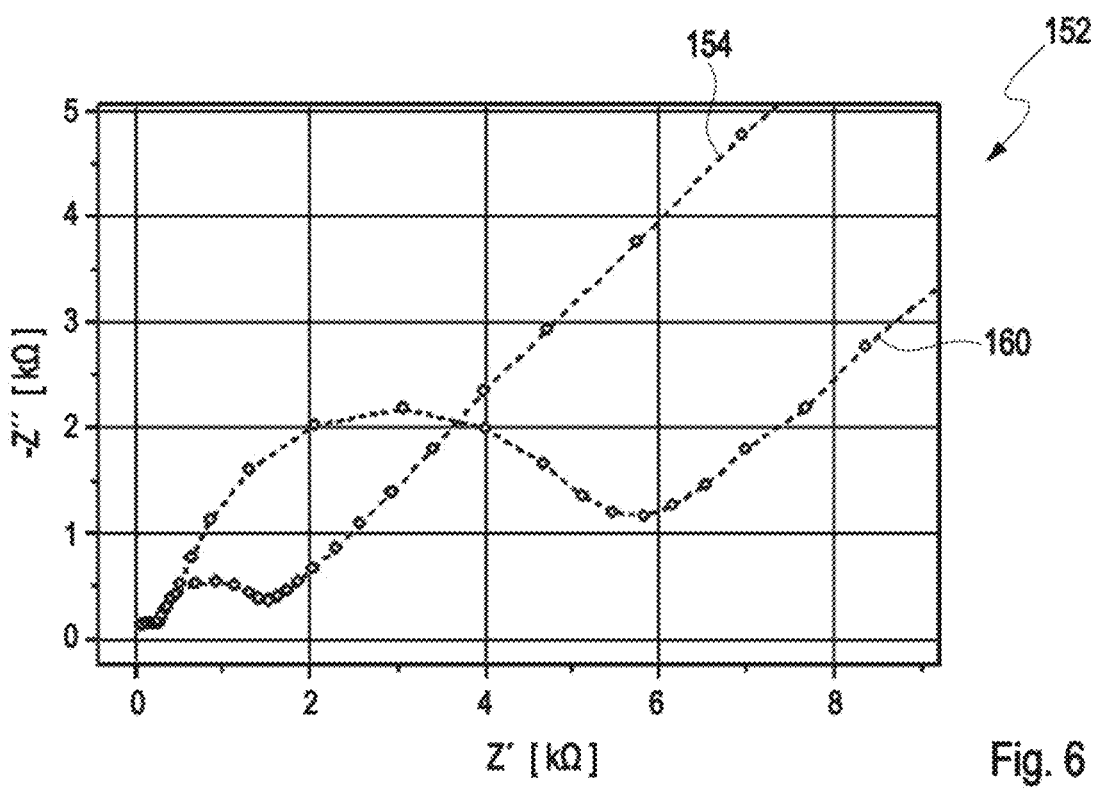
FIG. 6 shows a measurement diagram plotting the negative imaginary part of the impedance Z'' versus the real part of the impedance Z' for two different measuring situations.

The analyte detector 110 may also be used for an electrochemical measurement, for example for an impedance measurement that may be able to distinguish between the presence of single stranded DNA (graph 160) and absence of single stranded DNA (graph 154) on the gold layer 150 of the multipurpose electrode 112 as can be seen in the measurement diagram 152 in FIG. 6. The measurement diagram 152 in FIG. 6 plots the negative imaginary part of the impedance Z" versus the real part of the impedance Z' for the two different measuring situations just described.

FIGS. 7A and 7B illustrate again the ability of the analyte detector 110 to distinguish between the presence of single stranded DNA 160 and the presence of double stranded DNA 161 both in a field-effect transistor-based measurement (FIG. 7A) and in an electrochemical measurement (FIG. 7B). FIG. 7A shows a measurement diagram 152 plotting the drain current $I_d$ versus the gate voltage $V_g$ for two different measuring situations, namely the presence of single stranded DNA 160 as probe DNA on the gold layer 150 of the extended gate electrode 146 of the extended-gate field-effect transistor 144 and the presence of double stranded DNA 161 as a result of hybridization of single stranded probe DNA with single stranded target DNA after the addition of 1 μM of single stranded target DNA. Thus, in this example, the single stranded probe DNA serves as the functional component 153. FIG. 7B plots the magnitude of the impedance Z and the phase shift angle θ as a function of the frequency f of the alternating voltage for the same two measuring situations as just described. The two graphs corresponding to the phase shift angle θ in the presence of single stranded DNA 160 and in the presence of double stranded DNA 161 are clearly distinguishable from one another.

Figure 8:
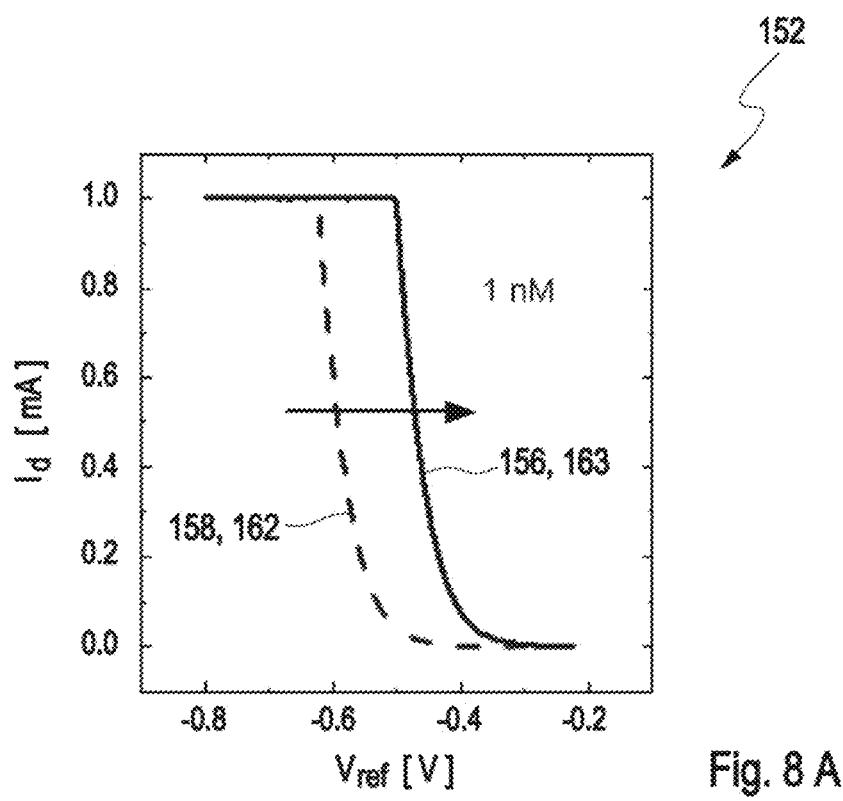
FIGS. 8A and 8B show measurement diagrams plotting the current Id as a function of the voltage Vref (FIG. 8A) in the absence and presence of a target DNA and plotting a potential shift as a function of a target DNA concentration in two different buffer concentrations (10 mM and 100 mM, FIG. 8B)
Figure 8:
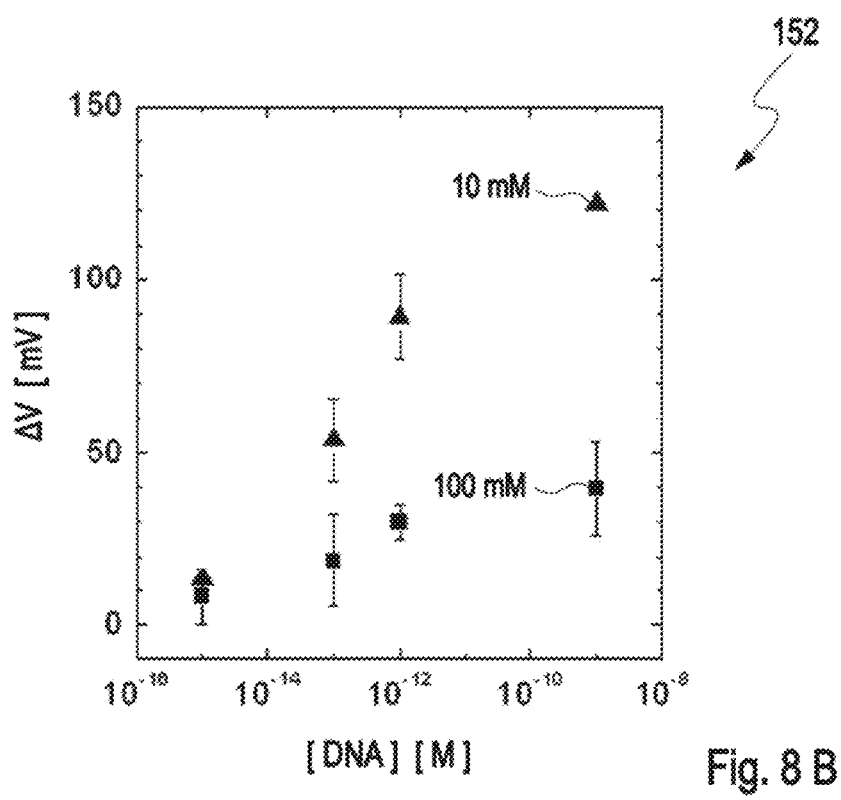

FIGS. 8A and 8B show measuring diagrams 152 based on field-effect transistor-based measurements using an extended-gate field-effect transistor 144 with an extended gate electrode 146 comprising a gold layer 150 with single stranded probe DNA immobilized on the gold layer 150. FIG. 8A plots the drain current $I_d$ as a function of the potential $V_{ref}$ of the reference electrode 132 in the presence of 1 nM target DNA 163 and in the absence of target DNA 162. The field-effect transistor-based measurement is clearly able to detect a potential shift ΔV in the presence of target DNA 160 as indicated by the arrow. FIG. 8B plots a potential shift ΔV as a function of target DNA concentration for two different ionic strengths of buffer solution (10 mM and 100 mM). The size of the potential shift ΔV increases with increasing target DNA concentration and with increasing Debye length in lower ionic strength buffer.

FIG. 9A and FIG. 9B show measurement diagrams 152 based on electrochemical measurements carried out using the electrochemical measurement device 116 of the analyte detector 110 comprising a multipurpose electrode 112 with a gold layer 150 modified with an aminothiophenol monolayer 164 carrying an anti-TSH antibody, where TSH stands for thyroid stimulating hormone. FIG. 9A shows a cyclic voltammetry measurement plotting a current $I_{cv}$ between the multipurpose electrode 112 and the counter electrode 168 as a function of the voltage V applied for four different measuring situations, namely with the gold layer 150 of the multipurpose electrode 112 being either bare gold 154 or gold covered with an aminothiophenol monolayer 164, or gold covered with an aminothiophenol monolayer 164 being additionally modified with anti TSH antibodies 166 or in the additional presence of 1 pM of TSH 167 in 50 mM MES buffer (pH=7).

Figure 19:
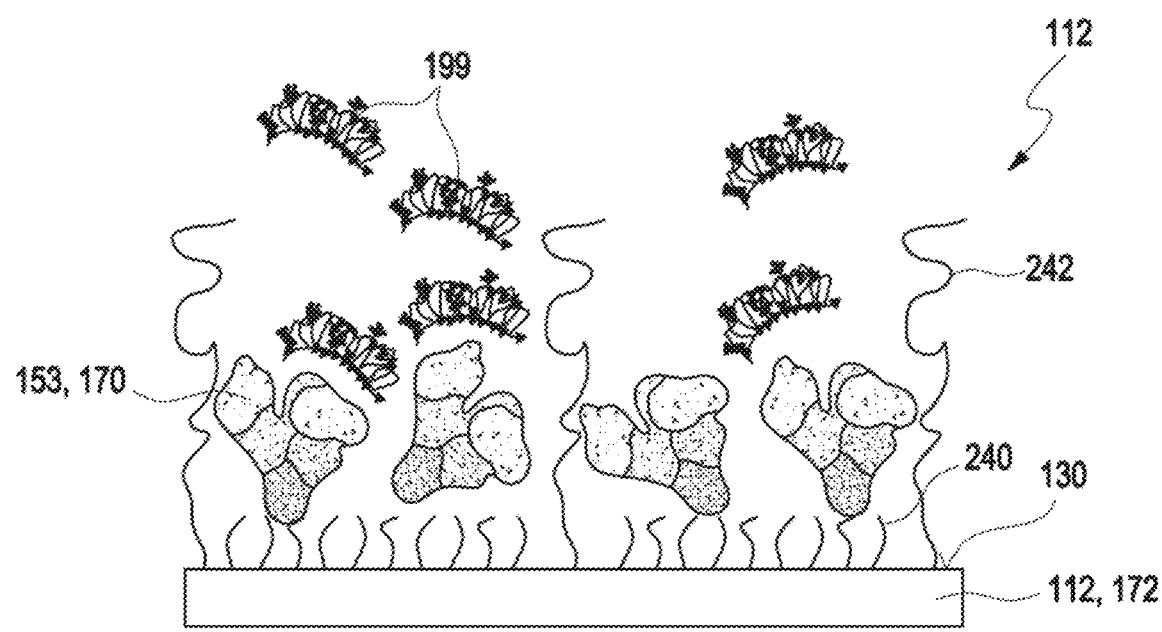
FIGS. 19A-19C show an embodiment of the multipurpose electrode 112 that may be used for field-effect transistor-based measurements shown in FIGS. 19B and 19C.
Figure 19:
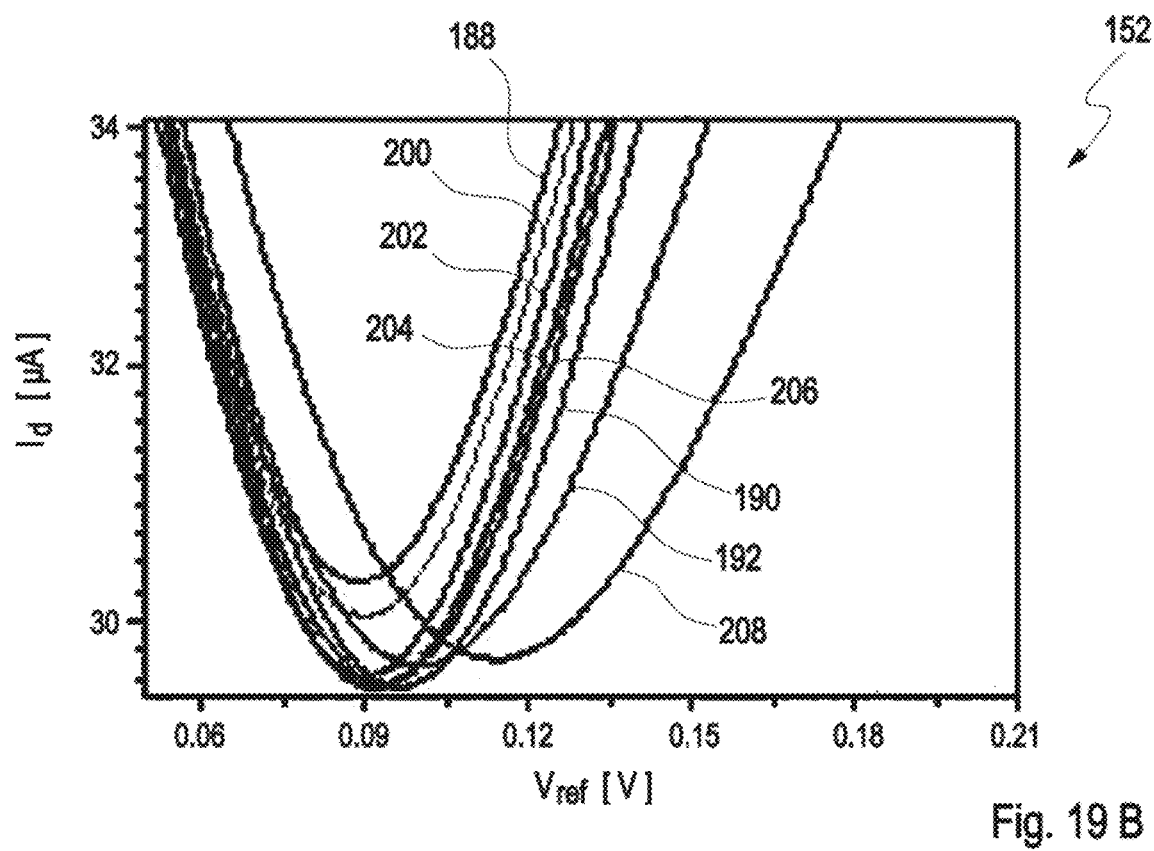
Figure 19:
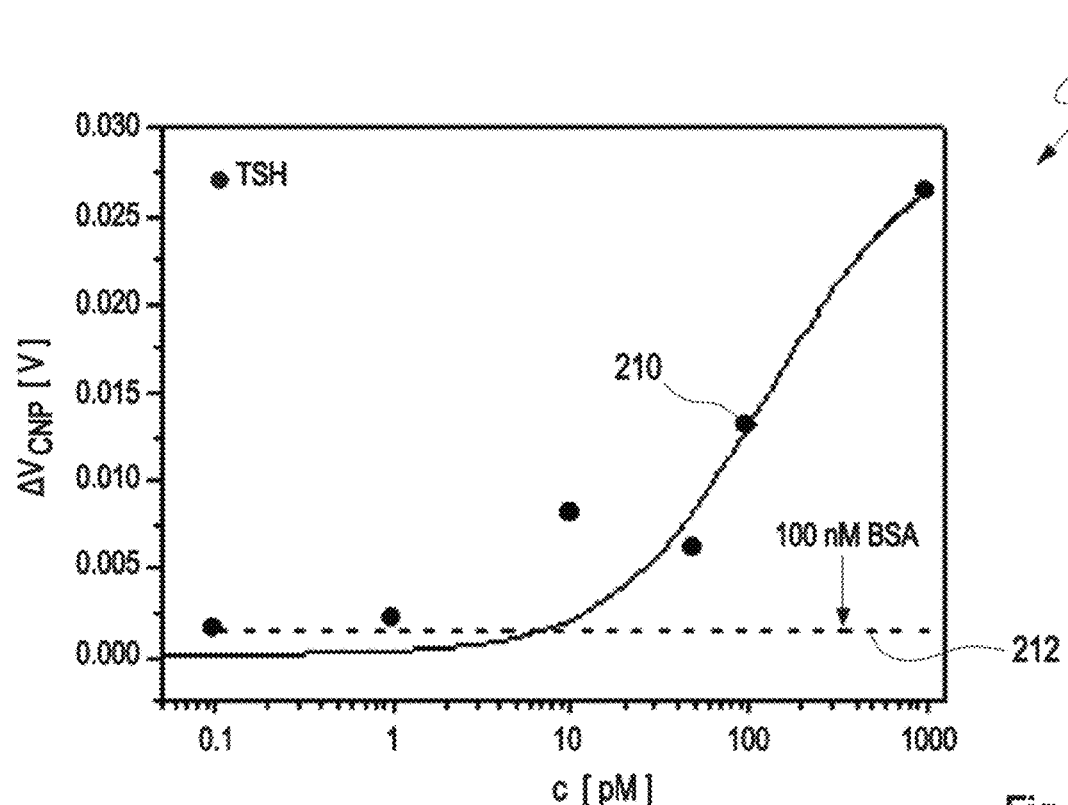

FIG. 9B plots the reactance X, i.e., the imaginary part of the impedance Z, versus the resistance R, i.e., the real part of the impedance Z, for the same four measuring situations as just described for FIG. 9A. Both the cyclic voltammetry measurement shown in FIG. 9A and the impedance measurement shown in FIG. 9B show that the analyte detector 110 may be able to detect as little as 1 pM of TSH, demonstrating a potential high sensitivity of the analyte detector 110 and its potential use in medical applications. FIG. 9C shows a schematic view of the layered modifications of the multipurpose electrode 112 as used in the electrochemical measurements of FIGS. 9A and 9B, comprising the anti-TSH antibody 166 as the functional component 153. Specifically, the anti-TSH antibodies that are used and/or described in this experiment or other experiments or in this embodiment or in other embodiments, specifically in FIGS. 11, 19 and 20, may be anti-TSH F(ab')2-fragments of an anti-TSH antibody that may also be denoted as anti-TSH F(ab')2 fragments.

Figure 10:
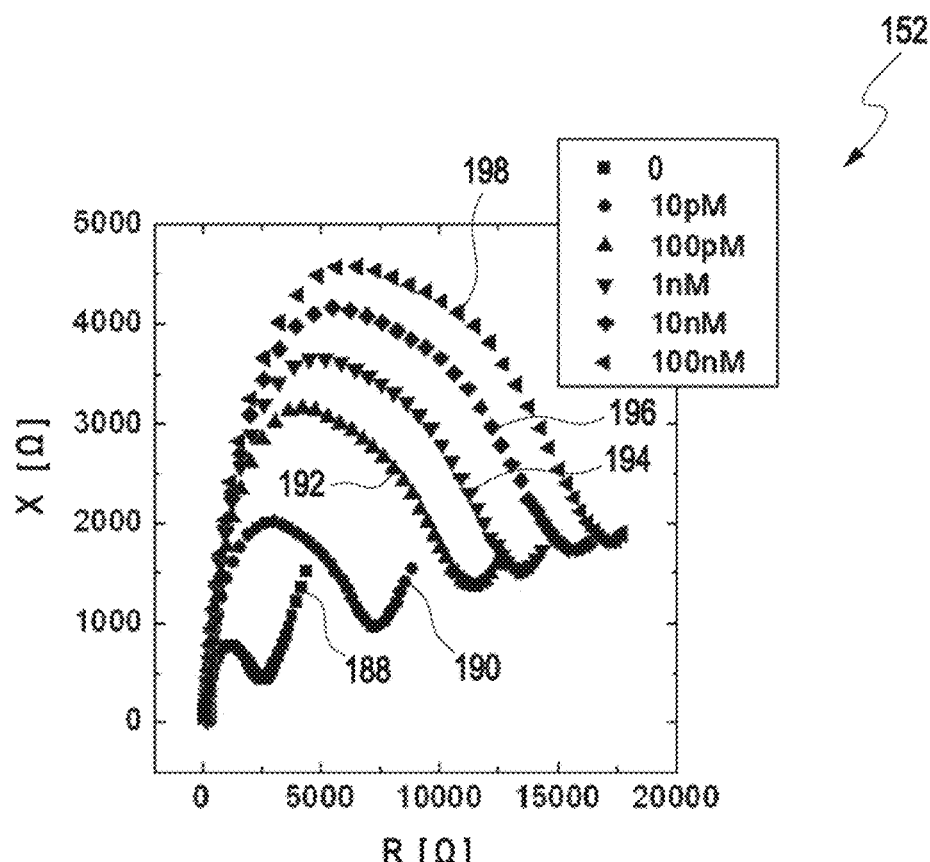
FIGS. 10A and 10B show measurement diagrams plotting a reactance X as a function of a resistance R for different measurement situations.
Figure 10:
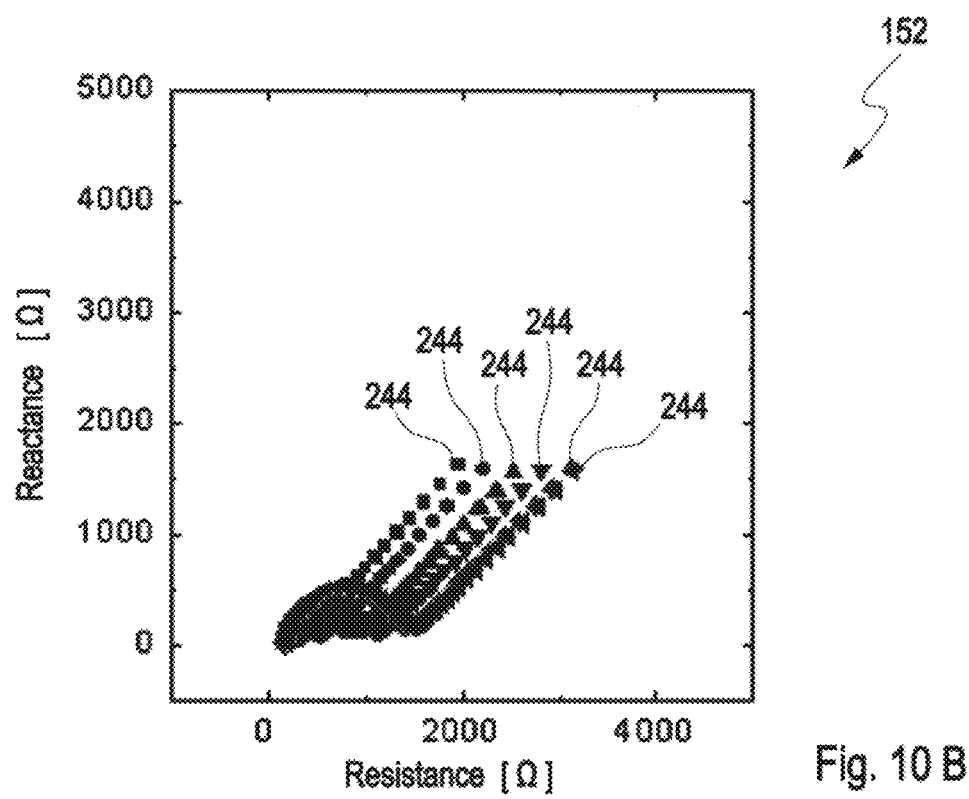

FIGS. 10A and 10B show measurement diagrams 152 plotting the reactance X, i.e., the imaginary part of the impedance Z, versus the resistance R, i.e., the real part of the impedance Z. In the case of FIG. 10A, the multipurpose electrode 112 has a gold layer 150 modified with a monolayer 164 and anti-TSH antibodies 166 as shown in FIG. 9C. The impedance measurement carried out between the multipurpose electrode 112 and the counter electrode 168 can distinguish clearly between five different concentrations of TSH. In the case of FIG. 10B, the impedance measurement is carried out between the multipurpose electrode 112 having a gold layer 150 carrying an aminothiophenol monolayer 164 (self-assembled SAM) and the counter electrode 168 in the absence of further modifications of the gold layer 150 of the multipurpose electrode 112, thus in the absence of anti-TSH antibodies, and in the absence of TSH. The aminothiophenol monolayer 164 may be a self-assembled monolayer (SAM). A drift of the six impedance measurements may be due to the time elapsed during a measurement process.

Figure 11:
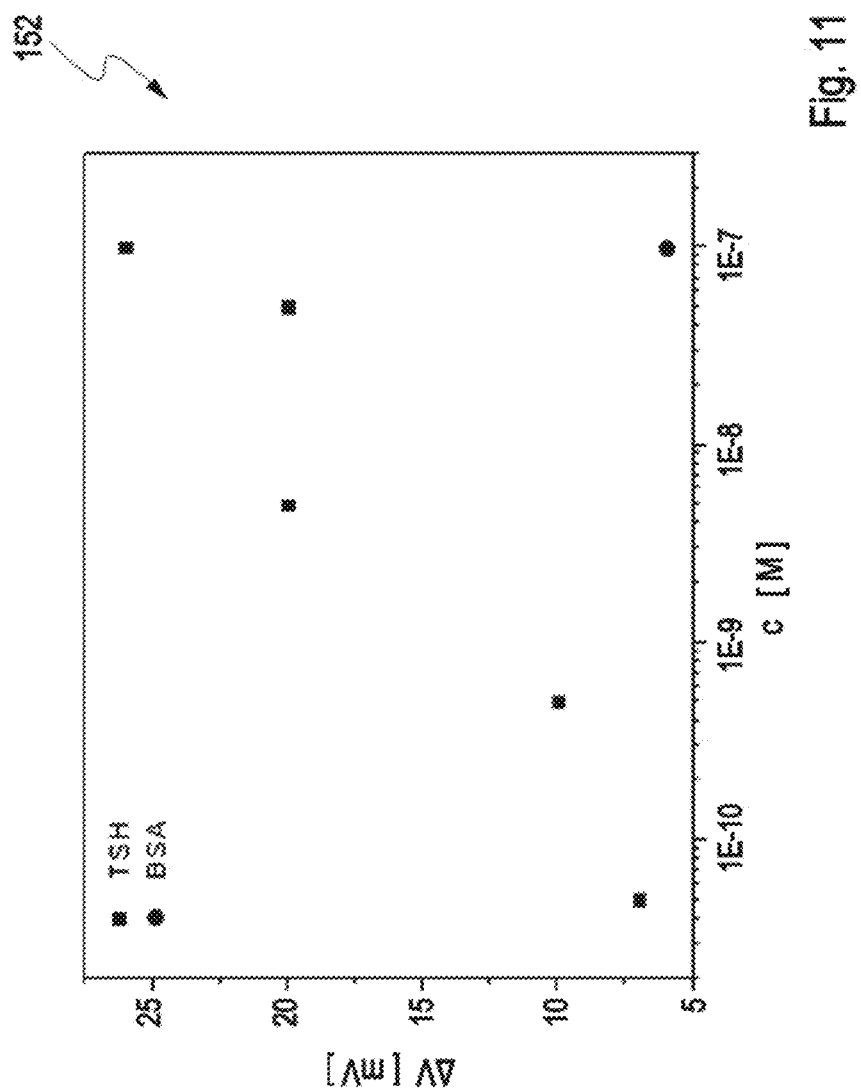
FIG. 11 shows a measurement diagram of a FET measurement plotting a voltage shift ΔV as a function of a concentration of TSH and BSA on a logarithmic scale.

FIG. 11 shows a measurement diagram 152 based on field-effect transistor-based measurements using a field-effect transistor 114 with an extended gate electrode 146 that has a gold layer 150 modified with anti-TSH F(ab')2 antibody fragments 170 as functional components 153. The fragments 170 are immobilized on the extended gate electrode 146 via short (0.5 kDa) bifunctional PEG linker molecules (thiol and carboxyl groups to attach PEG to the gold layer 150 and to the anti-TSH F(ab') antibody fragments 170, respectively). Additionally, a long (10 kDa) monofunctional (thiolated) PEG is added to the gold layer 150 as a desalting agent. On the vertical axis, a voltage shift ΔV is depicted, given in millivolts (mV), as a function of the concentration c of the compound (analyte TSH or control sample BSA), given in mol/l, BSA standing for bovine serum albumin. The results depicted in FIG. 11 clearly show that the analyte detector 110 is able to distinguish between the presence of TSH and BSA and between different concentrations of TSH when the extended gate electrode 146 is modified with anti-TSH F(ab')2 antibody fragments (170).

The analyte detector 110 comprises a field-effect transistor 114. The multipurpose electrode 112 may be at least partially identical with at least one element selected from the group consisting of the gate electrode 120 of the field-effect transistor 114 and the channel 126 of the field-effect transistor 114. FIG. 12A shows a field-effect transistor 114 implemented as a liquid-gated FET, comprising a source electrode 122 and a drain electrode 124, a channel 126 and a gate electrode 120. In this case, the gate electrode 120 in FIG. 12A comprises the reference electrode 132 and the conductive electrolyte solution 238. The multipurpose electrode 112 in FIG. 12A is at least partially identical with the channel 126. The channel 126 in FIG. 12A comprises a graphene layer 172. Thus, in this case, the semiconducting layer 148 is identical to the graphene layer 172. The graphene layer 172 comprises a surface 130 accessible to the analyte. A field-effect transistor 114 depicted in FIG. 12A further comprises a reference electrode 132. FIG. 12B shows a partial view of a field-effect transistor 114 of the type schematically depicted in FIG. 12A. FIG. 12C shows a measurement diagram 152 recorded with a field-effect transistor 114 of the type schematically depicted in FIG. 12A plotting the current $I_d$ as a function of the voltage $V_{ref}$ for different pH values.

The analyte detector 110 comprises at least one electrochemical measurement device 116 configured for performing at least one electrochemical measurement using the multipurpose electrode 112. The electrochemical measurement device 116 is not depicted in this Figure and may be added in electrical connection to the multipurpose electrode 112. The electrochemical measurement may comprise at least one measurement selected from the group consisting of: a cyclic voltammetry measurement; an impedance measurement; a potentiostatic measurement; an amperometric measurement; an electrochemical impedance spectroscopy; voltammetry; amperometry; potentiometry; coulometry. FIGS. 13A and 13B show measurement diagrams 152 based on electrochemical measurements, namely the cyclic voltammetry measurement (FIG. 13A) and an impedance measurement (FIG. 13B), where the graphene layer 172 described in FIGS. 12A and 12B served as multipurpose electrode 112 in the electrochemical measurement. The measurement diagram 152 shown in FIG. 13A plots a current Icy measured between the multipurpose electrode 112 and the counter electrode 168 as a function of a voltage V applied. The measurement diagram 152 shown in FIG. 13B plots the negative imaginary part of the impedance Z" (the imaginary part also often being referred to as the "reactance" X) versus the real part of the impedance Z' (also often referred to as the "resistance" R). FIGS. 13C and 13D show measurement diagrams 152 based on field-effect transistor-based measurements, carried out using the same multipurpose electrode 112 comprising the graphene layer 172 that served a multipurpose electrode 112 in the electrochemical measurement depicted in the measurement diagrams 152 in FIGS. 13A and 13B. The data depicted in the measurement diagram 152 in FIG. 13C were recorded with a field-effect transistor 114 implemented as an ion-sensitive field-effect transistor 114. The data depicted in the measurement diagram 152 in FIG. 13D were recorded using a field-effect transistor 114 implemented as an extended-gate field-effect transistor 144. Both FIG. 13C and FIG. 13D show the drain current $I_d$ plotted as a function of the gate voltage $V_G$.

The graphene layer 172 may be at least partially covered by metal particles 174, specifically by gold particles 176 as can be seen in FIG. 15A. FIG. 14A to FIG. 14D show measurement diagrams 152 corresponding to the measurement diagrams shown in FIGS. 13A to 13D with the graphene layer 172 of the multipurpose electrode 112 being partially covered by gold particles 174. FIGS. 15B and 15C show the graphene layer 172 with gold particles 176 deposited by physical adsorption overnight (FIG. 15B) and by 5 minutes of electrodeposition (FIG. 15C).

Figure 16:
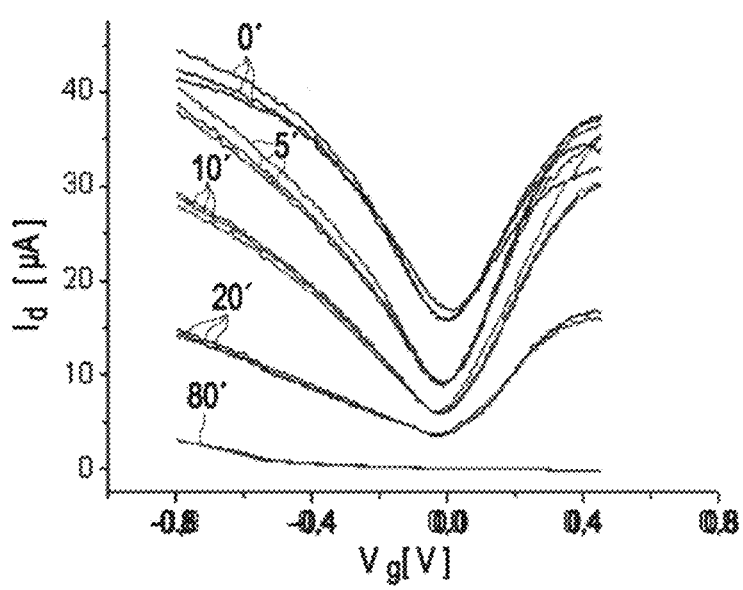
FIGS. 16A-16C show diagrams plotting the current Id as a function of the voltage Vg (FIG. 16A), plotting the reactance X versus the resistance R (FIGS. 16B and 16C) each for different graphene surfaces.
Figure 16:
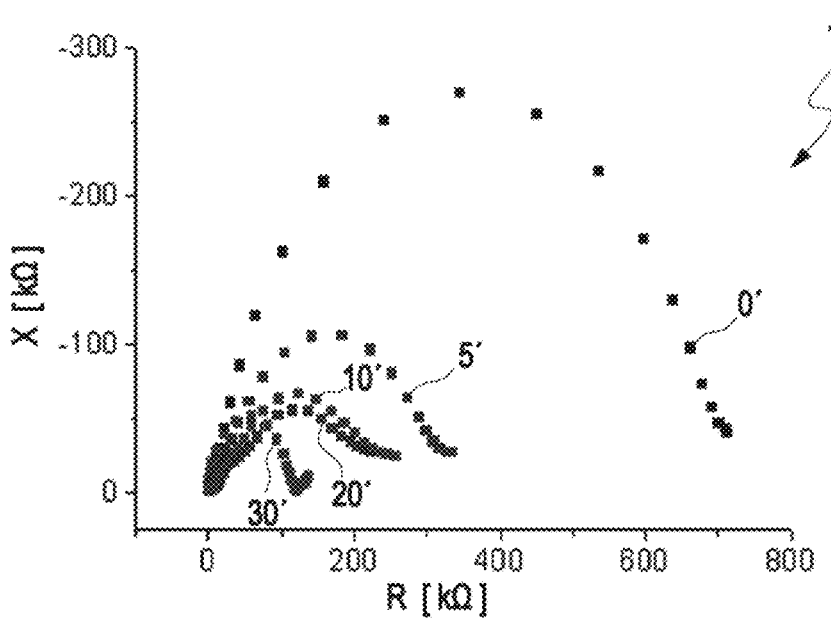
Figure 16:
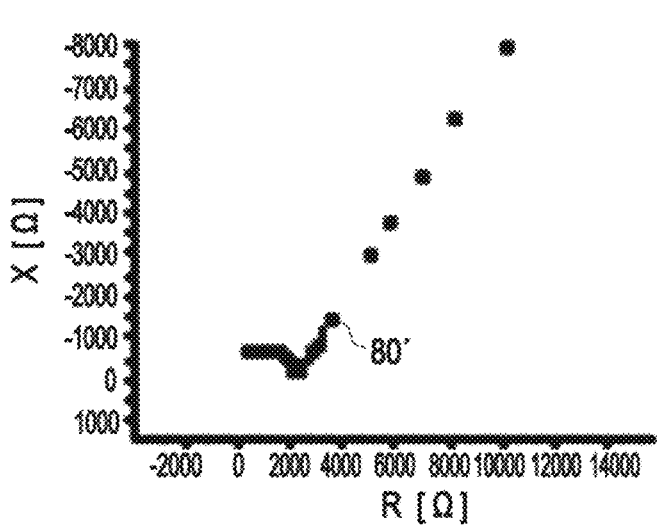

FIGS. 16A, 16B and 16C show measurement diagrams 152 recorded with the analyte detector 110 using a multipurpose electrode 112 comprising a graphene layer 172 partially covered by gold particles 176. As shown in FIG. 15C, gold particles 176 may be deposited on the graphene layer 172 by electrodeposition. The duration of the electrodeposition may be varied. FIG. 16A shows several field-effect transistor-based measurements carried out using a gate electrode 120 comprising a graphene layer 172 partially covered by gold particles 176, where the duration of deposition of gold particles 176 on the graphene layer 172 varied between 0 and 80 minutes. Similarly, FIG. 16B shows several impedance measurements carried out using the multipurpose electrode 112 comprising a graphene layer 172 partially covered by gold particles 176, where the duration of deposition of gold particles 176 on the graphene layer 172 varied between 0 and 30 minutes. FIG. 16C shows the corresponding measurement carried out after a deposition duration of 80 minutes.

Figure 17:
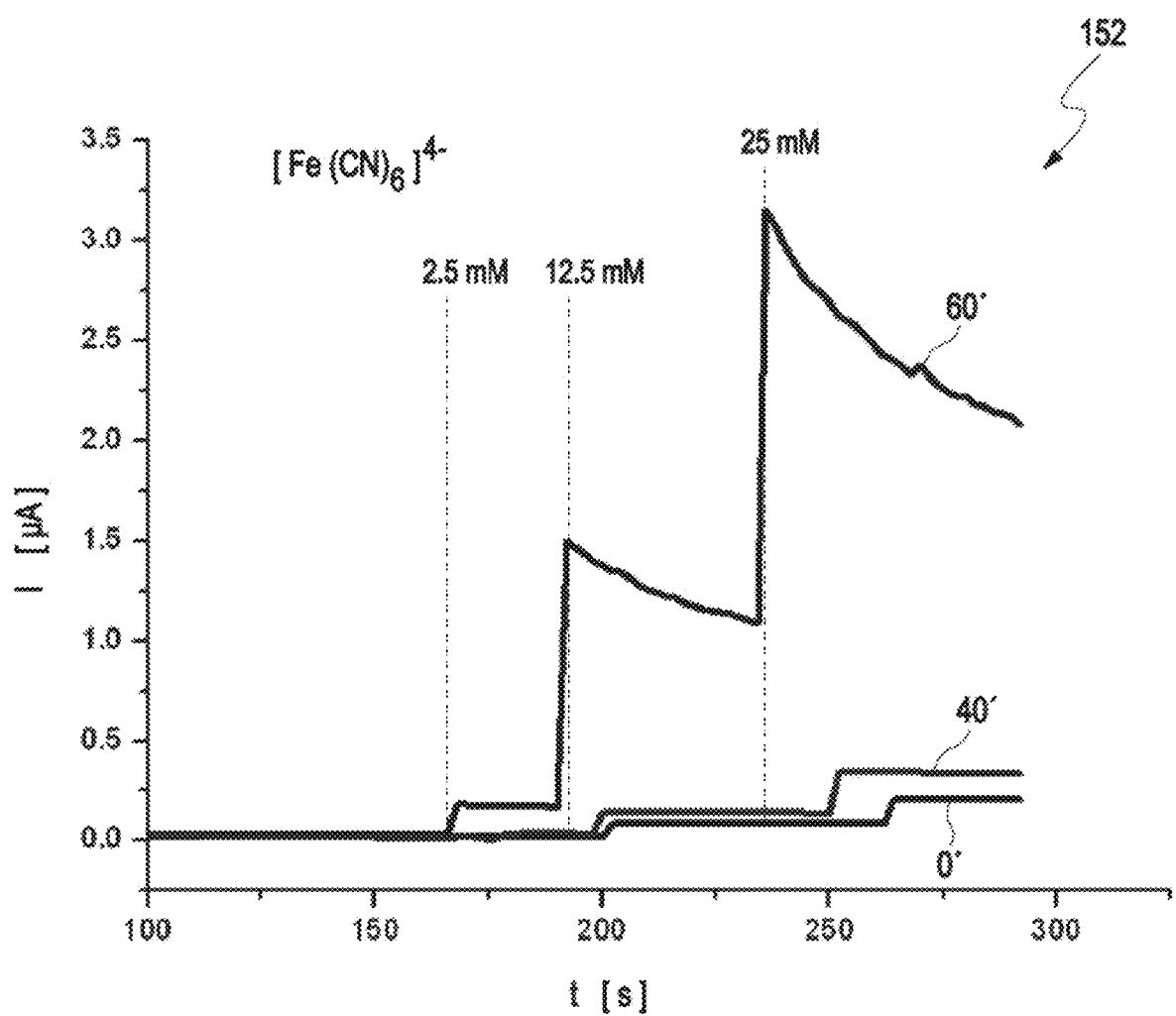
FIG. 17 shows a diagram of an amperometric measurement plotting a current as a function of time for three different graphene surfaces.

FIG. 17 shows a measurement diagram 152 depicting an amperometric measurement. A current I between the multipurpose electrode 112 and the counter electrode 168 is plotted as a function of time t for three different measurements, where each measurement uses a multipurpose electrode 112 comprising a graphene layer 172, where the graphene layer 172 either has no metal particles 174 deposited onto it (0') or the graphene layer 172 has gold particles 176 deposited onto it by electrodeposition for 40 minutes (40') or for 60 minutes (60'). The three amperometric measurements displayed in FIG. 17 were carried out in the presence of 3 different concentrations of an electroactive species $[Fe(CN)_6]^{4-}$: 2.5, 12.5 and 25 mM. The current increases with increasing $[Fe(CN)_6]^{4-}$ concentration. The observed current changes are more pronounced for the graphene layer 172 having gold particles 176 deposited onto it, with a deposition time of 60 minutes resulting in a higher sensitivity than a deposition time of 40 minutes.

Figure 18:
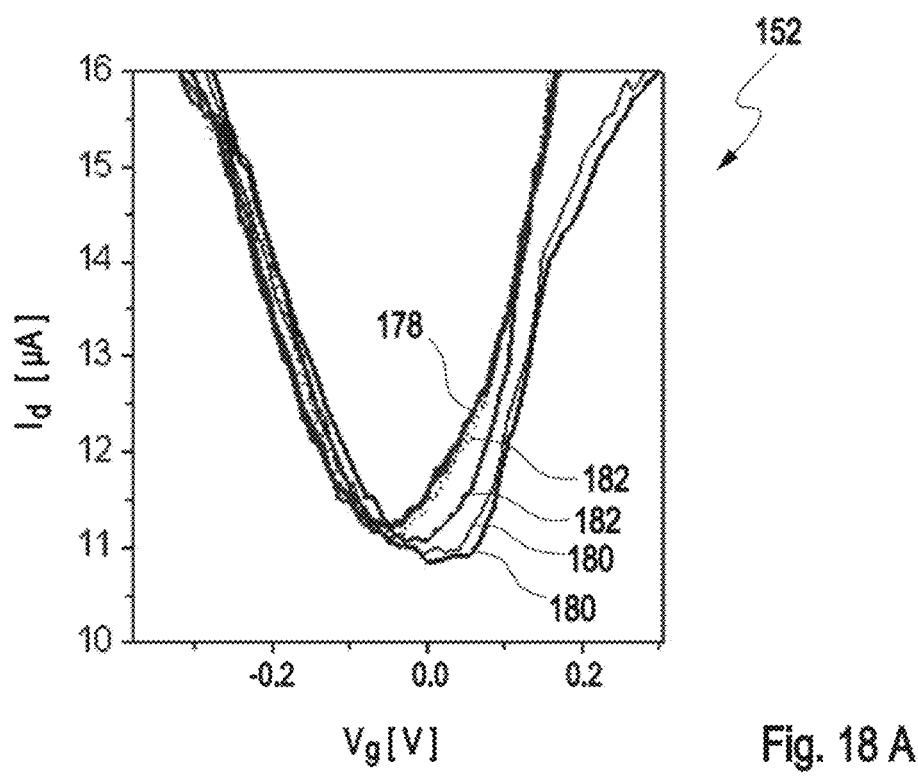
FIGS. 18A and 18B show diagrams plotting the current Id as a function of Vg (FIG. 18A) and plotting the reactance versus the resistance (FIG. 18B) for three different graphene surfaces each.
Figure 18:
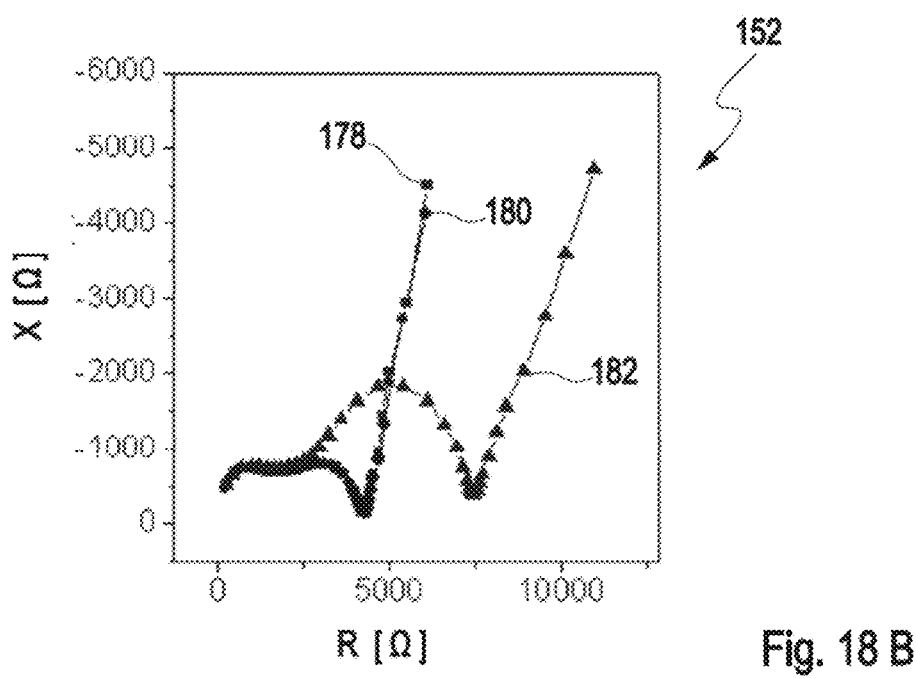

Both field-effect transistor-based measurements and electrochemical measurements may be carried out in the presence of polyethylene glycol (PEG), specifically in the presence of pyrene PEG (P-PEG) and/or thiolated PEG (S-PEG) as shown in the measurement diagrams 152 in FIGS. 18A and 18B. FIG. 18A shows a measurement diagram 152 of a field-effect transistor-based measurement plotting the drain current $I_d$ as a function of the gate voltage $V_g$. The measurement was carried out using a field-effect transistor 114 comprising a graphene layer 172 partially covered by the gold particles 176 deposited onto the graphene layer 172 by electrodeposition for 40 minutes. The field-effect transistor-based measurement was carried out either in the absence of PEG 178 or in the presence of pyrene PEG 180 or in the presence of thiolated PEG 182. Similarly, FIG. 18B shows a measurement diagram 152 of an impedance measurement carried out either in the absence of PEG 178 or in the presence of pyrene PEG 180 or in the presence of thiolated PEG 182.

Figure 20:
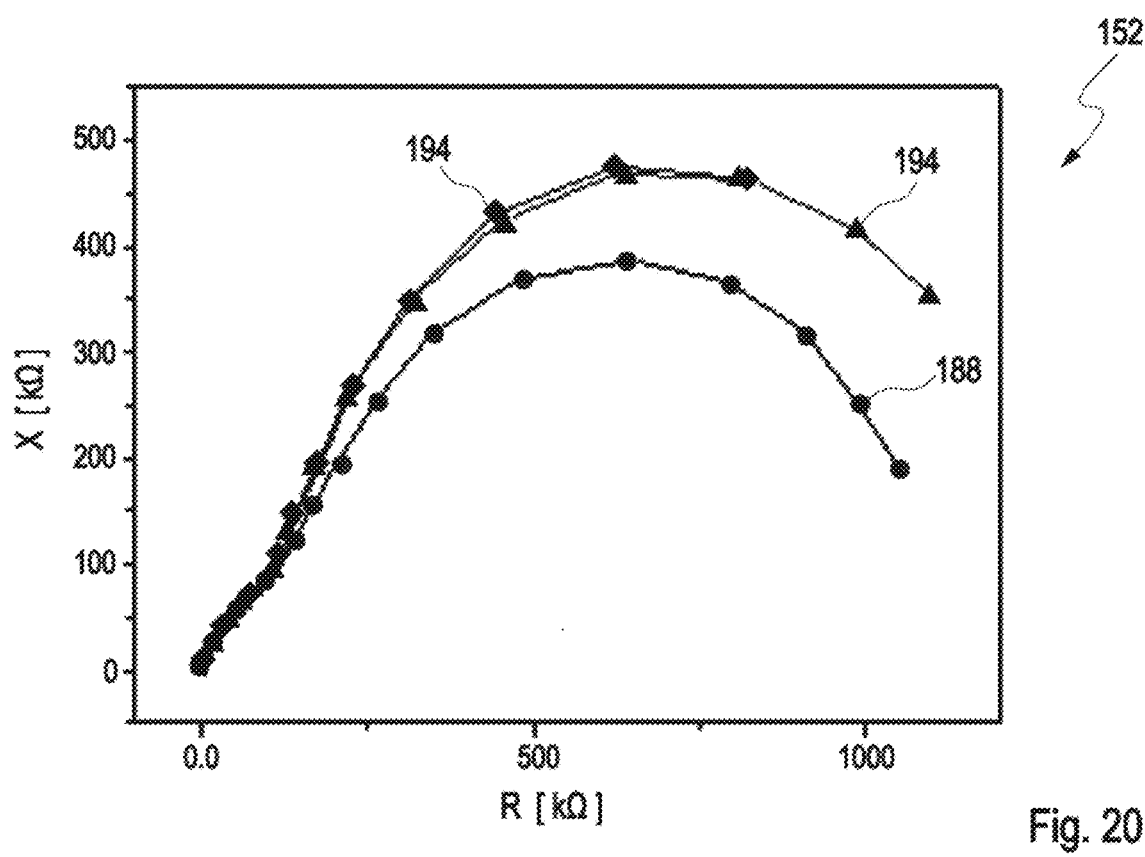
FIG. 20 shows a measurement diagram 152 of an impedance measurement using the multipurpose electrode 112 of the type depicted in FIG. 19A.

The analyte detector 110 may be able to detect TSH and/or distinguish between different concentrations of TSH via the field-effect transistor-based measurement, as shown in FIGS. 10A, 19B and 19C and/or via the electrochemical measurement, specifically via the impedance measurement as shown in FIG. 20. The multipurpose electrode 112 may comprise a graphene layer 172 as shown in FIG. 19A. The graphene layer 172 may be prepared by a graphene transfer onto the multipurpose electrode 112. The graphene layer 172 may be modified by the addition of PEG, in particular by the addition of thiolated PEG (S-PEG), specifically by the addition of short (0.5 kDa) bifunctional carboxylated thiol PEG (SH-PEG-COOH) 240, which may at least partially serve as binding sites for the functional component 153, which may comprise anti-TSH antibodies 170, in particular F(ab)'2 TSH-antibody fragments, as shown in FIG. 19A. The graphene layer 172 may also be modified by co-immobilization of a long (10 kDa) monofunctional methoxy-terminated thiol PEG (SH-PEG-OCH$_3$) 242 which may increase the effective Debye length. The thiol groups of the PEGs may be attached to the pyrene linkers on the graphene layer 172 via maleimide chemistry. FIGS. 19B and 19C show measurement diagrams 152 that are recorded using the multipurpose electrode 112 of the type depicted in FIG. 19A. In FIG. 19B the current $I_d$ is plotted as a function of the voltage $V_{ref}$ of the reference electrode 132. FIG. 19C plots the voltage shift $\Delta V_{CNP}$ as a function of the concentration c of TSH, which serves as the analyte in this experiment, or the concentration of BSA, which serves as a control sample in this experiment.

Herein, CNP stands for charge neutrality point. The shift $\Delta V_{CNP}$ depicted in FIG. 19C may be calculated from the measurement diagram 152 in FIG. 19B as the difference between the x-coordinate of the minimum of a graph corresponding to a sample containing TSA (190, 192, 200, 202, 204, 206, 208) and the x-coordinate of graph 188 corresponding to a sample without TSH. The x-axis in FIG. 19C displays the concentration c on a logarithmic scale. FIGS. 19B and 19C show that the analyte detector 110 may be able to distinguish clearly between at least six different concentrations of TSH using the field-effect transistor 114. The multipurpose electrode 112 of the type depicted in FIG. 19A may also be used for the impedance measurement depicted in FIG. 20. FIG. 20 shows a measurement diagram 152 plotting the reactance X versus the impedance R. FIG. 20 shows that the analyte detector 110 may be able to reproducibly detect 1 nM of TSH 194 using the electrochemical measurement device 116, in particular the impedance measurement.

Figure 21:
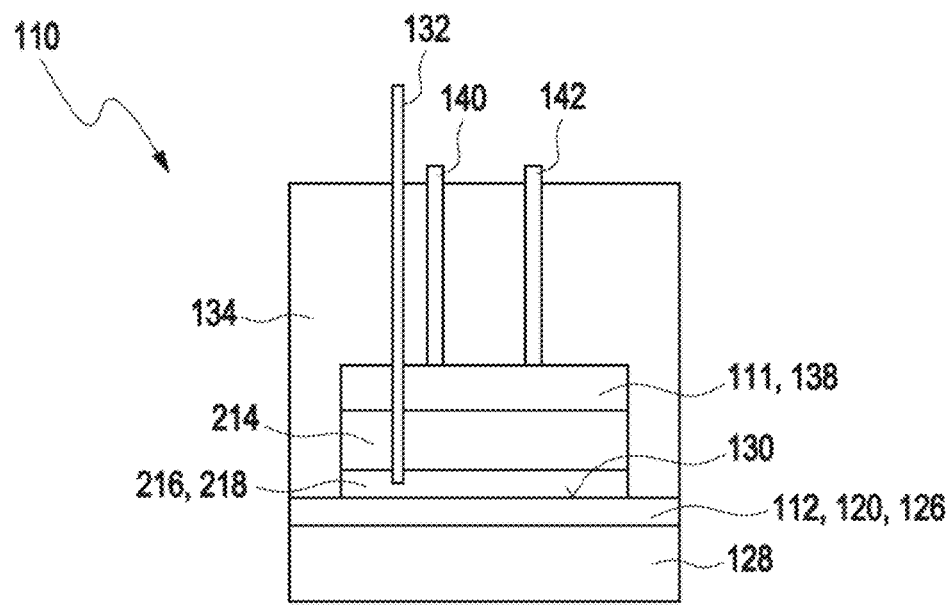
FIGS. 21A-21C show a partial view of an analyte detector 110 (FIG. 21A) and measurement diagrams 152 (FIGS. 21B and 21C) that are recorded with the analyte detector 110 of the type depicted in FIG. 21A.
Figure 21:
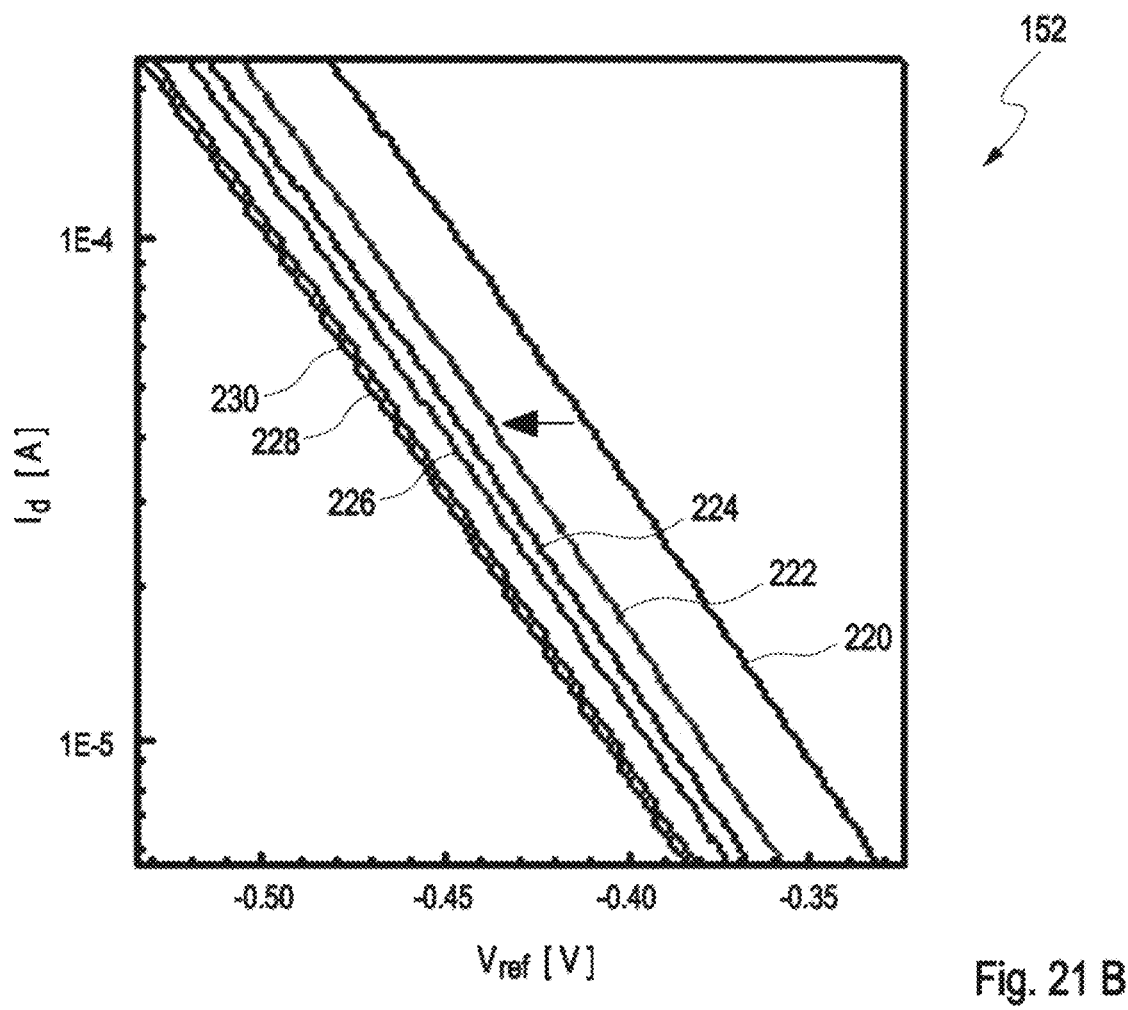
Figure 21:
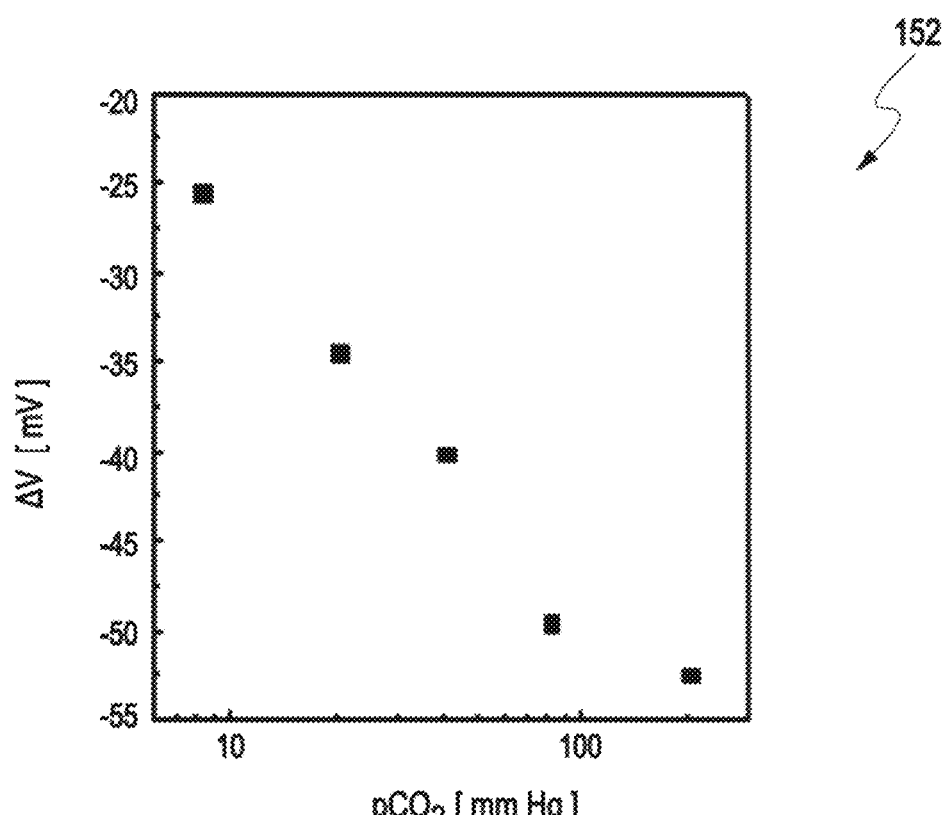

The analyte detector 110 may also be configured for the analysis of a gaseous analyte. In particular, the analyte detector 110 may be configured for the analysis of at least one blood gas, specifically of $CO_2$. FIG. 21A shows a partial view of an analyte detector 110, whose multipurpose electrode 112 is at least partially covered by a membrane 214. The membrane 214 may comprise or consist of PDMS. The membrane 214 may be at least partially permeable by the analyte. The analyte detector 110 as shown in the sectional view in FIG. 21A may further comprise a space 216 between the membrane 216 and the multipurpose electrode 112. The space 216 may be partially filled with an electrolyte 218 as also shown in FIG. 21A, specifically with a hydrogel electrolyte, more specifically with a bicarbonate buffer dissolved in an agarose hydrogel. The multipurpose electrode 112 shown in FIG. 21A may have a surface 130 that may be sensitive to a pH. FIG. 21B shows a measurement diagram 152 plotting the current $I_d$ on a logarithmic scale as a function of the voltage $V_{ref}$ for five different $CO_2$ partial pressures that are given in the unit of mm Hg. The measurement shown in FIG. 21B is recorded in an extended-gate field-effect transistor-based measurement with the analyte detector 110 of the type depicted in FIG. 21A. FIG. 21C shows a measurement diagram 152 plotting the voltage shift $\Delta V$ as a function of the $CO_2$ partial pressure with the $CO_2$ partial pressure given on a logarithmic scale on the x-axis.

The data points displayed in the measurement diagram 152 are derived from the data displayed in FIG. 21B. FIGS. 21B and 21C show that the analyte detector 110 may be able to distinguish between deionized water 220 and at least five different $CO_2$ partial pressures 222, 224, 226 and 228.

Figure 22:
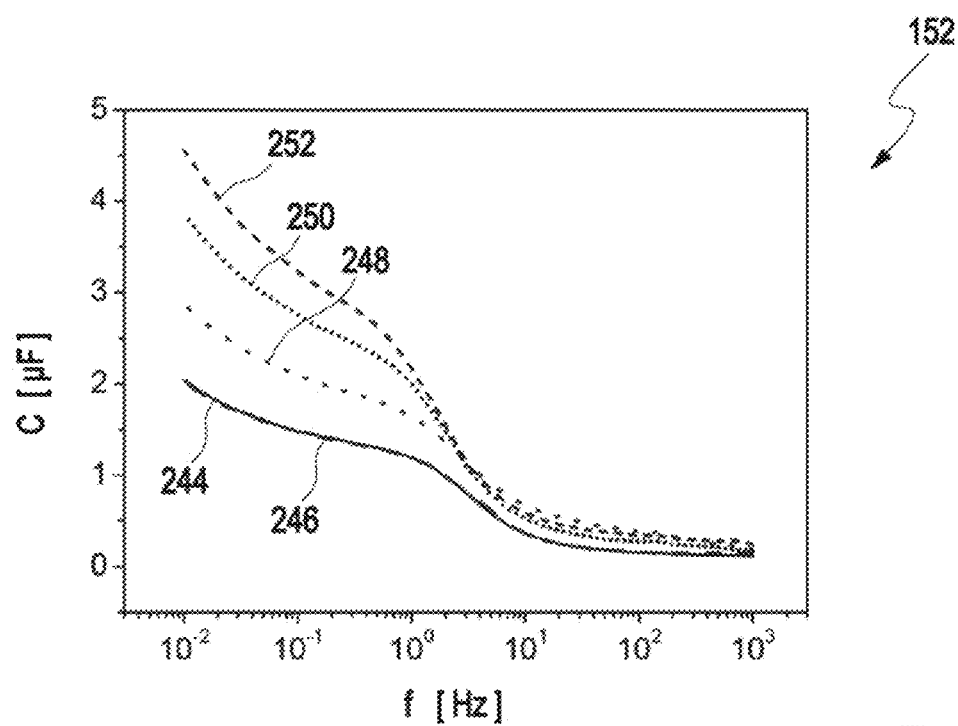
FIGS. 22A-22D show measurement diagrams 152 of a capacitance measurement (FIGS. 22A and B) and a transistor-based measurement (FIGS. 22C and D) of TSH using the same multipurpose electrode 112.
Figure 22:
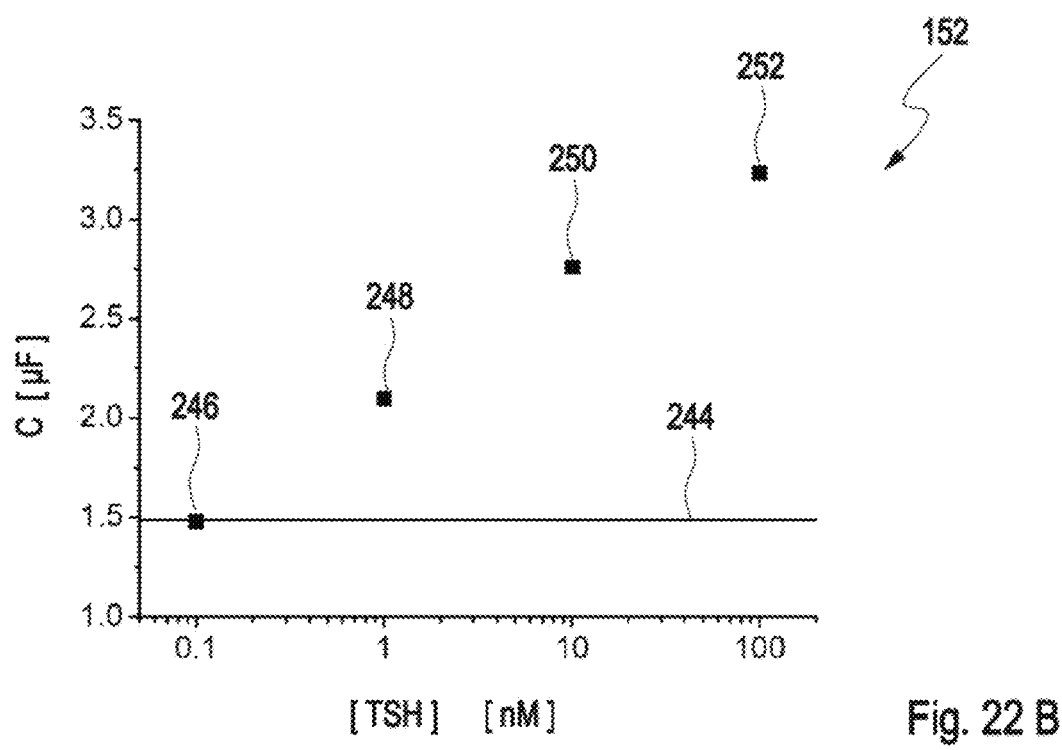
Figure 22:
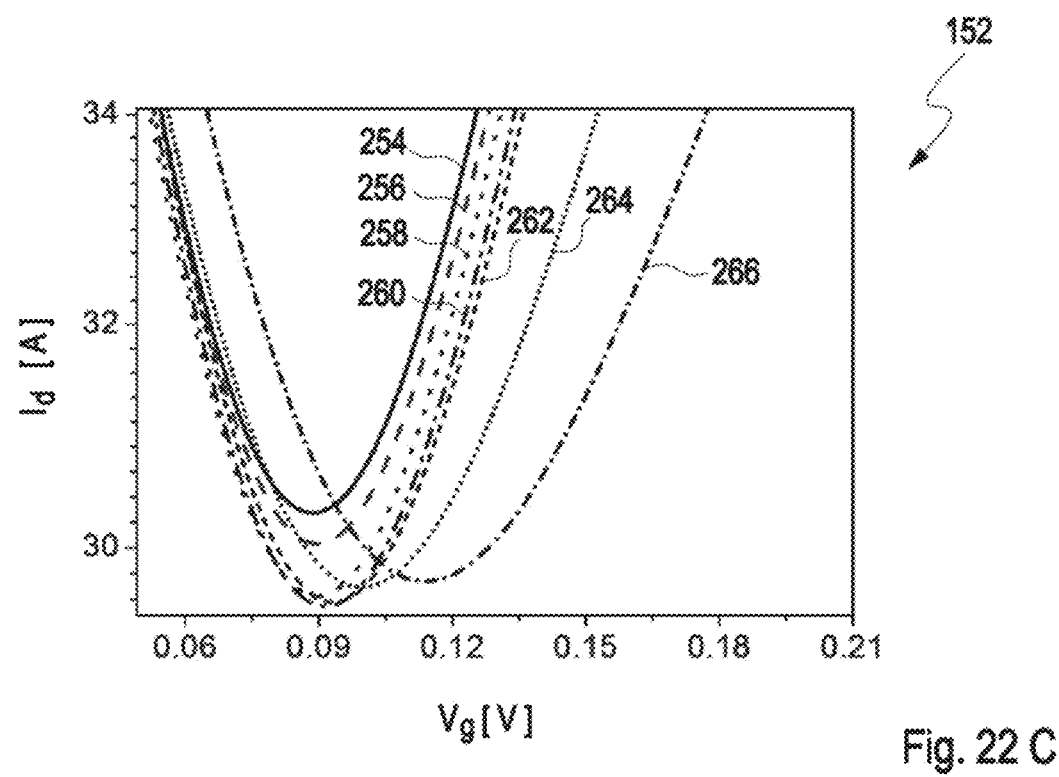
Figure 22:
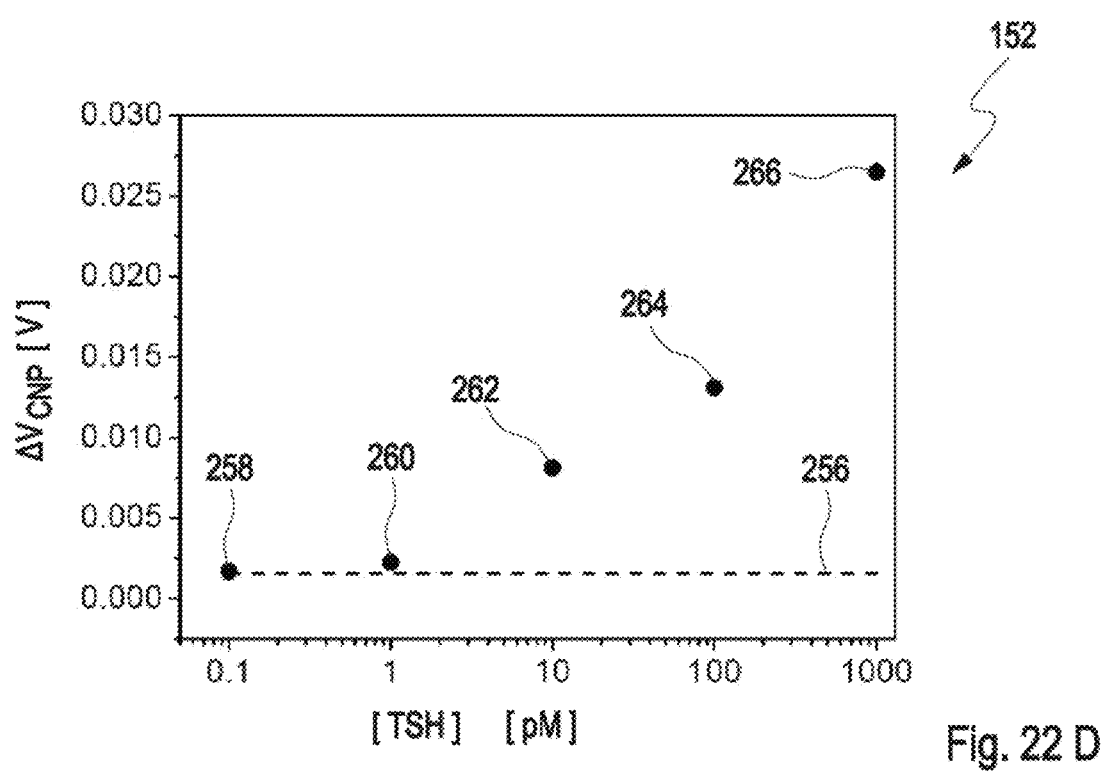

FIGS. 22A to 22D show measurement diagrams 152 of an electrochemical measurement in form of a capacitance measurement (FIGS. 22A and 22B) and of a transistor-based measurement (FIGS. 22C and 22D) of TSH molecules 199 both measurements using the same multipurpose electrode 112. Thus, in this specific example, the multipurpose electrode 112 is used to detect the analyte TSH 199 using two different measurement techniques, one transistor-based method and one electrochemical method, that make use of one and the same multipurpose electrode 112. The employed multipurpose electrode 112 is of the type illustrated in FIG. 19A and described in the corresponding text passage. In particular, the multipurpose electrode 112 used for TSH molecule 199 detection as shown in the measurement diagrams 152 of FIGS. 22A to 22D comprises the graphene layer 172 modified by short (approx. 0.5 kDa) bifunctional carboxylated PEG 240, which may at least partially serve as binding sites for the functional component 153, which in this case comprise anti-TSH antibodies 170, in particular $F(ab')_2$ TSH-antibody fragments. The graphene layer 172 is further modified by co-immobilization of a long (10 kDa) monofunctional methoxy-terminated thiol PEG (SH-PEG-$OCH_3$) 242 which may increase the effective Debye length. FIG. 22A shows the capacitance C in µF as a function of a frequency f in Hz of an alternating voltage applied for five different situations, in which the fluid sample is either buffer without TSH molecules 199 or the fluid sample is buffer comprising one of the following TSH concentrations: 0.1 nM TSH, 1 nM TSH, 10 nM TSH or 100 nM TSH. The different TSH concentrations are marked by reference numbers 244, 246, 248, 250 and 252, respectively. FIG. 22B shows the capacitance C in µF as a function of the concentration of TSH molecules 199 in nm for a voltage alternating at $10^{-1}$ Hz, wherein the concentration of TSH molecules 199 is plotted in a logarithmic scale. The capacitance C of the buffer without TSH molecules 199 is indicated in FIG. 22B by a straight line marked with the corresponding reference number 244. In FIG. 22C the current $I_d$ is plotted as a function of the gate voltage Vg of the gate electrode 120 of the FET 114 for seven different situations, in which the fluid sample is either buffer without TSH molecules 199 and without BSA or the fluid sample is buffer comprising 100 nM BSA and no TSH molecules 199 or the fluid sample is buffer comprising one of the following TSH concentrations and no BSA: 100 fM TSH, 1 pM TSH, 50 pM TSH, 100 pM TSH or 1 nM TSH. The different concentrations of TSH 199 and BSA are marked by reference numbers 254, 256, 258, 260, 262, 264 and 266, respectively. The measurement setup as shown in FIG. 2 was used.

FIG. 22D plots the voltage shift $\Delta V_{CNP}$ as a function of the concentration of TSH 199. Herein, CNP stands for charge neutrality point. The shift $\Delta V_{CNP}$ may be calculated from the measurement diagram 152 in FIG. 22C as the difference between the x-coordinate of the minimum of a graph corresponding to a sample containing TSH (258, 260, 262, 264 and 266) or BSA (256) and the x-coordinate of the graph corresponding to the sample 254 without TSH and BSA. The x-axis in FIG. 22D displays the concentration of TSH on a logarithmic scale. The shift $\Delta V_{CNP}$ of sample 256 containing buffer comprising 100 nM BSA and no TSH molecules 199 is indicated in FIG. 22D by a straight dashed line marked with the corresponding reference number 256.

FIGS. 22B and 22D show that by making use of both an electrochemical measurement and a transistor-based measurement a measuring range of the analyte detector 110 may be enhanced significantly as compared to analyte detectors making use of just one measurement method. In this particular example, the measurement range of the electrochemical measurement performed as capacitance measurement covers mainly the nanomolar (nM) range while the measurement range of the transistor-based measurement covers mainly the picomolar (pM) range. Thus, the use of the transistor-based measurement in addition to the electrochemical measurement may enlarge the measurement range of the analyte detector 110 substantially, for example by one or even several orders of magnitude.

Figure 23:
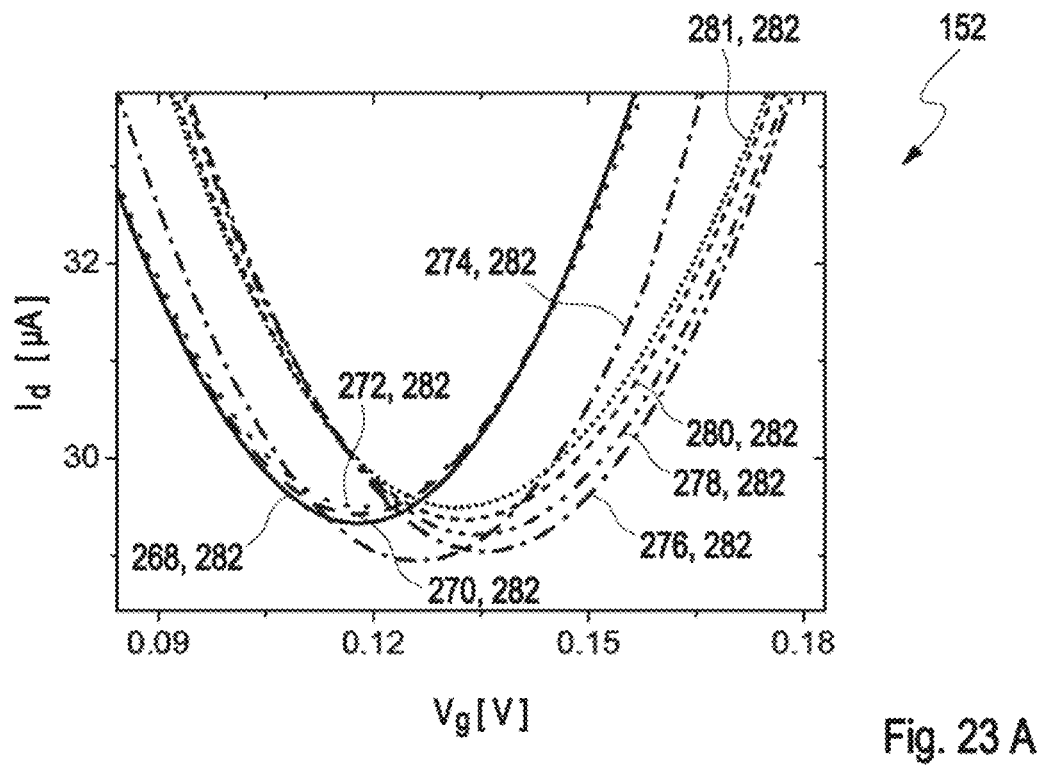
FIGS. 23A and 23B show further measurement diagrams 152 of a transistor-based measurement of TSH.
Figure 23:
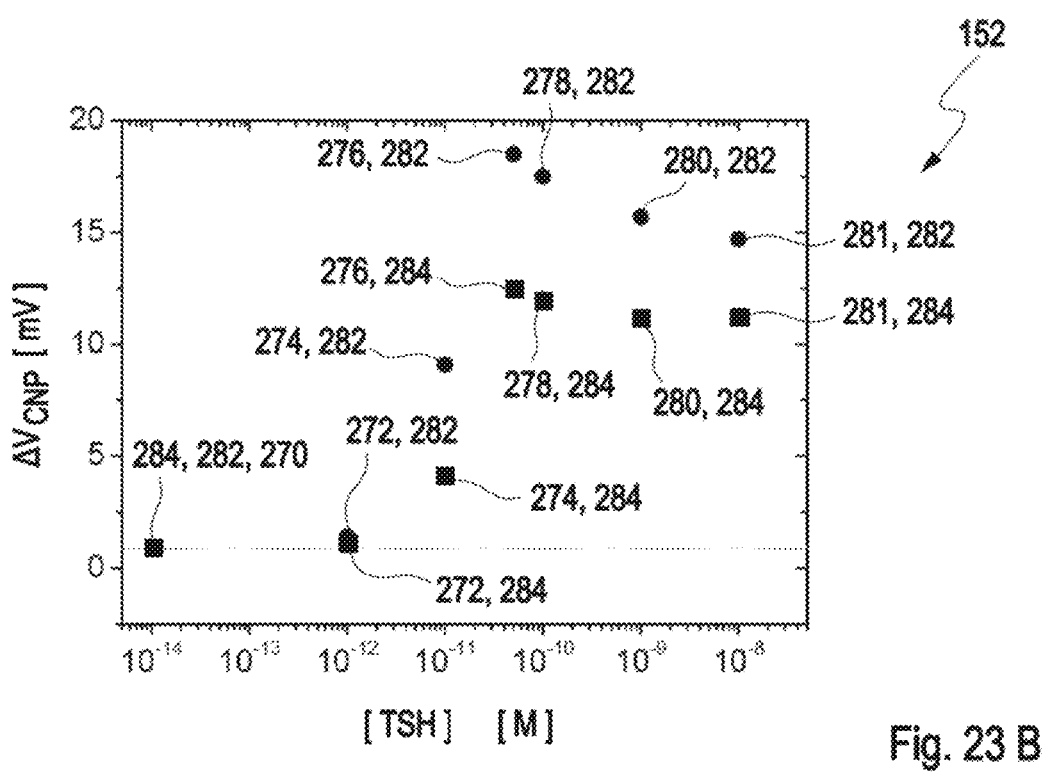

FIG. 23A shows a further example of a transistor-based measurement of TSH 199 carried out with a field-effect transistor 114 of the same type as used for acquiring the data displayed in FIGS. 22C and 22D. In FIG. 23A the current $I_d$ is plotted as a function of the gate voltage $V_g$ of the gate electrode 120 of the FET 114 for eight different situations, in which the fluid sample is either buffer without TSH molecules 199 or the fluid sample is buffer comprising one of the following TSH concentrations: 10 fM TSH, 1 pM TSH, 10 pM TSH, 50 pM TSH, 100 pM TSH, 1 nM TSH or 10 nM TSH. The different TSH concentrations are marked by reference numbers 268, 270, 272, 274, 276, 278, 280 and 281, respectively. FIG. 23B plots the voltage shift $\Delta V_{CNP}$ as a function of the concentration of TSH 199 for the data displayed in FIG. 23A, which constitutes a first set of measurements. The $\Delta V_{CNP}$ values calculated from the data in FIG. 23A are marked with reference sign 282. The shift $\Delta V_{CNP}$ may be calculated from the measurement diagram 152 in FIG. 23A as described above for FIGS. 22C and 22D. FIG. 23B further plots $\Delta V_{CNP}$ values originating from a separate FET measurement, which constitutes a second set of measurements. The first set and the second set of measurements were carried out with a separate FET 114. For the second set of measurements solely the calculated $\Delta V_{CNP}$ values are plotted. These $\Delta V_{CNP}$ values are marked with reference sign 284. For the TSH concentration of 10 fM, which is marked by reference number 270, the measurements of the first set of measurements 282 and the second set of measurements 284 overlap. The reference point for the formation of $\Delta V_{CNP}$ was determined using a real-time measurement in this case and is not shown here.

FIGS. 23A and 23B illustrate again that the FET-based measurement of the analyte detector 110 covers a measurement range comprising the picomolar range.

Figure 24:
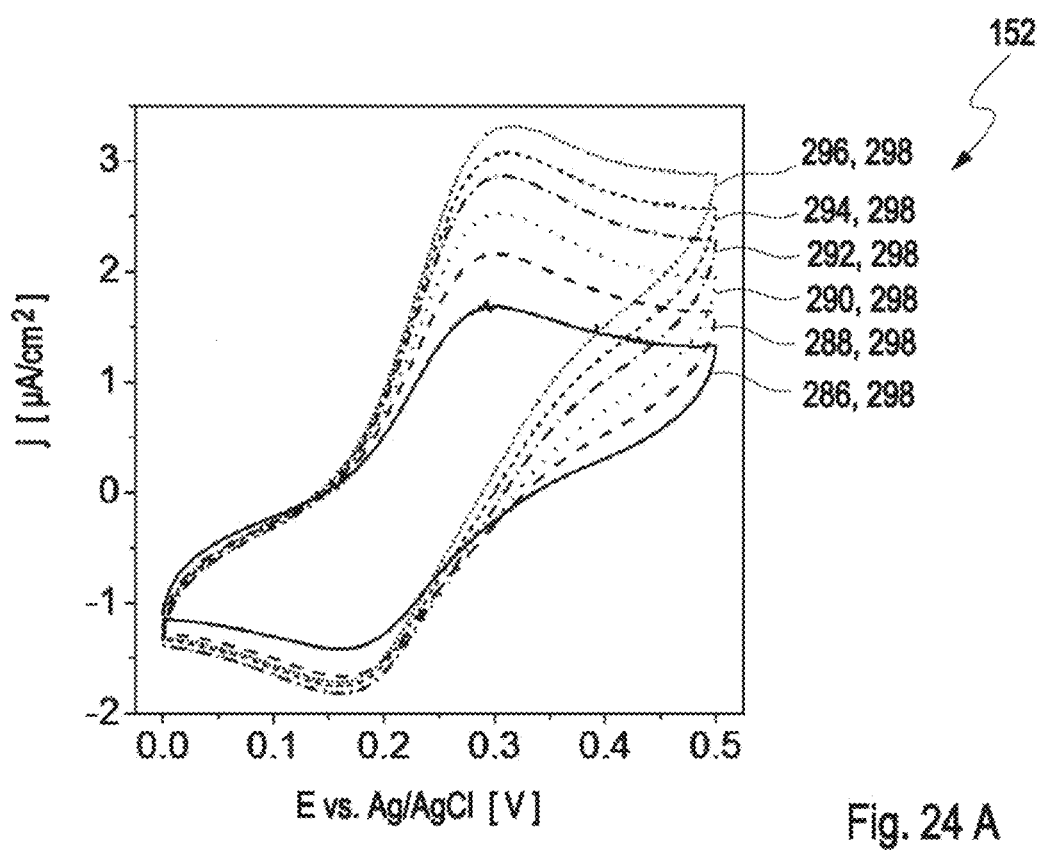
FIGS. 24A-24D show measurement diagrams 152 of an amperometric measurement (FIGS. 24A and 24B) and a transistor-based measurement (FIGS. 24C and 24D) of glucose using the same multipurpose electrode 112.
Figure 24:
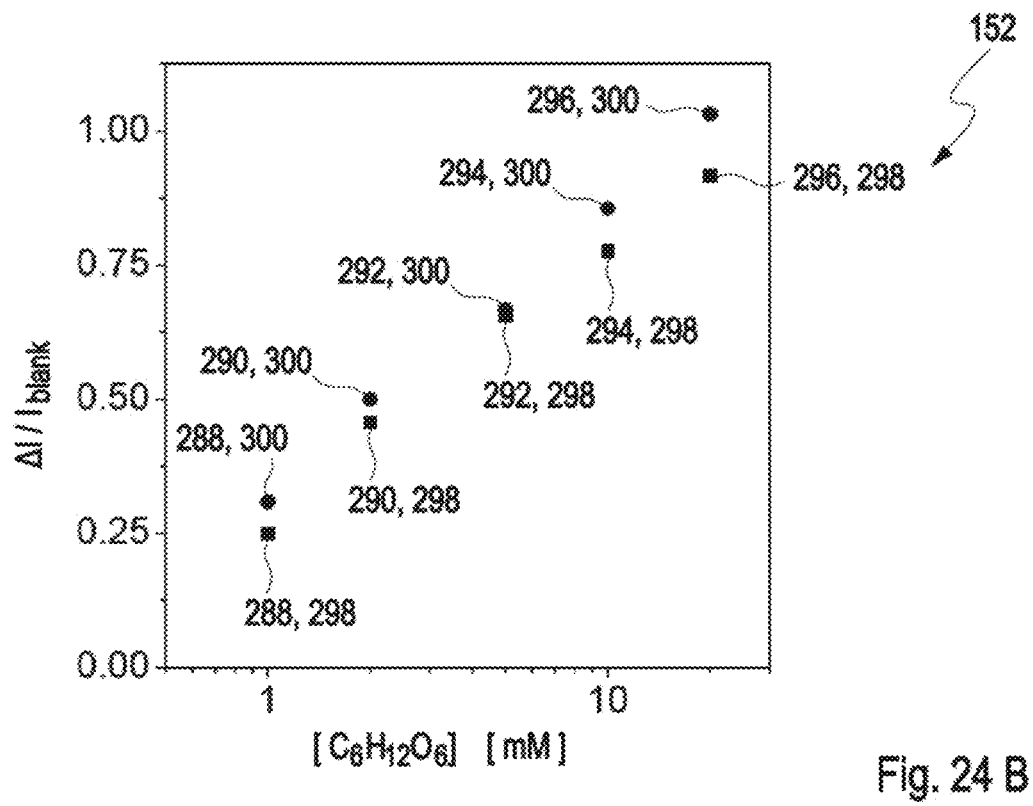
Figure 24:
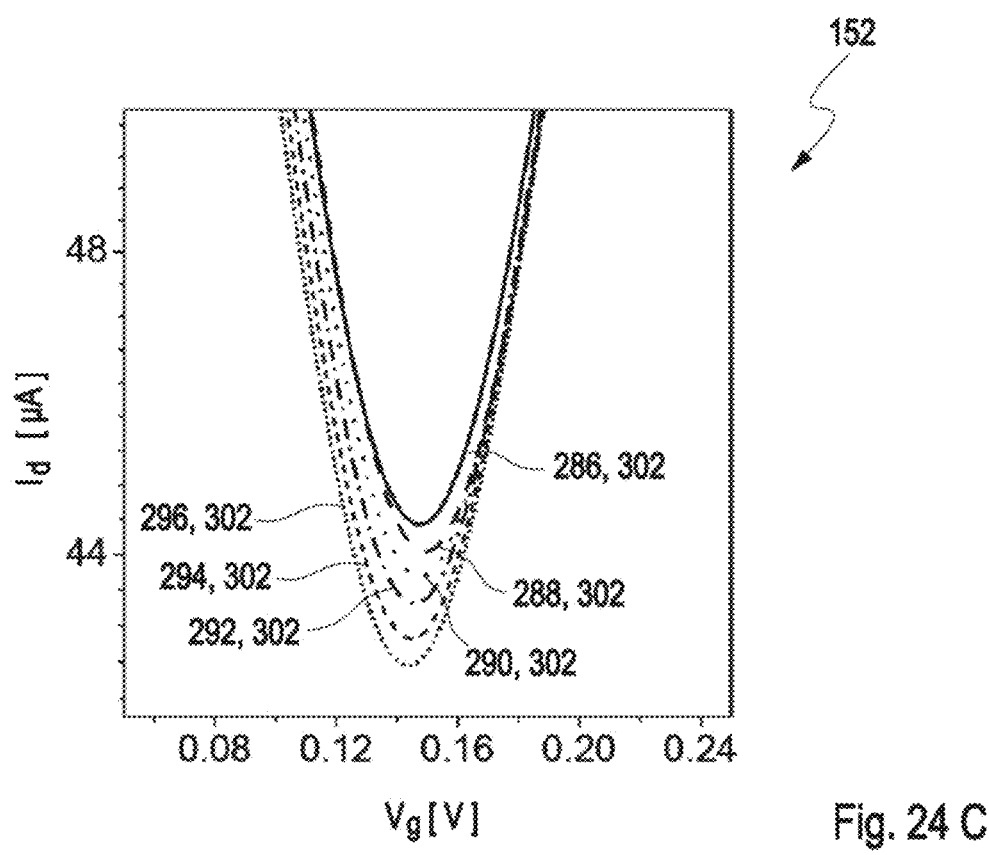
Figure 24:
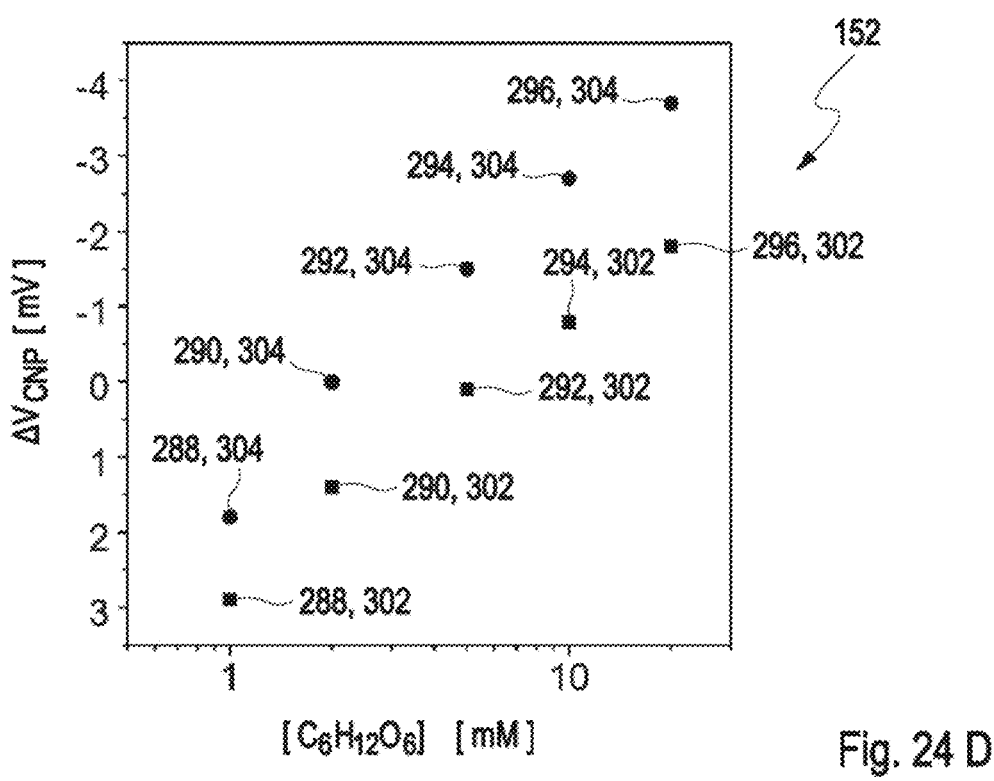

FIGS. 24A to 24D show measurement diagrams 152 of an electrochemical measurement in form of a cyclic voltammetry measurement (FIGS. 24A and 24B) and of a transistor-based measurement (FIGS. 24C and 24D) of glucose. Again, both measurements employ the same multipurpose electrode 112. Thus, in this specific example, the multipurpose electrode 112 is used to detect the analyte glucose using two different measurement techniques, one transistor-based method and one electrochemical method, which make use of one and the same multipurpose electrode 112. For glucose detection a multipurpose electrode 112 comprising a graphene layer 172 is employed, wherein the graphene layer 172 is modified such that glucose dehydrogenase (GDH) is immobilized on the graphene layer 172, typically via 1-pyrenebutyric acid N-hydroxysuccinimide ester (PBA-NHS) as linker. Immobilization of PBA-NHS typically occurs by applying PBA-NHS, e.g., in a concentration of 1 mM, in a solvent, typically ethanol, to the graphene layer 172. In a further step GDH may be added typically in a concentration of 1 mg/mL. Furthermore, a redox mediator such as ferrocenemethanol (FcMeOH) may be added. The PBA-NHS molecules immobilized on the graphene layer 172 may bind the GDH molecules thus immobilizing them on the graphene layer 172. In the presence of GDH, glucose may be oxidized to glucolactone while flavin adenine dinucleotide (FAD) may be reduced to $FADH_2$. In the presence of a redox mediator such as FcMeOH, $FADH_2$ may be oxidized to FAD while reducing the redox mediator such as FcMeOH, which may deliver electrons to the multipurpose electrode 112. For glucose detection the multipurpose electrode 112 may be employed as the gate electrode 120 of the FET 114 and allow glucose detection via the FET-based measurement of the analyte detector 110 as shown in FIGS. 24C and 24D. For the detection of glucose using the electrochemical measurement, the multipurpose electrode 112 may further be employed as working electrode, e.g., for a cyclic voltammetry measurement as shown in FIGS. 24A and 24B. The above-described redox chain reaction may allow to detect, for example, a current and/or a current density as a function of glucose concentration and the potential applied. FIG. 24A plots the current density j in $\mu A/cm^2$ against the applied potential E vs. the reference electrode (Ag/AgCl) for six different situations, in which the fluid sample is either buffer without glucose or the fluid sample is buffer comprising one of the following glucose concentrations: 1 mM, 2 mM, 5 mM, 10 mM or 20 mM. The different glucose concentrations are marked by reference numbers 286, 288, 290, 292, 294 and 296, respectively. The data displayed in FIG. 24A constitute a first set of measurements 298 of the electrochemical glucose detection. FIG. 24B plots $\Delta I/I_{blank}$ as a function of the concentration of glucose for the data displayed in FIG. 24A, which constitutes the first set of measurements 298 of the electrochemical glucose detection. The concentration of a molecule may throughout this document be denoted by the molecule in squared brackets. FIG. 24B further plots $\Delta I/I_{blank}$ values originating from a separate cyclic voltammetry measurement, which constitutes a second set of measurements 300. The first set of measurements 298 and the second set of measurements 300 were carried out with separate electrochemical measurement devices 116. For the second set of measurements 300 solely the calculated $\Delta I/I_{blank}$ values are plotted. Herein, I is a current value corresponding to a current density j, $I_{blank}$ denotes the current value produced by the sample 286 containing buffer without glucose and $\Delta I$ is the difference between the current value of a sample containing glucose and the current value of the sample 286 containing buffer without glucose when both current values are taken at the peak value (~0.3 V).

Glucose concentration may further be determined with a transistor-based measurement by using a multipurpose electrode 112 as described above, wherein the multipurpose electrode 112 may serve as gate electrode 120. In FIG. 24C the current $I_d$ is plotted as a function of the gate voltage $V_g$ for the six different situations already described for the cyclic voltammetry measurement shown in FIGS. 24A and 24B, by using the setup as shown in FIG. 2. FIG. 24D plots the voltage shift $\Delta V_{CNP}$ as a function of the concentration of glucose. The shift $\Delta V_{CNP}$ may be calculated from the measurement diagram 152 in FIG. 24C as the difference between the x-coordinate of the minimum of a graph corresponding to a sample containing glucose (288, 290, 292, 294 and 296) and the x-coordinate of the graph corresponding to the sample 286 without glucose. The x-axis in FIG. 24D displays the concentration of glucose on a logarithmic scale. FIG. 24D plots the voltage shift $\Delta V_{CNP}$ as a function of the concentration of glucose for the data displayed in FIG. 24C, which constitute a first set of transistor-based glucose measurements which is denoted by the reference number 302. The $\Delta V_{CNP}$ values in FIG. 24D which are calculated from the data in FIG. 24C are also marked with reference sign 302. FIG. 24D further plots $\Delta V_{CNP}$ values originating from a separate transistor-based measurement, which constitutes a second set of measurements 304. The first set of measurements 302 and the second set of measurements 304 were carried out with separate FETs 114. For the second set of measurements 304 solely the calculated $\Delta V_{CNP}$ values are plotted.

LIST OF REFERENCE NUMBERS 110 analyte detector
111 fluid sample
112 multipurpose electrode
114 field-effect transistor
116 electrochemical measurement device
117 Controller
120 gate electrode
122 source electrode
124 drain electrode
126 Channel
128 Substrate
130 Surface
132 reference electrode
134 Chamber
136 passivation layer
138 fluid channel
140 fluid inlet
142 fluid outlet
144 extended-gate field-effect transistor
146 extended gate electrode
148 semiconducting layer
150 gold layer
152 measurement diagram
153 functional component
154 bare gold
155 multipurpose electrode surface
156 immobilization of double stranded DNA
158 dehybridization of double stranded DNA
160 presence of single stranded DNA
161 presence of double stranded DNA
162 absence of target DNA
163 presence of target DNA
164 aminothiophenol monolayer
166 anti-TSH antibody
167 thyroid-stimulating hormone (TSH)
168 counter electrode
170 anti-TSH antibody fragments
172 graphene layer
174 metal particles
176 gold particles
178 absence of PEG
180 presence of pyrene PEG
182 presence of thiolated PEG
184 graph relating to the y-axis on the right-hand side
186 graph relating to the y-axis on the left-hand side
188 no TSH
190 10 pM TSH
192 100 pM TSH
194 1 nM TSH
196 10 nM TSH
198 100 nM TSH
199 TSH molecule 200 100 nM BSA
202 100 fM TSH
204 1 pM TSH
206 50 pM TSH
208 1000 pM TSH
210 TSH
212 BSA
214 Membrane
216 Space
218 Electrolyte
220 deionized water
222 8.36 mm Hg
224 20.9 mm Hg
226 41.8 mm Hg
228 83.6 mm Hg
230 209 mm Hg
232 0 minutes of incubation in buffer
234 5 minutes of incubation in buffer
236 10 minutes of incubation in buffer
238 conductive electrolyte solution
240 short bifunctional carboxylated PEG
242 long monofunctional methoxy-terminated PEG
244 buffer without TSH
246 buffer with 0.1 nM
248 buffer with 1 nM TSH
250 buffer with 10 nM TSH
252 buffer with 100 nM TSH
254 buffer without BSH and TSH
256 buffer with 100 nM BSA and without TSH
258 buffer with 100 fM TSH
260 buffer with 1 pM TSH
262 buffer with 50 pM TSH
264 buffer with 100 pM TSH
266 buffer with 1 nM TSH
268 buffer with 100 nM BSA and without TSH
270 buffer with 10 fM TSH
272 buffer with 1 pM TSH
274 buffer with 10 pM TSH
276 buffer with 50 pM TSH
278 buffer with 100 pM TSH
280 buffer with 1 nM TSH
281 buffer with 10 nM TSH
282 first set of transistor-based TSH measurements
284 second set of transistor-based TSH measurements
286 buffer without glucose
288 buffer with 1 mM glucose
290 buffer with 2 mM glucose
292 buffer with 5 mM glucose
294 buffer with 10 mM glucose
296 buffer with 20 mM glucose
298 first set of electrochemical glucose measurements
300 second set of electrochemical glucose measurements
302 first set of transistor-based glucose measurements
304 second set of transistor-based glucose measurement

What is claimed is:

1. An analyte detector for detecting at least one analyte in at least one fluid sample, the analyte detector comprising:
   at least one multipurpose electrode exposable to the fluid sample,
   at least one field-effect transistor in electrical contact with the multipurpose electrode, and
   at least one electrochemical measurement device in electrical contact with the multipurpose electrode,
   wherein the electrochemical measurement device is configured for performing at least one electrochemical measurement using the multipurpose electrode, and wherein the field-effect transistor is configured for performing at least one transistor measurement using the multipurpose electrode,
   wherein the analyte detector further comprises at least one controller, wherein the controller is connected to the field-effect transistor and to the electrochemical measurement device and wherein the controller is configured for controlling the at least one transistor measurement by using the field-effect transistor and wherein the controller additionally is configured for controlling the at least one electrochemical measurement by using the electrochemical measurement device.

2. The analyte detector according to claim 1, wherein the controller is configured for controlling the at least one transistor measurement by measuring a drain current of the field-effect transistor.

3. The analyte detector according to claim 1, wherein the controller is configured for sequentially triggering at least one measurement using the field-effect transistor and the at least one electrochemical measurement.

4. The analyte detector according to claim 3, wherein the controller is configured for repeatedly performing a sequence of the at least one measurement using the field-effect transistor and the at least one electrochemical measurement.

5. The analyte detector according to claim 1, wherein the multipurpose electrode is in electrical contact with a gate electrode of the field-effect transistor.

6. The analyte detector according to claim 1, wherein the multipurpose electrode is at least partially identical with at least one element selected from the group consisting of the gate electrode of the field-effect transistor and a channel of the field-effect transistor.

7. The analyte detector according to claim 1, wherein the analyte detector comprises at least one graphene layer interconnecting at least two electrically conductive electrodes, wherein the graphene layer is accessible to the analyte, wherein the multipurpose electrode comprises at least one element of the group consisting of: at least one of the at least two electrically conductive electrodes, the graphene layer.

8. The analyte detector according to claim 1, wherein the at least one multipurpose electrode is in electrical contact with one or both of a source electrode or a drain electrode of the field-effect transistor.

9. The analyte detector according to claim 1, wherein the analyte detector comprises at least one further electrode exposable to the fluid sample, the at least one further electrode comprising at least one electrode selected from the group consisting of a counter electrode and a reference electrode, wherein the electrochemical measurement device is configured for performing the at least one electrochemical measurement using the multipurpose electrode and the further electrode.

10. The analyte detector according to claim 1, wherein the multipurpose electrode comprises at least one functional component exposed to its surface, wherein the at least one functional component is configured for interacting with the analyte.

11. The analyte detector according to claim 10, wherein the functional component comprises at least one receptor compound, the receptor compound being capable of binding the at least one analyte.

12. The analyte detector according to claim 11, wherein the receptor compound is capable of binding the at least one analyte is selected from the group consisting of: antibodies and fragments thereof, aptamers, peptides, enzymes, nucleic acids, receptor proteins or binding domains thereof and hydrophilic polymers capable of mediating a salting-out effect.

13. The analyte detector according to claim 1, wherein the electrochemical measurement device is configured for performing at least one electrochemical measurement selected from the group consisting of: a cyclic voltammetry measurement; an impedance measurement; a potentiostatic measurement; an amperometric measurement; electrochemical impedance spectroscopy; voltammetry; amperometry; potentiometry; coulometry.

14. The analyte detector according to claim 1, wherein the analyte detector further comprises at least one fluid channel, wherein the at least one multipurpose electrode is disposed to be in contact with the fluid sample within the fluid channel.

15. The analyte detector according to claim 1, wherein the at least one field-effect transistor is selected from the group consisting of: an ion-sensitive field-effect transistor (ISFET); a chemically sensitive field-effect transistor (ChemFET); a biological field-effect transistor (BioFET); an enzyme field-effect transistor (ENFET); an extended-gate field-effect transistor (EGFET); a solution- or liquid-gated FET.

16. A method for detecting at least one analyte in at least one fluid sample, the method using the analyte detector according to claim 1, the method comprising the following steps:
a) providing at least one multipurpose electrode;
b) providing the at least one fluid sample in contact with the multipurpose electrode;
c) performing at least one transistor measurement by using at least one field-effect transistor in electrical contact with the at least one multipurpose electrode; and
d) performing at least one electrochemical measurement by using the multipurpose electrode.

17. The method according to claim 16, wherein in method step c) at least one transistor measurement value is generated, wherein in method step d) at least one electrochemical measurement value is generated, wherein the transistor measurement value and electrochemical measurement value are combined for one or both of quantitatively or qualitatively detecting the at least one analyte in the fluid sample.

18. The analyte detector according to claim 1, wherein the at least one multipurpose electrode is at least partially covered by a membrane which is permeable by the analyte.

* * * * *